United States Patent
Utsunomiya et al.

(10) Patent No.: US 9,761,011 B2
(45) Date of Patent: Sep. 12, 2017

(54) MOTION INFORMATION PROCESSING APPARATUS OBTAINING MOTION INFORMATION OF A SUBJECT PERFORMING A MOTION

(71) Applicant: Toshiba Medical Systems Corporation, Otawara-shi (JP)

(72) Inventors: Kazuki Utsunomiya, Nasushiobara (JP); Kousuke Sakaue, Nasushiobara (JP); Satoshi Ikeda, Yaita (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 146 days.

(21) Appl. No.: 14/319,080

(22) Filed: Jun. 30, 2014

(65) Prior Publication Data
US 2015/0003687 A1 Jan. 1, 2015

(30) Foreign Application Priority Data

Jul. 1, 2013 (JP) .................................. 2013-138418
Aug. 21, 2013 (JP) .................................. 2013-171756

(51) Int. Cl.
*G06T 7/00* (2017.01)
*G06K 9/00* (2006.01)
(Continued)

(52) U.S. Cl.
CPC ........ *G06T 7/2046* (2013.01); *G06K 9/00342* (2013.01); *G06K 9/00348* (2013.01);
(Continued)

(58) Field of Classification Search
CPC ........... G06K 9/00362; G06K 9/00342; G06K 9/00348; G06T 7/2046
See application file for complete search history.

(56) References Cited

U.S. PATENT DOCUMENTS 6,551,258 B1 * 4/2003 Herling .................. A61B 5/103
600/595
8,213,680 B2 * 7/2012 Fitzgibbon ......... G06K 9/00335
348/169
(Continued)

FOREIGN PATENT DOCUMENTS

JP 9-56697 3/1997
JP 2006149920 A * 6/2006
(Continued)

OTHER PUBLICATIONS

Vangelis Metsis, et al., "Computer Aided Rehabilitation for Patients with Rheumatoid Arthritis", ICNC, 2013 International Conference, Jan. 28-31, 2013, 6 pages.

*Primary Examiner* — Utpal Shah
(74) *Attorney, Agent, or Firm* — Oblon, McClelland, Maier & Neustadt, L.L.P.

(57) ABSTRACT

A motion information processing apparatus according to an embodiment includes an obtaining unit, a designating operation receiving unit, an analyzing unit, and a display controlling unit. The obtaining unit obtains motion information of a subject who performs a predetermined motion. The designating operation receiving unit receives an operation to designate a site of the subject. The analyzing unit calculates an analysis value related to a movement of the designated site by analyzing the motion information. The display controlling unit displays display information based on the analysis value related to the movement of the designated site.

13 Claims, 55 Drawing Sheets

(51) Int. Cl.
*G06T 7/20* (2017.01)
*G06T 7/246* (2017.01)

(52) U.S. Cl.
CPC .... *G06T 7/251* (2017.01); *G06T 2207/10024* (2013.01); *G06T 2207/30196* (2013.01)

(56) References Cited

U.S. PATENT DOCUMENTS

| | | | | |
|---|---|---|---|---|
| 8,437,506 | B2 * | 5/2013 | Williams | G06F 3/011 |
| | | | | 348/46 |
| 8,582,867 | B2 * | 11/2013 | Litvak | G06K 9/00201 |
| | | | | 382/154 |
| 8,613,620 | B2 * | 12/2013 | Barasch | A63B 24/0003 |
| | | | | 434/247 |
| 9,161,708 | B2 * | 10/2015 | Elliott | A63B 71/06 |
| 2006/0229170 | A1 | 10/2006 | Ozawa | A61H 1/003 |
| | | | | 482/92 |
| 2007/0287900 | A1 * | 12/2007 | Breen | A61B 5/1116 |
| | | | | 600/407 |
| 2008/0009773 | A1 * | 1/2008 | Harrison | A61B 5/107 |
| | | | | 600/595 |
| 2008/0112592 | A1 * | 5/2008 | Wu | A61B 5/1113 |
| | | | | 382/103 |
| 2009/0233769 | A1 * | 9/2009 | Pryor | B60K 35/00 |
| | | | | 482/8 |
| 2009/0272385 | A1 * | 11/2009 | River | A61H 1/0296 |
| | | | | 128/845 |
| 2010/0278393 | A1 * | 11/2010 | Snook | G06F 3/011 |
| | | | | 382/107 |
| 2011/0054870 | A1 * | 3/2011 | Dariush | G06F 3/011 |
| | | | | 703/11 |
| 2012/0253201 | A1 * | 10/2012 | Reinhold | A61B 5/1113 |
| | | | | 600/473 |
| 2013/0171601 | A1 * | 7/2013 | Yuasa | A61B 5/1114 |
| | | | | 434/258 |
| 2013/0178960 | A1 * | 7/2013 | Sheehan | G06F 17/40 |
| | | | | 700/91 |
| 2013/0252216 | A1 * | 9/2013 | Clavin | G09B 19/0038 |
| | | | | 434/257 |
| 2013/0324857 | A1 * | 12/2013 | Kurillo | A61B 5/1127 |
| | | | | 600/476 |
| 2013/0336550 | A1 * | 12/2013 | Kapur | G06K 9/00369 |
| | | | | 382/128 |
| 2014/0147820 | A1 * | 5/2014 | Snow | G06F 19/3481 |
| | | | | 434/247 |
| 2014/0228985 | A1 * | 8/2014 | Elliott | A63B 71/06 |
| | | | | 700/91 |
| 2014/0287389 | A1 * | 9/2014 | Kallmann | G06F 19/3481 |
| | | | | 434/247 |
| 2014/0303524 | A1 * | 10/2014 | Chen | A61B 5/11 |
| | | | | 600/595 |
| 2014/0334670 | A1 * | 11/2014 | Guigues | G06T 7/2046 |
| | | | | 382/103 |
| 2014/0347392 | A1 * | 11/2014 | Odessky | A61B 5/1121 |
| | | | | 345/633 |

FOREIGN PATENT DOCUMENTS

| | | | | |
|---|---|---|---|---|
| JP | WO 2012039467 | A1 * | 3/2012 | ........... A61B 5/1114 |
| WO | WO 2013001358 | A1 * | 1/2013 | ........... A61B 5/1121 |

* cited by examiner

FIG.3

| JOINT IDENTIFYING INFORMATION | COORDINATE INFORMATION |
|---|---|
| 2a | (x1, y1, z1) |
| 2b | (x2, y2, z2) |
| 2c | (x3, y3, z3) |
| 2d | (x4, y4, z4) |
| 2e | (x5, y5, z5) |
| 2f | (x6, y6, z6) |
| 2g | (x7, y7, z7) |
| 2h | (x8, y8, z8) |
| 2i | (x9, y9, z9) |
| 2j | (x10, y10, z10) |
| 2k | (x11, y11, z11) |
| 2l | (x12, y12, z12) |
| 2m | (x13, y13, z13) |
| 2n | (x14, y14, z14) |
| 2o | (x15, y15, z15) |
| 2p | (x16, y16, z16) |
| 2q | (x17, y17, z17) |
| 2r | (x18, y18, z18) |
| 2s | (x19, y19, z19) |
| 2t | (x20, y20, z20) |

FIG.5

| NAME | NAME NUMBER | DATE OF TRAINING | MOTION INFORMATION ||||
|---|---|---|---|---|---|---|
| | | | COLOR IMAGE INFORMATION | DISTANCE IMAGE INFORMATION | SPEECH RECOGNITION RESULT | SKELETON INFORMATION |
| A | 1 | 20120801_1 | COLOR IMAGE INFORMATION | DISTANCE IMAGE INFORMATION | SPEECH RECOGNITION RESULT | SKELETON INFORMATION |
| | | 20120801_2 | COLOR IMAGE INFORMATION | DISTANCE IMAGE INFORMATION | SPEECH RECOGNITION RESULT | SKELETON INFORMATION |
| | | 20120802_1 | COLOR IMAGE INFORMATION | DISTANCE IMAGE INFORMATION | SPEECH RECOGNITION RESULT | SKELETON INFORMATION |
| | | . | . | . | . | . |
| | | . | . | . | . | . |
| B | 2 | 20120803_1 | COLOR IMAGE INFORMATION | DISTANCE IMAGE INFORMATION | SPEECH RECOGNITION RESULT | SKELETON INFORMATION |
| | | 20120804_1 | COLOR IMAGE INFORMATION | DISTANCE IMAGE INFORMATION | SPEECH RECOGNITION RESULT | SKELETON INFORMATION |
| | | 20120805_1 | COLOR IMAGE INFORMATION | DISTANCE IMAGE INFORMATION | SPEECH RECOGNITION RESULT | SKELETON INFORMATION |
| | | . | . | . | . | . |
| | | . | . | . | . | . |
| | | . | . | . | . | . |
| . | | . | . | . | . | . |
| . | | . | . | . | . | . |
| . | | . | . | . | . | . |

FIG. 7
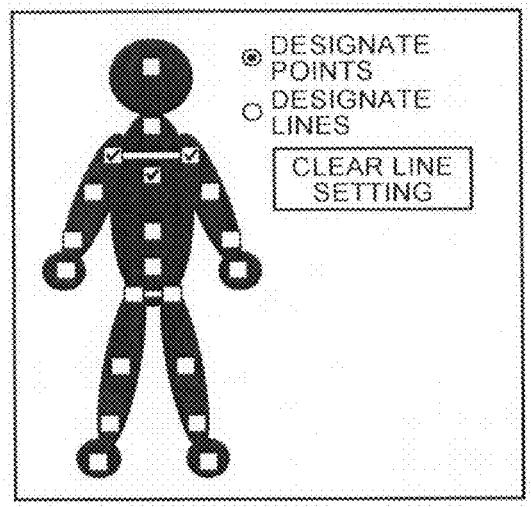
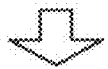
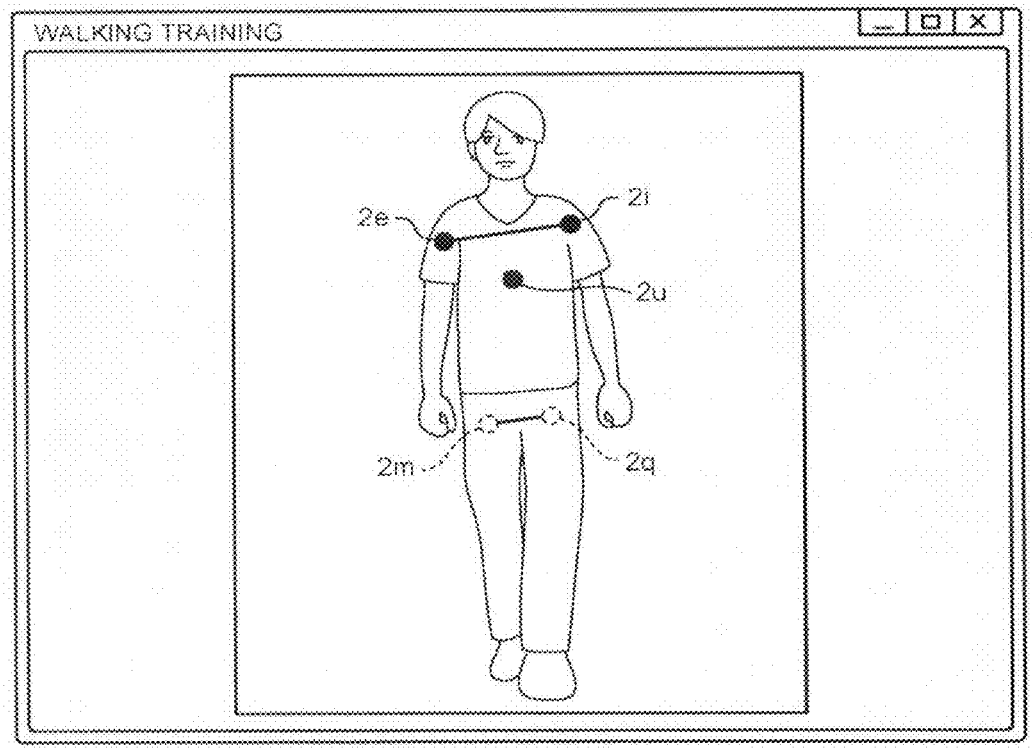

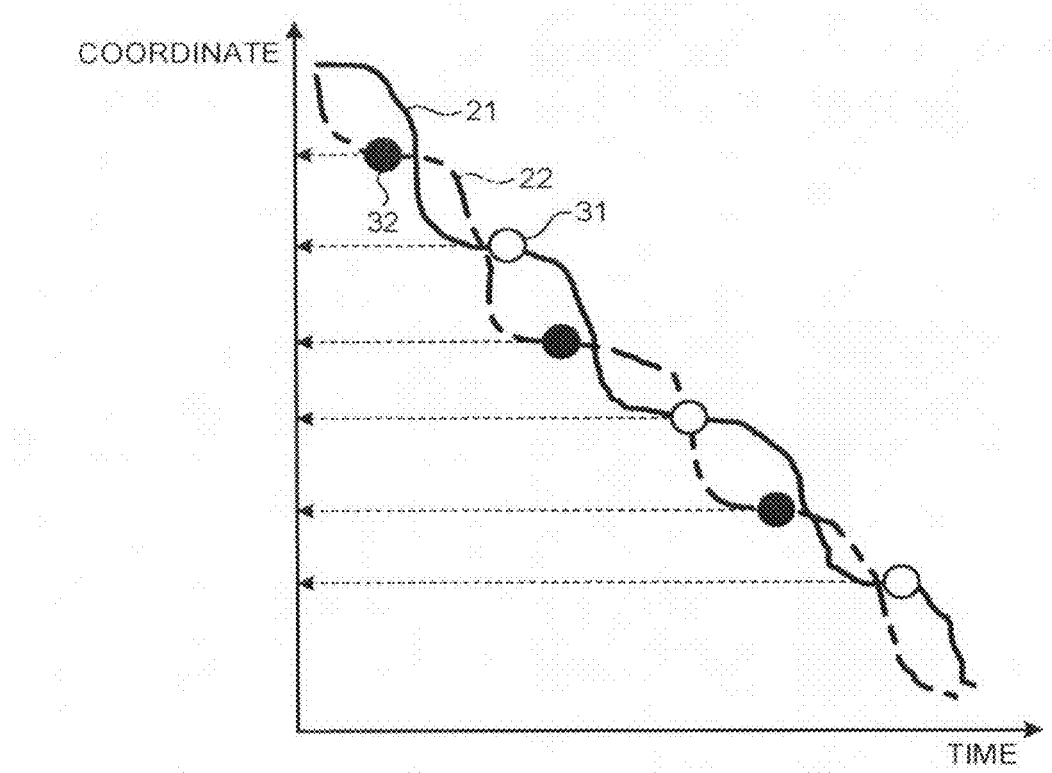

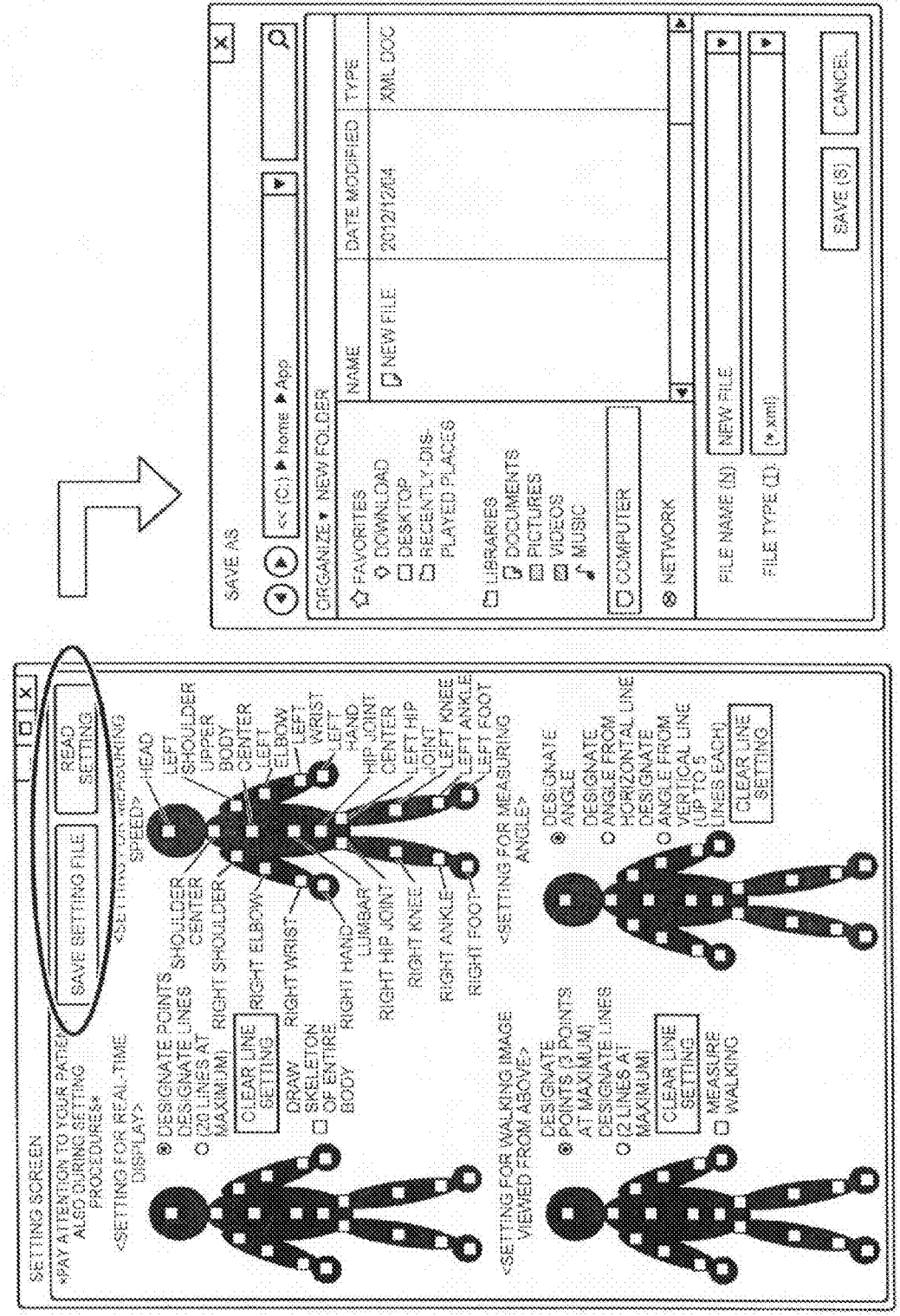

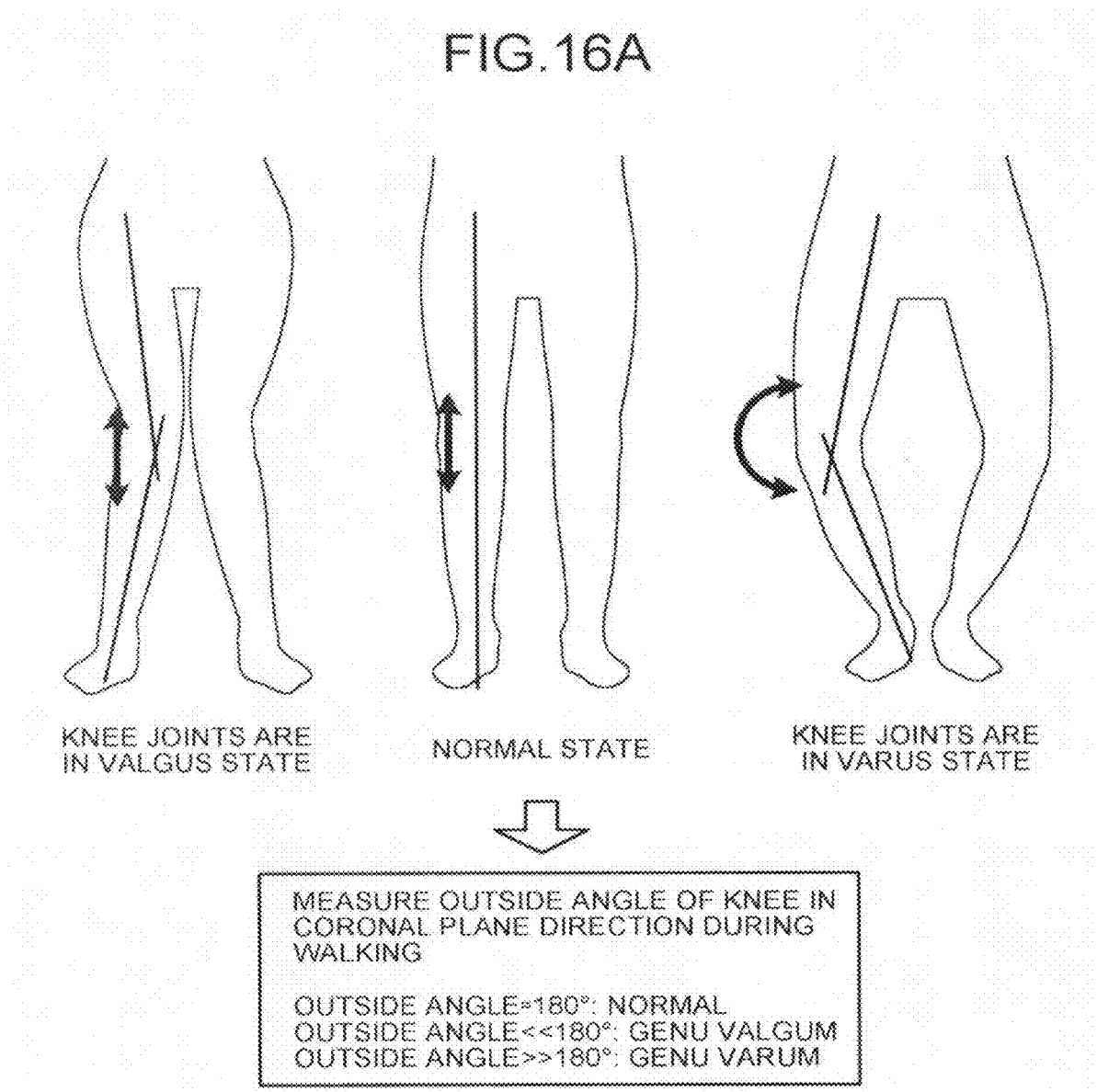

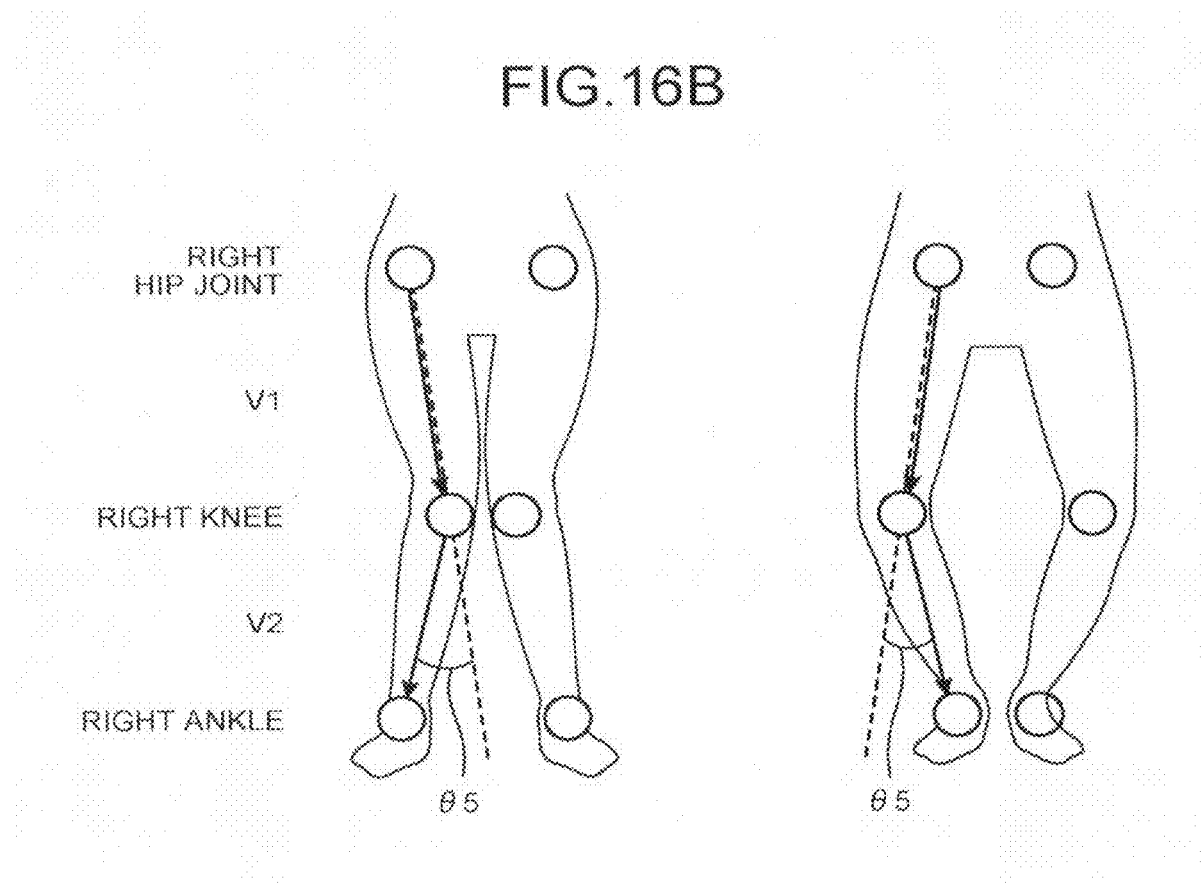

FIG.18
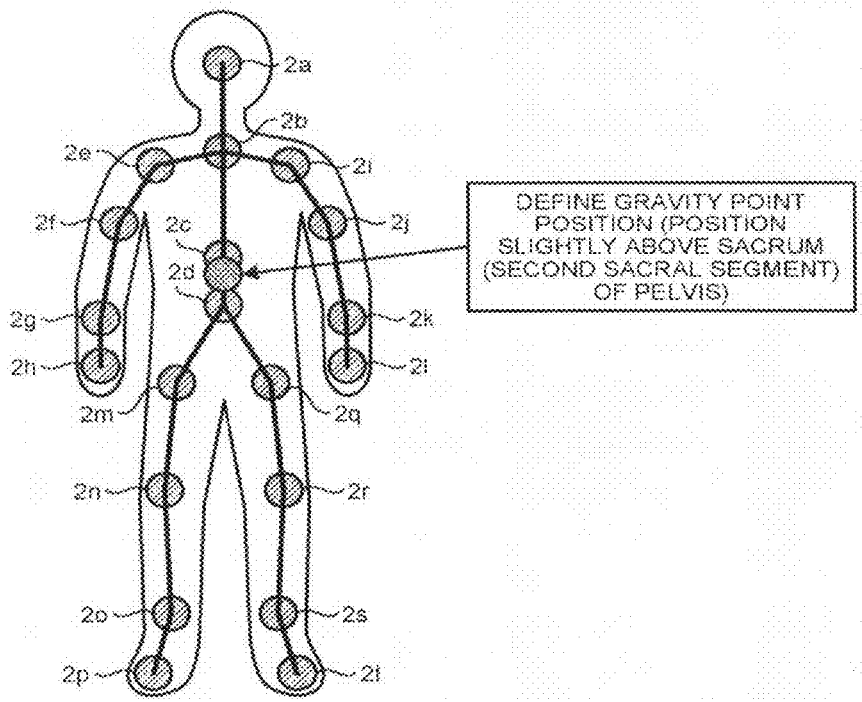
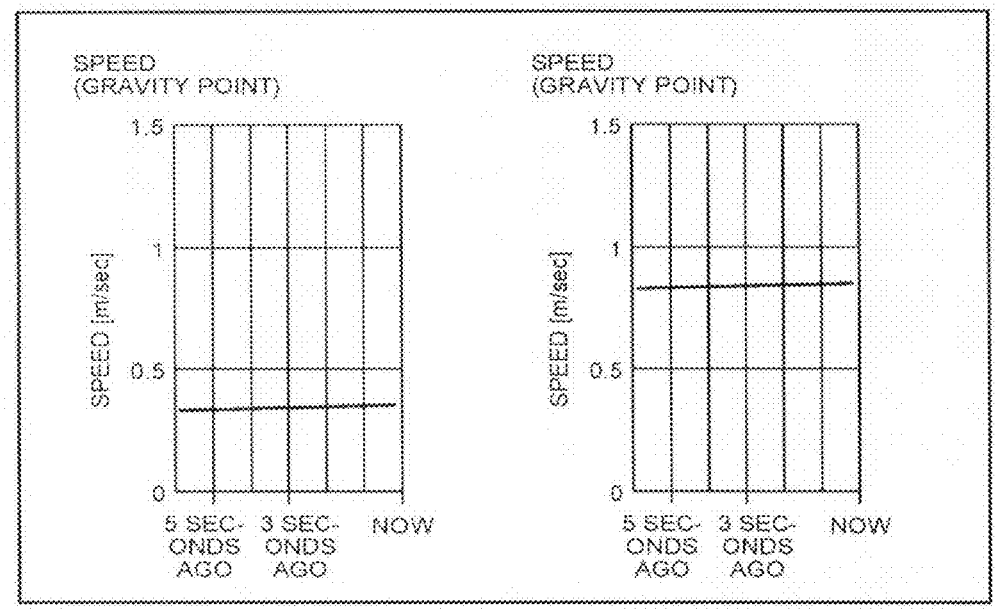

FIG.19
(A)
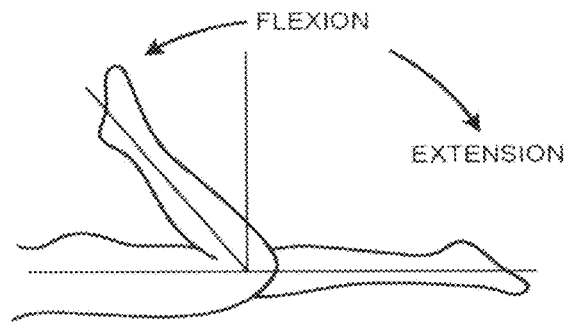
(B)
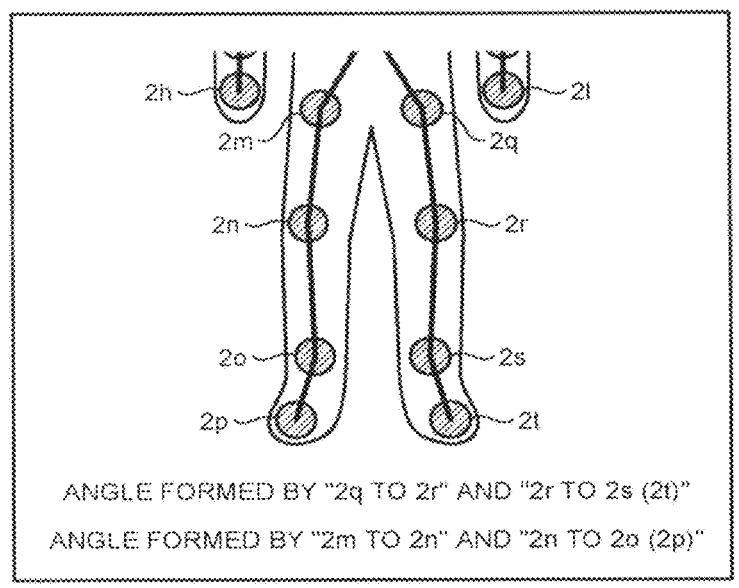
ANGLE FORMED BY "2q TO 2r" AND "2r TO 2s (2t)"
ANGLE FORMED BY "2m TO 2n" AND "2n TO 2o (2p)"
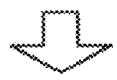
(C)
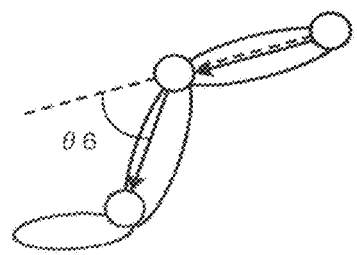
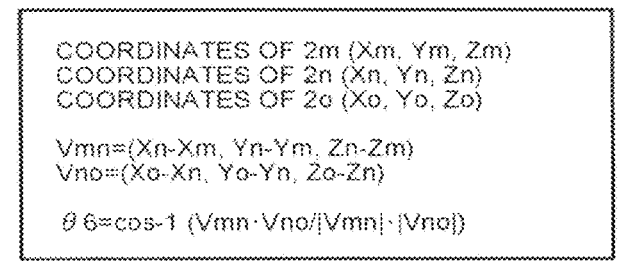
COORDINATES OF 2m (Xm, Ym, Zm)
COORDINATES OF 2n (Xn, Yn, Zn)
COORDINATES OF 2o (Xo, Yo, Zo)
Vmn=(Xn-Xm, Yn-Ym, Zn-Zm)
Vno=(Xo-Xn, Yo-Yn, Zo-Zn)
$\theta 6 = \cos^{-1}(Vmn \cdot Vno/|Vmn| \cdot |Vno|)$ FIG.20
(A)
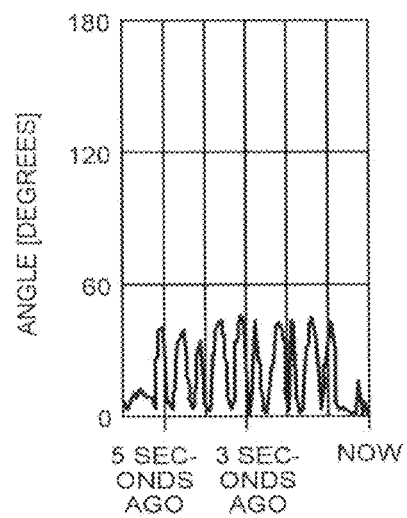
(B)
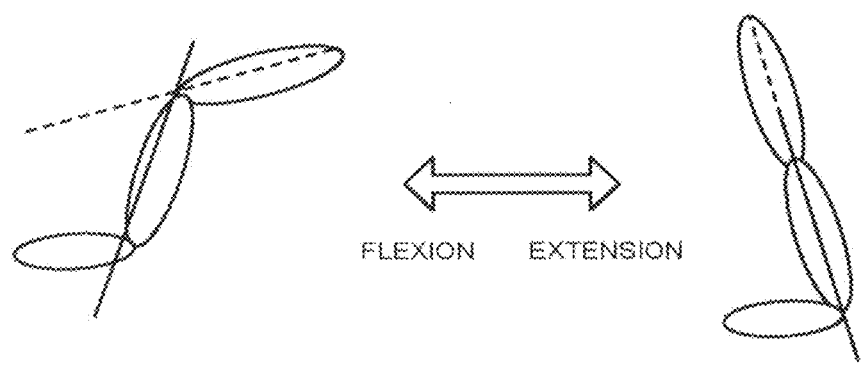

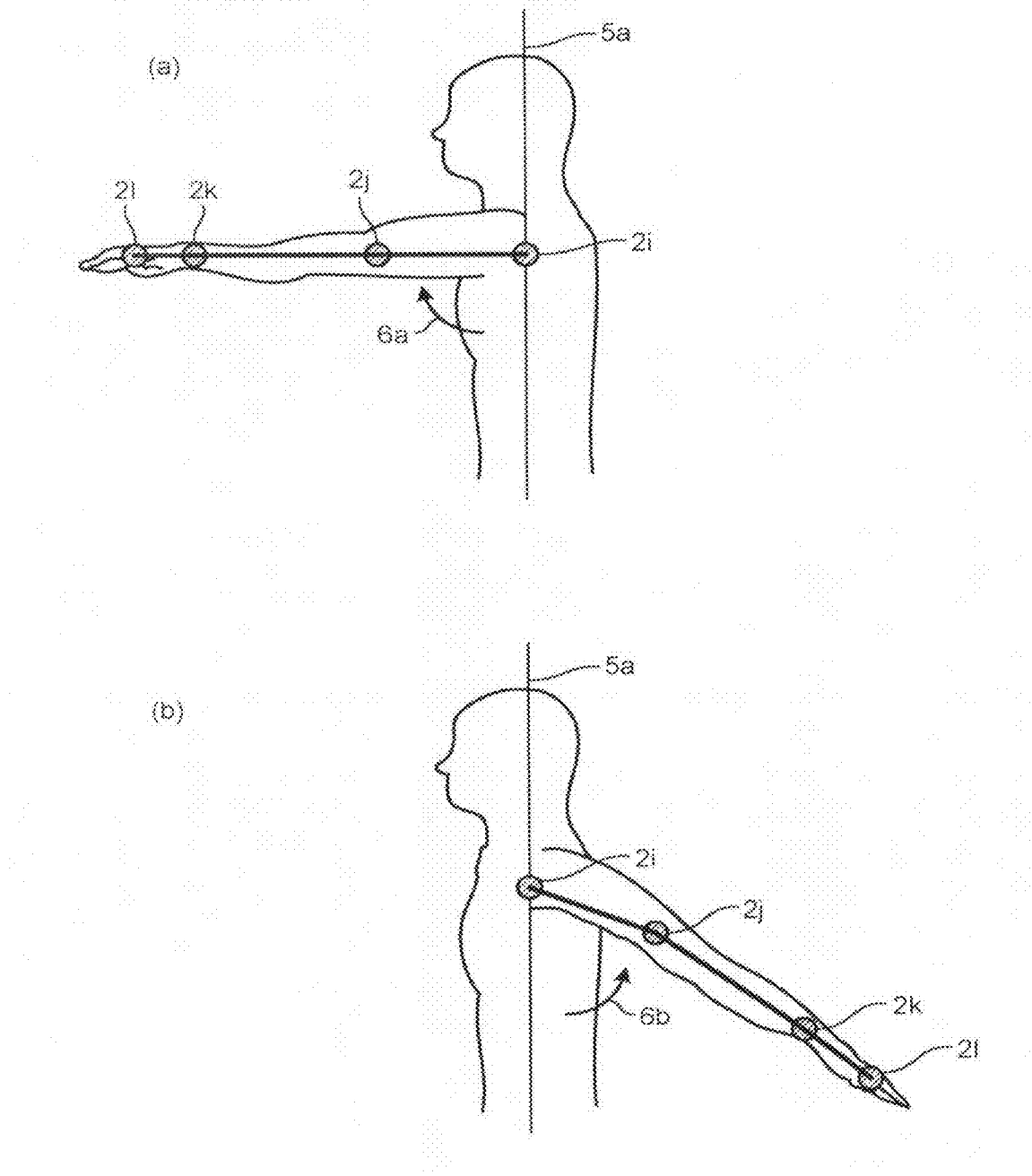

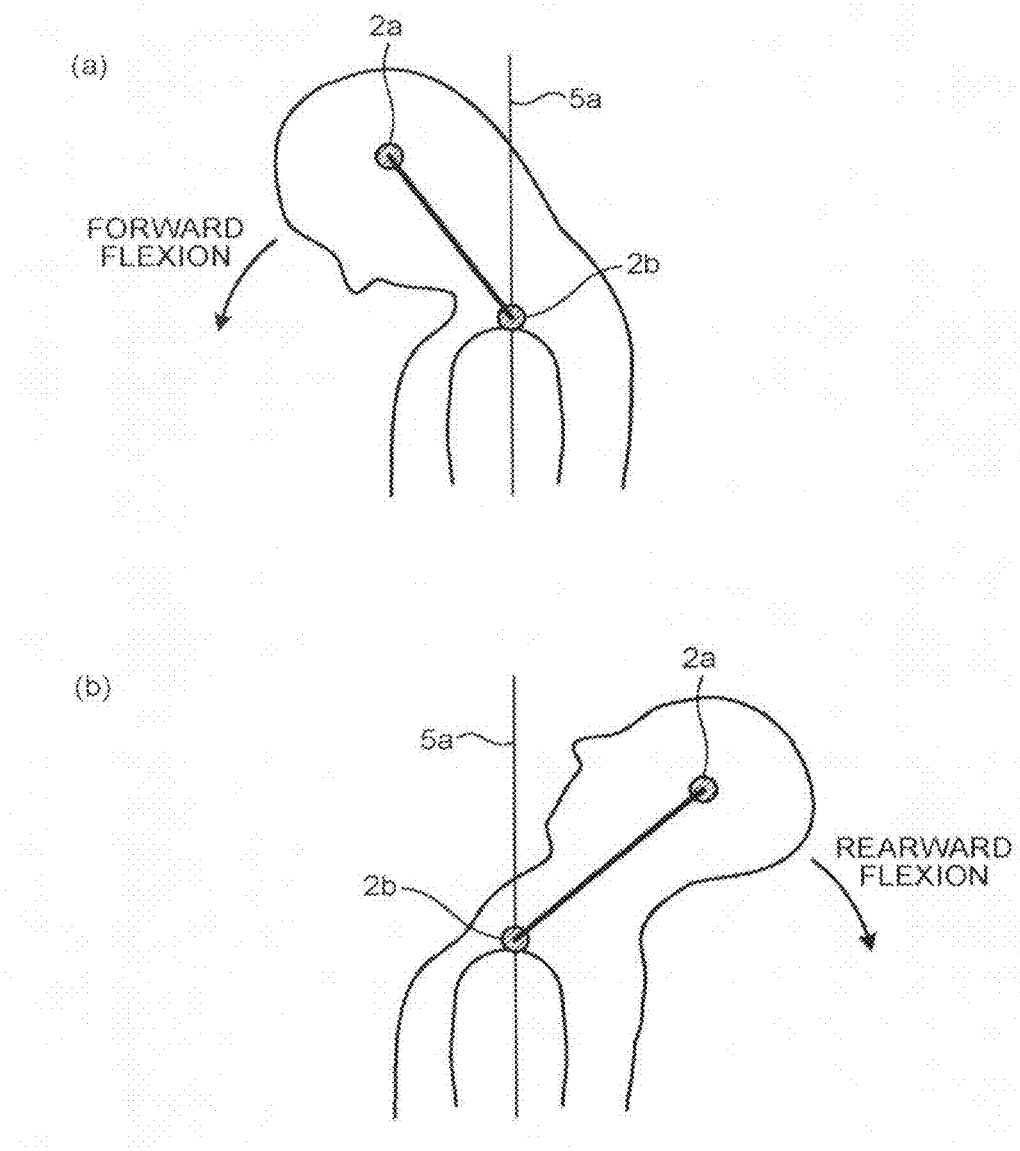

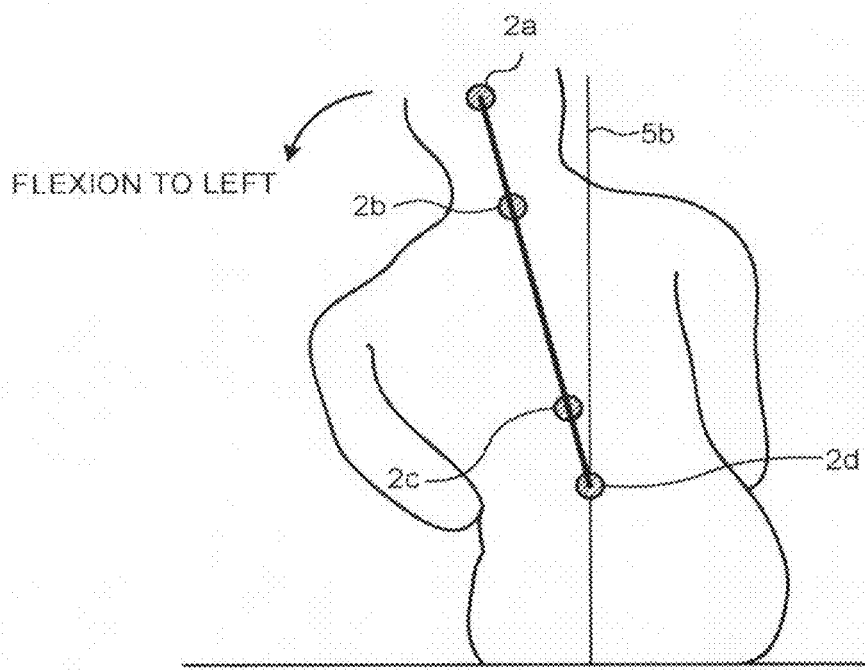

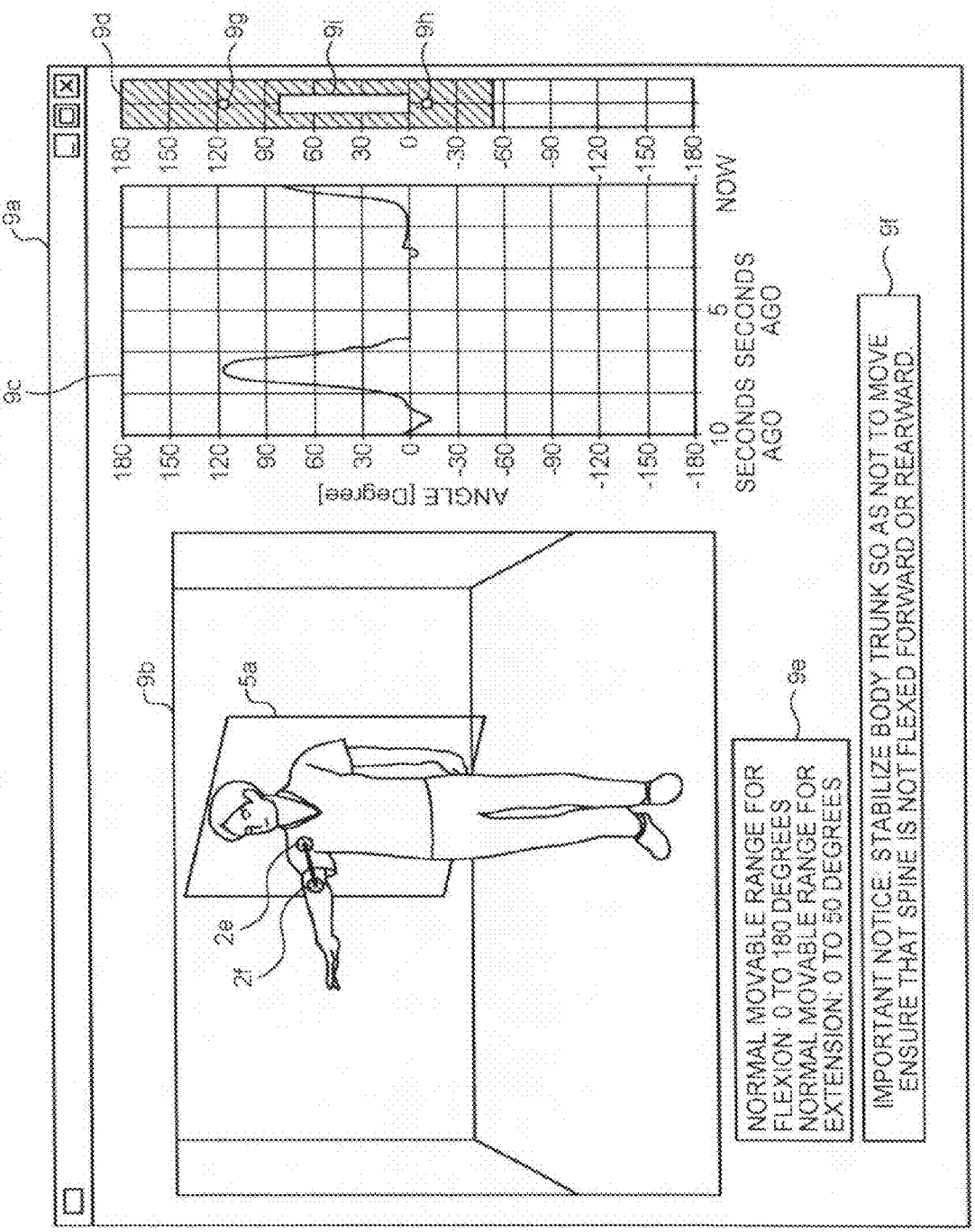

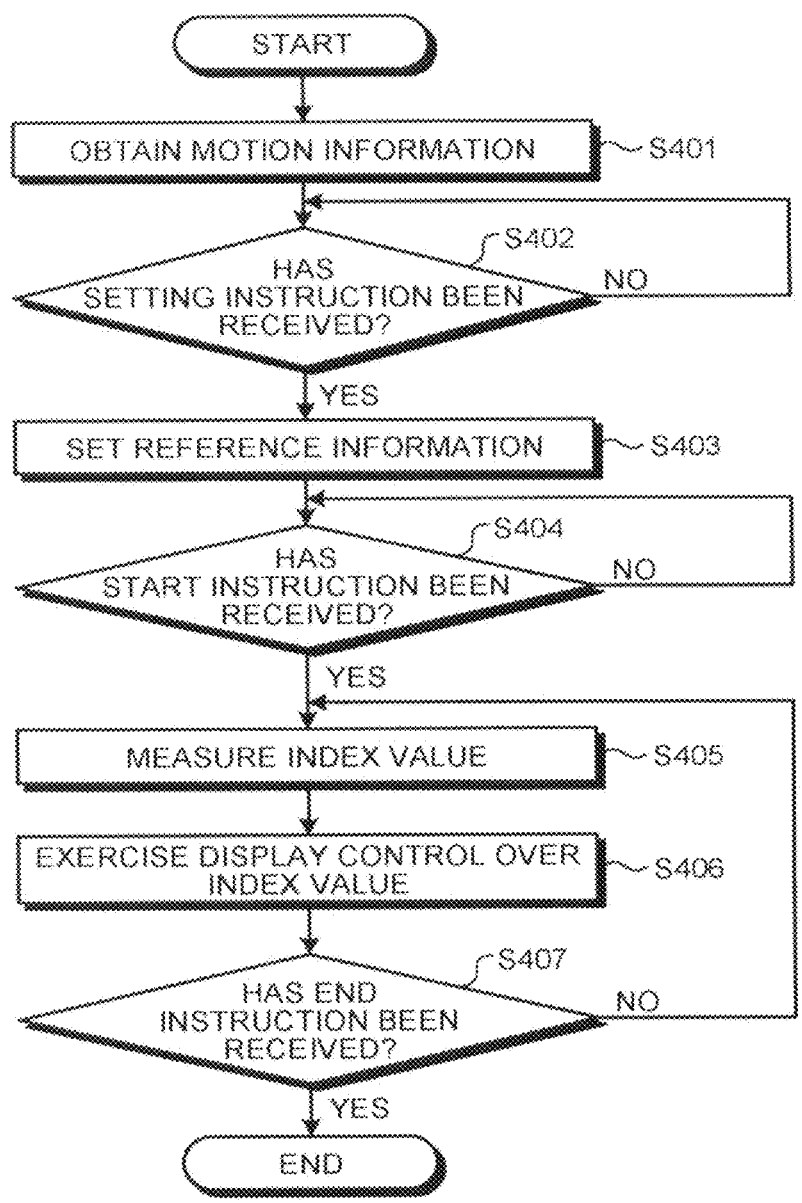

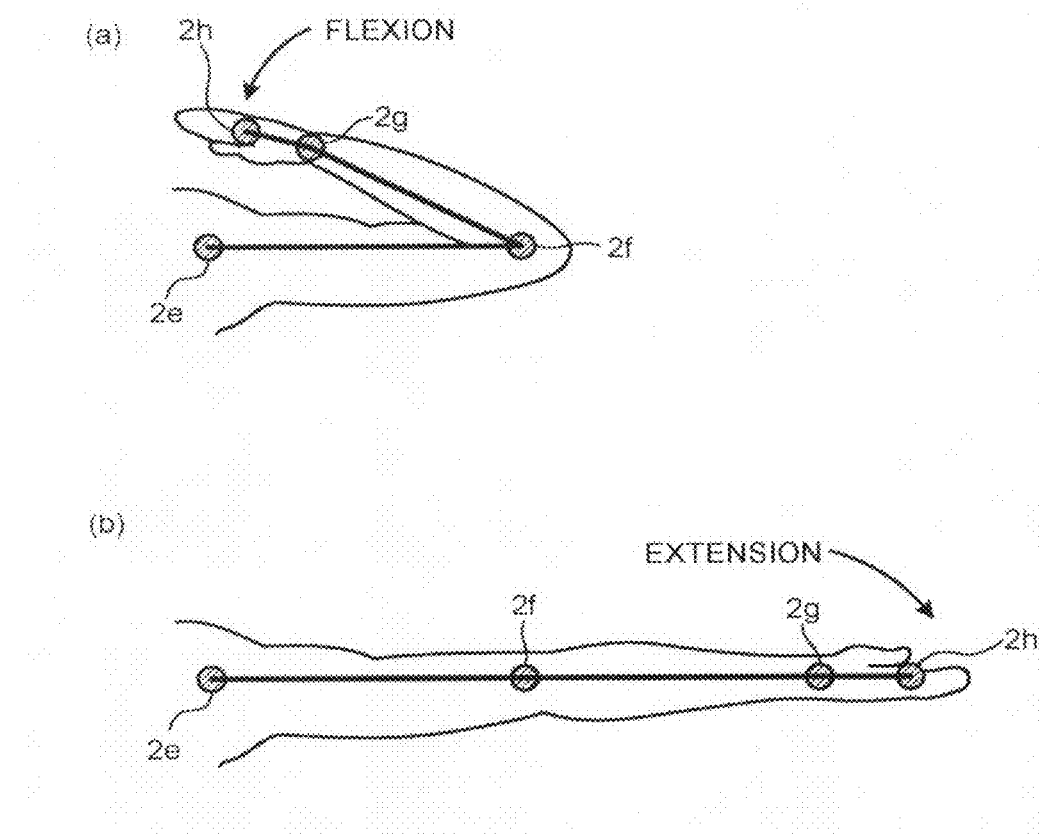

FIG.29B
(a)
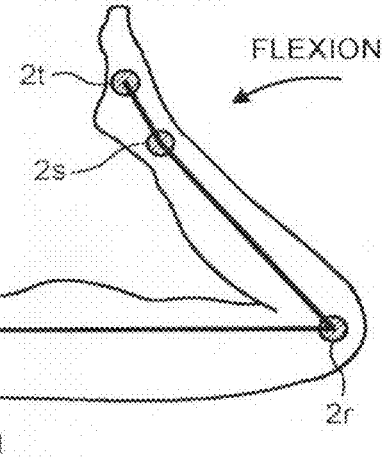
(b)
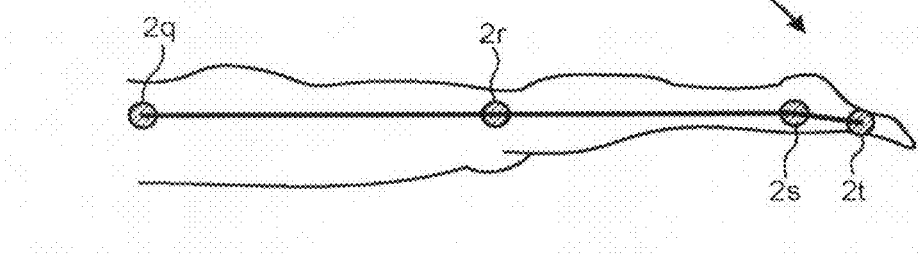

FIG.36I
(a)
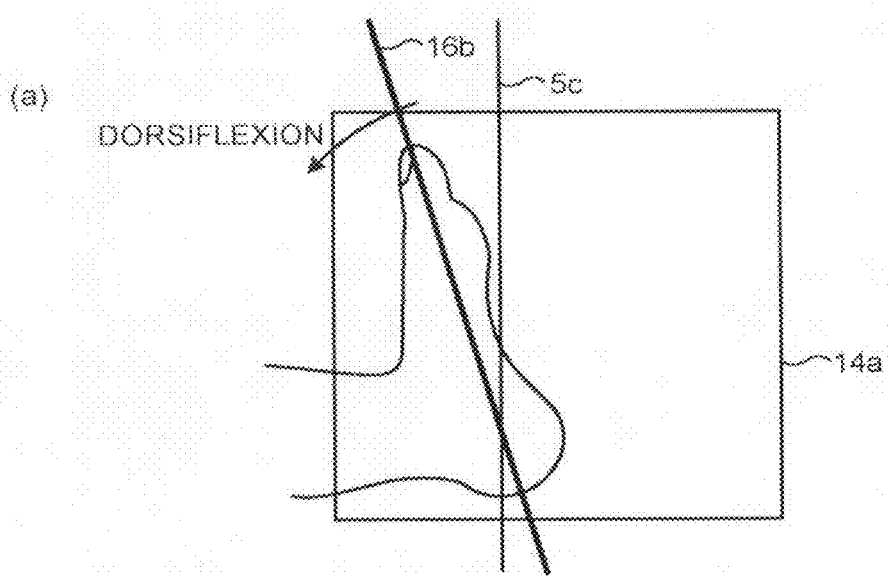
DORSIFLEXION
(b)
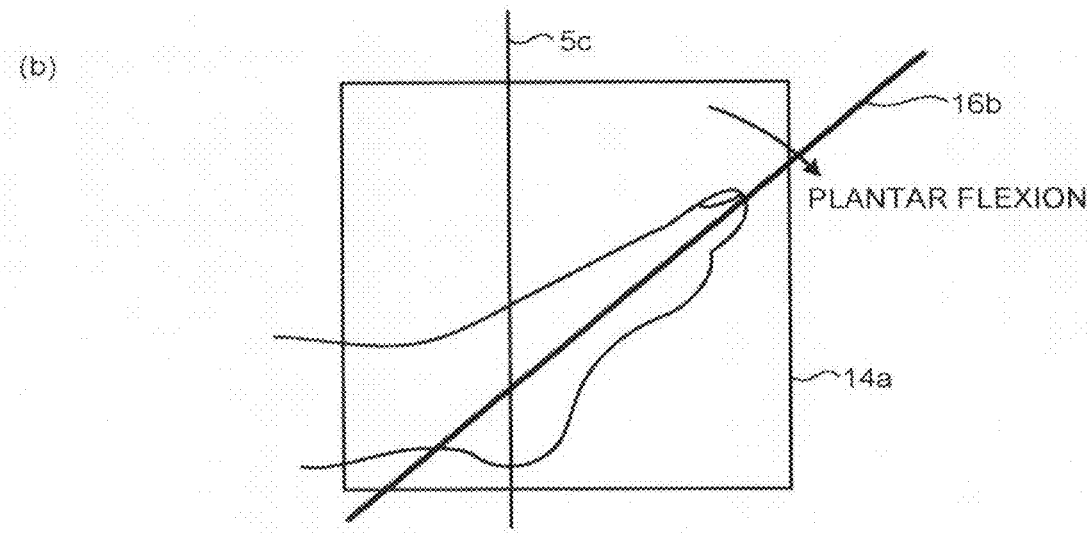
PLANTAR FLEXION

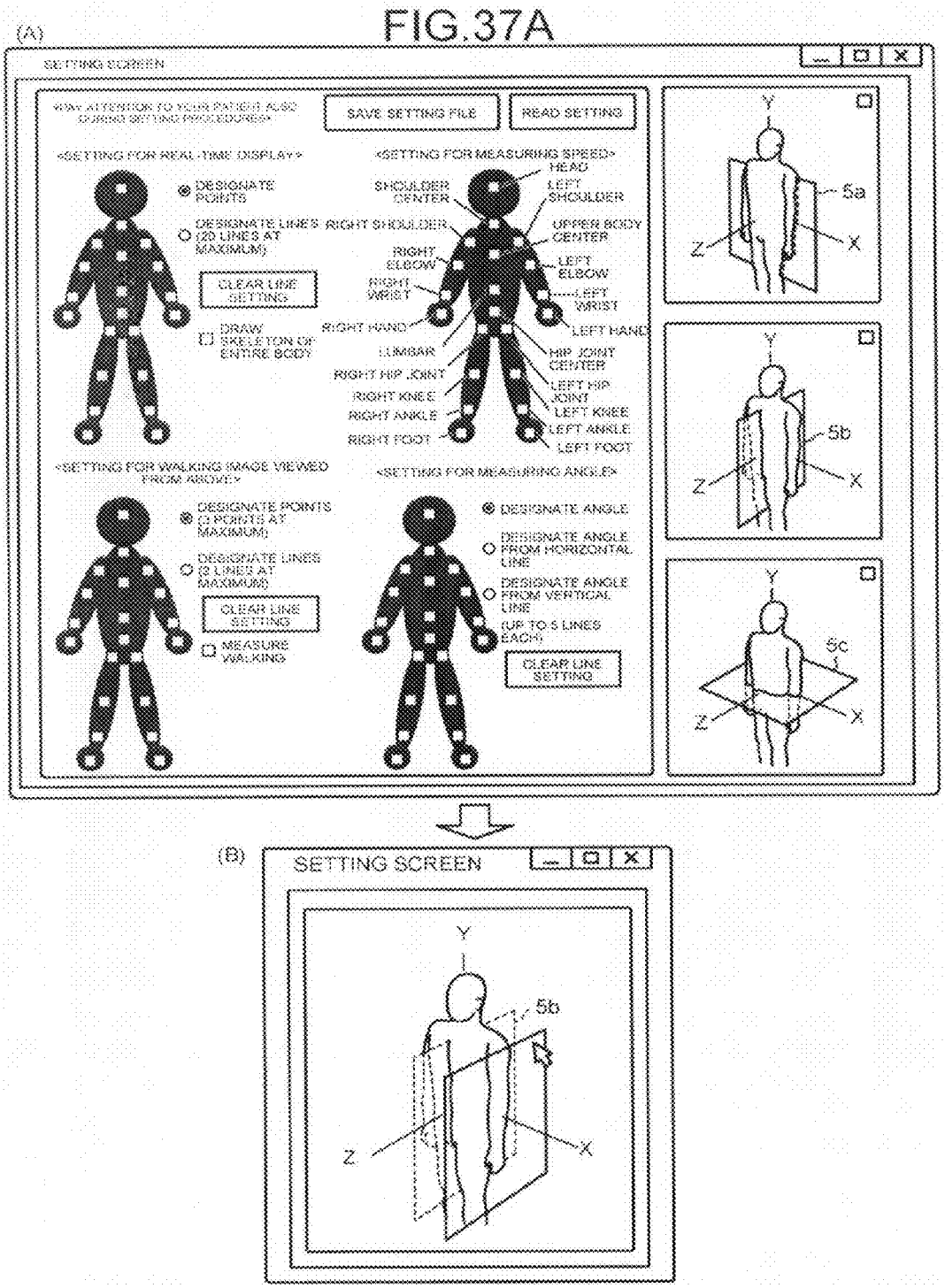

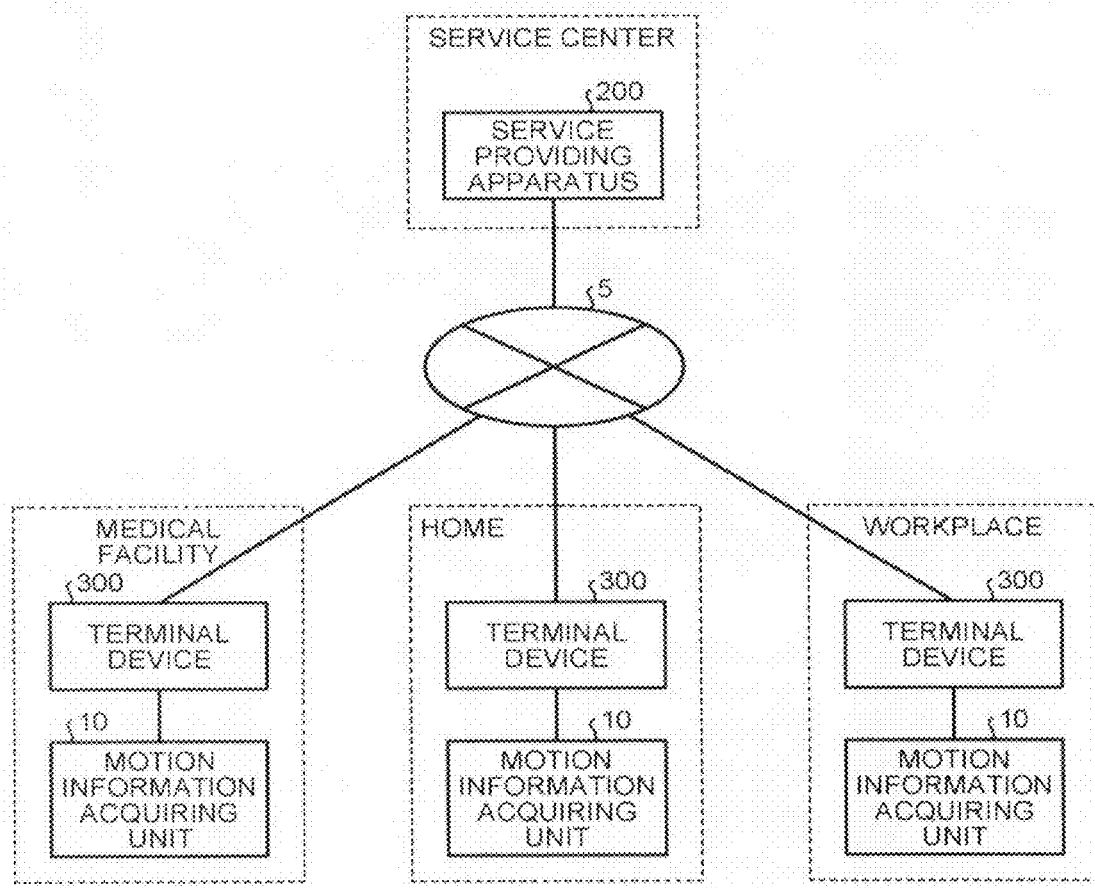

MOTION INFORMATION PROCESSING APPARATUS OBTAINING MOTION INFORMATION OF A SUBJECT PERFORMING A MOTION

CROSS-REFERENCE TO RELATED APPLICATIONS

This application is based upon and claims the benefit of priority from Japanese Patent Application No. 2013-138418, filed on Jul. 1, 2013; and Japanese Patent Application No. 2013-171756, filed on Aug. 21, 2013, the entire contents of all of which are incorporated herein by reference.

FIELD

Embodiments described herein relate generally to a motion information processing apparatus.

BACKGROUND

Conventionally, in rehabilitation, a number of experts provide cooperative support to enable persons who have mental and physical disabilities caused by various reasons, such as diseases, injuries, and aging, and congenital disabilities to live better lives. In rehabilitation, for example, cooperative support is provided by a number of experts, such as rehabilitation specialists, rehabilitation nurses, physical therapists, occupational therapists, speech-language-hearing therapists, clinical psychologists, prosthetists, and social workers.

In recent years, there have been developed motion capture technologies for digitally recording a motion of a person or an object. Examples of systems of the motion capture technologies include an optical, a mechanical, a magnetic, and a camera system. Widely known is the camera system for digitally recording a motion of a person by attaching markers to the person, detecting the markers with a tracker, such as a camera, and processing the detected markers, for example. Examples of systems using no marker or no tracker include a system for digitally recording a motion of a person by using an infrared sensor, measuring a distance from the sensor to the person, and detecting the size of the person and various types of motions of the skeletal structure. Examples of the sensors provided with such a system include Kinect (registered trademark).

BRIEF DESCRIPTION OF THE DRAWINGS

FIG. 3 is a drawing of an example of skeleton information generated by the motion information generating unit according to the first embodiment;

FIG. 5 is a table of examples of motion information stored in a motion information storage unit according to the first embodiment;

FIG. 7 is a drawing for explaining examples of a setting for a real-Lime display according to the first embodiment;

FIG. 10 is a drawing for explaining an example in which the analyzing unit according to the first embodiment calculates landing points of feet;

FIG. 11 is a drawing for explaining an example of a setting file saving and reading processes according to the first embodiment;

FIG. 16A is a drawing for explaining an example of reference information about varus/valgus angles of knees that is referred to by an analyzing unit according to a third embodiment;

FIG. 16B is a drawing for explaining a knee angle calculating process performed by the analyzing unit according to the third embodiment;

FIG. 18 is a drawing for explaining examples of contents of a process performed by a motion information processing apparatus according to a fourth embodiment;

FIG. 19 is a drawing for explaining an example of a process performed by an analyzing unit according to a fifth embodiment;

FIG. 20 is a drawing of examples of angle analysis results displayed by a display controlling unit according to the fifth embodiment;

FIG. 24A is a drawing for explaining index values measured by a measuring unit according to the seventh embodiment while using coronal plane information;

FIG. 24F is yet another drawing for explaining the index values measured by the measuring unit according to the seventh embodiment while using the coronal plane information;

FIG. 25E is yet another drawing for explaining the index values measured by the measuring unit according to the seventh embodiment while using the sagittal plane information;

FIG. 27 is a drawing for explaining a process performed by a display controlling unit according to the seventh embodiment;

FIG. 28 is a flowchart of a procedure in a process performed by the motion information processing apparatus according to the seventh embodiment;

FIG. 29A is a drawing for explaining index values measured by a measuring unit according to an eighth embodiment while using reference line information;

FIG. 29B is another drawing for explaining the index values measured by the measuring unit according to the eighth embodiment while using reference line information;

FIG. 36I is yet another drawing for explaining the examples in which the measuring unit according to the ninth embodiment measures the index values for other exercises in rotation directions;

FIG. 37A is a drawing for explaining an example of a process performed by a motion information processing apparatus 100 according to an eleventh embodiment;

FIG. 38 is a drawing for explaining an example in which a configuration is applied to a service providing apparatus according to a twelfth embodiment.

DETAILED DESCRIPTION

According to embodiment, A motion information processing apparatus comprising, an obtaining unit, a designating operation receiving unit, an analyzing unit and a display controlling unit. The obtaining unit configured to obtain motion information of a subject who performs a predetermined motion. The designating operation receiving unit configured to receive an operation to designate a site of the subject. The analyzing unit configured to calculate an analysis value related to a movement of the designated site by analyzing the motion information. The display controlling unit configured to display information based on the analysis value related to the movement of the designated site.

Exemplary embodiments of a motion information processing apparatus and a method are described below with reference to the accompanying drawings. Motion information processing apparatuses described below may be used alone or in a manner incorporated in a system, such as a medical chart system and a rehabilitation section system.

First Embodiment

Figure 1:
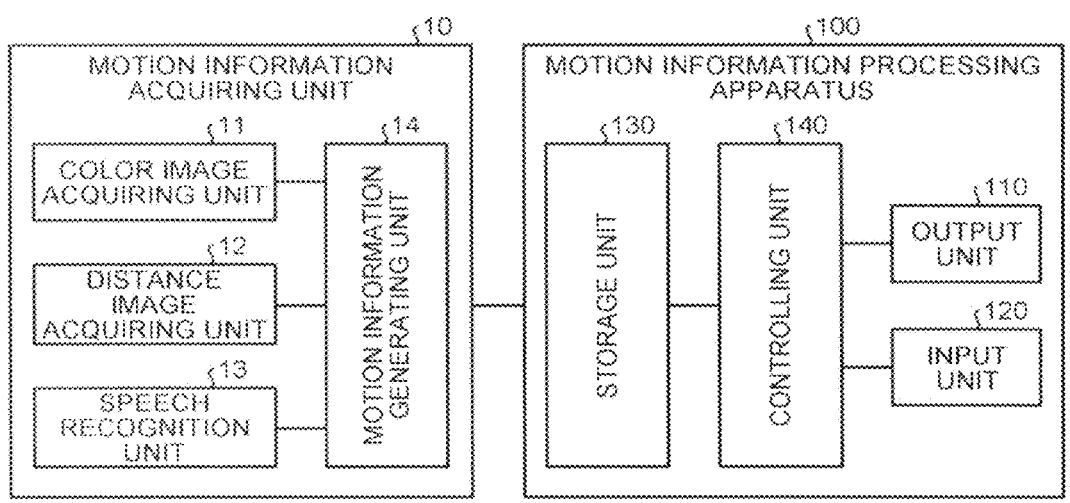
FIG. 1 is a diagram of an exemplary configuration of a motion information processing apparatus according to a first embodiment.

FIG. 1 is a diagram of an exemplary configuration of a motion information processing apparatus 100 according to a first embodiment. The motion information processing apparatus 100 according to the first embodiment is an apparatus that supports rehabilitation performed at medical institutions, home, and offices, for example. "Rehabilitation" means a technology and a method for enhancing potential of patients receiving long-term treatment for disabilities, chronic diseases, geriatric diseases, and the like to restore and improve vital functions and social functions of the patients. Such a technology and a method include functional training to restore and improve vital functions and social functions, for example. Examples of the functional training include gait training and range of joint motion exercises. A person serving as a target of rehabilitation is referred to as a "subject". Examples of the subject include sick persons, injured persons, elderly persons, and disabled persons. A person who assists the subject in rehabilitation is referred to as a "caregiver". Examples of the caregiver include medical professionals who work for medical institutions, such as doctors, physical therapists, and nurses, and care workers, families, and friends who care for the subject at home. Rehabilitation may be simply referred to as "rehab".

As illustrated in FIG. 1, the motion information processing apparatus 100 is connected to a motion information acquiring unit 10 in the first embodiment.

The motion information acquiring unit 10 detects a motion of a person, an object, or the like in a space where rehabilitation is performed, thereby acquiring motion information indicating the motion of the person, the object, or the like. The motion information will be described in detail in an explanation of processing of a motion information generating unit 14, which will be described later. The motion information acquiring unit 10 is Kinect (registered trademark), for example.

As illustrated in FIG. 1, the motion information acquiring unit 10 includes a color image acquiring unit 11, a distance image acquiring unit 12, a speech recognition unit 13, and the motion information generating unit 14. The configuration of the motion information acquiring unit 10 illustrated in FIG. 1 is given by way of example, and the embodiment is not limited thereto.

The color image acquiring unit 11 captures a photographic subject, such as a person and an object, in a space where rehabilitation is performed, thereby acquiring color image information. The color image acquiring unit 11, for example, detects light reflected by the surface of the photographic subject with a light receiving element and converts visible light into an electrical signal. The color image acquiring unit 11 then converts the electrical signal into digital data, thereby generating color image information of one frame corresponding to a capturing range. The color image information of one frame includes capturing time information and information in which each pixel contained in the frame is associated with an RGB (red, green, and blue) value, for example. The color image acquiring unit 11 generates color image information of a plurality of consecutive frames from visible light sequentially detected, thereby capturing the capturing range as video. The color image information generated by the color image acquiring unit 11 may be output as a color image in which the RGB values of respective pixels are arranged on a bit map. The color image acquiring unit 11 includes a complementary metal oxide semiconductor (CMOS) and a charge coupled device (CCD) as the light receiving element, for example.

The distance image acquiring unit 12 captures a photographic subject, such as a person and an object, in a space where rehabilitation is performed, thereby acquiring distance image information. The distance image acquiring unit 12, for example, irradiates the surroundings with infrared rays and detects reflected waves, which are irradiation waves reflected by the surface of the photographic subject, with a light receiving element. The distance image acquiring unit 12 then derives a distance between the photographic subject and the distance image acquiring unit 12 based on the phase difference between the irradiation waves and the reflected waves and a time from the irradiation to the detection. The distance image acquiring unit 12 thus generates distance image information of one frame corresponding to the capturing range. The distance image information of one frame includes capturing time information and information in which each pixel contained in the capturing range is associated with a distance between the photographic subject corresponding to the pixel and the distance image acquiring unit 12, for example. The distance image acquiring unit 12 generates distance image information of a plurality of consecutive frames from reflected waves sequentially detected, thereby capturing the capturing range as video. The distance image information generated by the distance image acquiring unit 12 may be output as a distance image in which the gray scales of colors corresponding to the distances of the respective pixels are arranged on a bit map. The distance image acquiring unit 12 includes a CMOS and a CCD as the light receiving element, for example. The light receiving element may be shared by the color image acquiring unit 11. The unit of distance calculated by the distance image acquiring unit 12 is the meter (m), for example.

The speech recognition unit 13 collects speech of the surroundings, identifies the direction of a sound source, and recognizes the speech. The speech recognition unit 13 includes a microphone array provided with a plurality of microphones and performs beam forming. Beam forming is a technology for selectively collecting speech travelling in a specific direction. The speech recognition unit 13, for example, performs beam forming with the microphone array, thereby identifying the direction of a sound source. The speech recognition unit 13 uses a known speech recognition technology, thereby recognizing a word from the collected speech. In other words, the speech recognition unit 13 generates information in which a word recognized by the speech recognition technology, the direction in which the word is output, and time at which the word is recognized are associated with one another as a speech recognition result, for example.

The motion information generating unit 14 generates motion information indicating a motion of a person, an object, or the like. The motion information is generated by considering a motion (gesture) of a person as a plurality of successive postures (poses), for example. Specifically, the motion information generating unit 14 performs pattern matching using a human body pattern. The motion information generating unit 14 acquires coordinates of respective joints forming a skeletal structure of a human body from the distance image information generated by the distance image acquiring unit 12. The coordinates of respective joints obtained from the distance image information are values represented by a coordinate system of a distance image (hereinafter, referred to as a "distance image coordinate system"). The motion information generating unit 14 then converts the coordinates of respective joints in the distance image coordinate system into values represented by a coordinate system of a three-dimensional space in which rehabilitation is performed (hereinafter, referred to as a "world coordinate system"). The coordinates of respective joints represented by the world coordinate system correspond to skeletal information of one frame. Skeletal information of a plurality of frames corresponds to motion information. The processing of the motion information generating unit 14 according to the first embodiment will be specifically described.

Figure 2A:
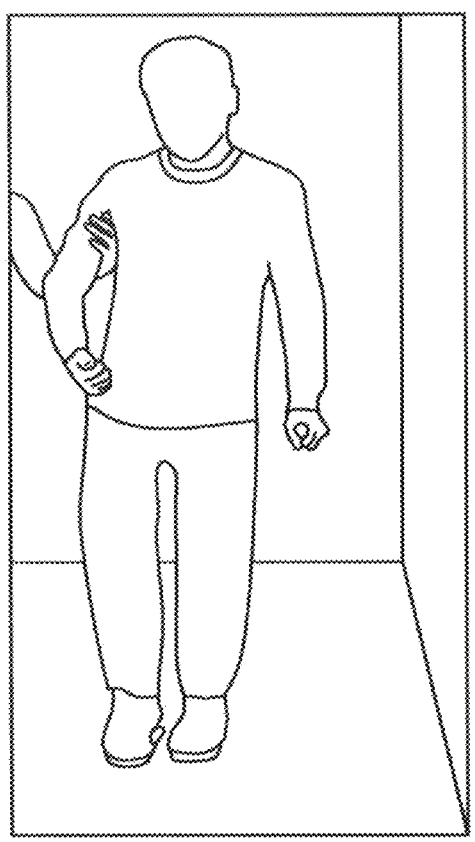
FIG. 2A is a drawing for explaining a process performed by a motion information generating unit according to the first embodiment.
Figure 2B:
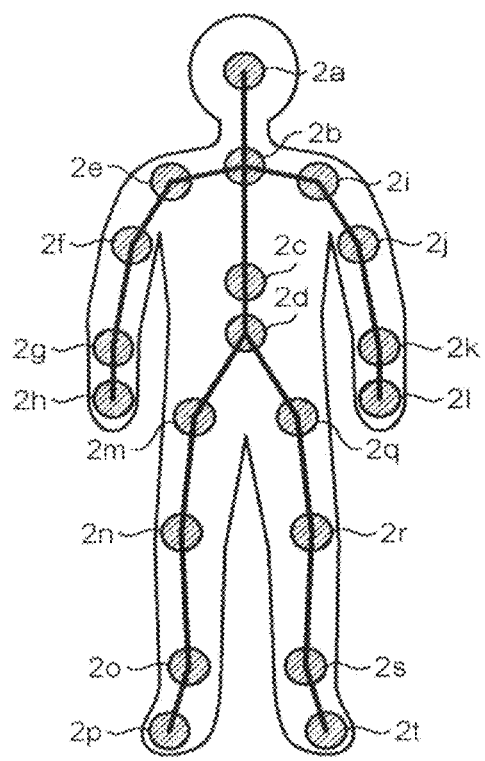
FIG. 2B is another drawing for explaining the process performed by the motion information generating unit according to the first embodiment.
Figure 2C:
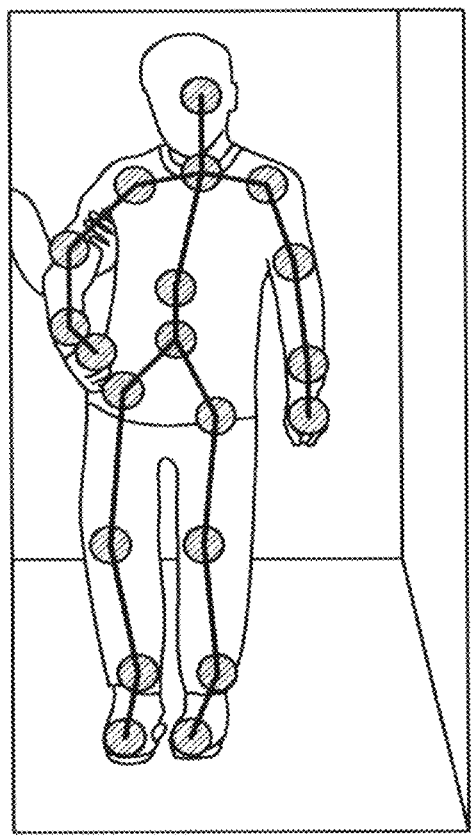
FIG. 2C is yet another drawing for explaining the process performed by the motion information generating unit according to the first embodiment.

FIG. 2A to FIG. 2C are views for explaining the processing of the motion information generating unit 14 according to the first embodiment. FIG. 2A illustrates an example of a distance image generated by the distance image acquiring unit 12. While FIG. 2A illustrates an image depicted with lines for convenience of explanation, an actual distance image is an image represented by the gray scales of colors corresponding to distances, for example. In the distance image, each pixel has a three-dimensional value in which a "pixel position X" in the horizontal direction of the distance image, a "pixel position Y" in the vertical direction of the distance image, and a "distance Z" between the photographic subject corresponding to the pixel and the distance image acquiring unit 12 are associated with one another. A coordinate value in the distance image coordinate system is hereinafter represented by the three-dimensional value (X, Y, Z).

In the first embodiment, the motion information generating unit 14 stores therein in advance a human body pattern corresponding to various postures by learning, for example. Every time the distance image acquiring unit 12 generates distance image information, the motion information generating unit 14 acquires the generated distance image information of each frame. The motion information generating unit 14 then performs pattern matching of the human body pattern with the acquired distance image information of each frame.

The human body pattern will now be described. FIG. 2B illustrates an example of the human body pattern. In the first embodiment, the human body pattern is a pattern used for pattern matching with the distance image information. The human body pattern is represented by the distance image coordinate system and has information on the surface of a human body (hereinafter, referred to as a "human body surface") similarly to the person depicted on the distance image. The human body surface corresponds to the skins of the person and the surfaces of clothes, for example. As illustrated in FIG. 2B, the human body pattern has information on joints forming the skeletal structure of the human body. In other words, a relative positional relation between the human body surface and each joint in the human body pattern is known.

In the example of FIG. 2B, the human body pattern has information on 20 joints from a joint 2a to a joint 2t. The joint 2a corresponds to the head, the joint 2b corresponds to the intermediate portion between the shoulders, the joint 2c corresponds to the waist, and the joint 2d corresponds to the center portion of the buttocks. The joint 2e corresponds to the right shoulder, the joint 2f corresponds to the right elbow, the joint 2g corresponds to the right wrist, and the joint 2h corresponds to the right hand. The joint 2i corresponds to the left shoulder, the joint 2j corresponds to the left elbow, the joint 2k corresponds to the left wrist, and the joint 2l corresponds to the left hand. The joint 2m corresponds to the right buttock, the joint 2n corresponds to the right knee, the joint 2o corresponds to the right ankle, and the joint 2p corresponds to the tarsus of the right foot. The joint 2q corresponds to the left buttock, the joint 2r corresponds to the left knee, the joint 2s corresponds to the left ankle, and the joint 2t corresponds to the tarsus of the left foot.

While the explanation has been made of the case where the body pattern has the information on 20 joints in FIG. 2B, the embodiment is not limited thereto. The positions and the number of joints may be optionally set by an operator. To grasp a change in a motion of the four limbs alone, for example, the information on the joint 2b and the joint 2c need not be acquired out of the joint 2a to the joint 2d. To grasp a change in a motion of the right hand in detail, joints of the fingers of the right hand may be further set besides the joint 2h. The joint 2a, the joint 2h, the joint 2l, the joint 2p, and the joint 2t in FIG. 2B correspond to distal ends of bones and are different from what is called a joint. Because the joints 2a, 2h, 2l, 2p, and 2t are important points indicating the positions and the directions of the bones, the joints 2a, 2h, 2l, 2p, and 2t are described herein as joints for convenience of explanation.

The motion information generating unit 14 performs pattern matching of the human body pattern with the distance image information of each frame. The motion information generating unit 14, for example, performs pattern matching of the human body surface of the human body pattern illustrated in FIG. 2B with the distance image illustrated in FIG. 2A, thereby extracting a person in a certain posture from the distance image information. Thus, the motion information generating unit 14 obtains the coordinates of the human body surface of the person extracted from the distance image. As described above, a relative positional relation between the human body surface and each joint in the human body pattern is known. The motion information generating unit 14 calculates the coordinates of the respective joints in the person from the coordinates of the human body surface of the person extracted from the distance image. As illustrated in FIG. 2C, the motion information generating unit 14 obtains the coordinates of the respective joints forming the skeletal structure of the human body from the distance image information. The obtained coordinates of the respective joints are coordinates in the distance coordinate system.

In the pattern matching, the motion information generating unit 14 may supplementarily use information indicating the positional relation of the joints. The information indicating the positional relation of the joints includes connection relations between joints (e.g., "the joint 2a and the joint 2b are connected") and ranges of motion of the respective joints, for example. A joint is a part connecting two or more bones. An angle formed by bones changes in association with a change in posture, and the range of motion varies depending on the joints. The range of motion is represented by the maximum value and the minimum value of the angle formed by bones connected by a joint, for example. The motion information generating unit 14 also learns the ranges of motion of the respective joints in the learning of the human body pattern, for example. The motion information generating unit 14 stores therein the ranges of motion in association with the respective joints.

The motion information generating unit 14 converts the coordinates of the respective joints in the distance image coordinate system into values represented by the world coordinate system. The world coordinate system is a coordinate system of a three-dimensional space where rehabilitation is performed. In the world coordinate system, the position of the motion information acquiring unit 10 is set as an origin, the horizontal direction corresponds to an x-axis, the vertical direction corresponds to a y-axis, and a direction orthogonal to the xy-plane corresponds to a z-axis, for example. The value of the coordinates in the z-axis direction may be referred to as a "depth".

The following describes the conversion processing from the distance image coordinate system to the world coordinate system. In the first embodiment, the motion information generating unit 14 stores therein in advance a conversion equation used for conversion from the distance image coordinate system to the world coordinate system. The conversion equation receives coordinates in the distance image coordinate system and an incident angle of reflected light corresponding to the coordinates and outputs coordinates in the world coordinate system, for example. The motion information generating unit 14, for example, inputs coordinates (X1, Y1, Z1) of a certain joint and an incident angle of reflected light corresponding to the coordinates to the conversion equation, thereby converting the coordinates (X1, Y1, Z1) of the certain joint into coordinates (x1, y1, z1) in the world coordinate system. Because the correspondence relation between the coordinates in the distance image coordinate system and the incident angle of reflected light is known, the motion information generating unit 14 can input the incident angle corresponding to the coordinates (X1, Y1, Z1) to the conversion equation. The explanation has been made of the case where the motion information generating unit 14 converts the coordinates in the distance image coordinate system into the coordinates in the world coordinate nate system. Alternatively, the motion information generating unit 14 can convert the coordinates in the world coordinate system into the coordinates in the distance image coordinate system.

The motion information generating unit 14 generates skeletal information from the coordinates of the respective joints represented by the world coordinate system. FIG. 3 is a diagram of an example of the skeletal information generated by the motion information generating unit 14. The skeletal information of each frame includes capturing time information of the frame and the coordinates of the respective joints. As illustrated in FIG. 3, the motion information generating unit 14 generates skeletal information in which joint identification information is associated with coordinate information, for example. In FIG. 3, the capturing time information is not illustrated. The joint identification information is identification information used to identify a joint and is set in advance. Joint identification information "2a" corresponds to the head, and joint identification information "2b" corresponds to the intermediate portion between the shoulders, for example. The other pieces of joint identification information similarly indicate respective joints corresponding thereto. The coordinate information indicates the coordinates of the respective joints in each frame in the world coordinate system.

In the first row of FIG. 3, the joint identification information "2a" is associated with coordinate information "(x1, y1, z1)". In other words, the skeletal information listed in FIG. 3 indicates that the head is present at the position of the coordinates (x1, y1, z1) in a certain frame. In the second row of FIG. 3, the joint identification information "2b" is associated with coordinate information "(x2, y2, z2)". In other words, the skeletal information listed in FIG. 3 indicates that the intermediate portion between the shoulders is present at the position of the coordinates (x2, y2, z2) in the certain frame. The other pieces of joint identification information similarly indicate that the joints are present at the positions of the respective coordinates in the certain frame.

Every time the motion information generating unit 14 receives the distance image information of each frame from the distance image acquiring unit 12, the motion information generating unit 14 performs pattern matching on the distance image information of each frame. The motion information generating unit 14 thus performs conversion from the distance image coordinate system to the world coordinate system, thereby generating the skeletal information of each frame. The motion information generating unit 14 then outputs the generated skeletal information of each frame to the motion information processing apparatus 100 and stores the skeletal information in a motion information storage unit, which will be described later.

The processing of the motion information generating unit 14 is not necessarily performed by the method described above. While the explanation has been made of the method in which the motion information generating unit 14 uses a human body pattern to perform pattern matching, the embodiment is not limited thereto. Instead of the human body pattern or in addition to the human body pattern, the motion information generating unit 14 may use a pattern of each part to perform pattern matching.

While the explanation has been made of the method in which the motion information generating unit 14 obtains the coordinates of the respective joints from the distance image information in the description above, for example, the present embodiment is not limited thereto. The motion information generating unit 14 may obtain the coordinates of respective joints using color image information in addition to the distance image information, for example. In this case, the motion information generating unit 14, for example, performs pattern matching of a human body pattern represented by a color image coordinate system with the color image information, thereby obtaining the coordinates of the human body surface from the color image information. The color image coordinate system has no information on "distance Z" included in the distance image coordinate system. The motion information generating unit 14 acquires the information on "distance Z" from the distance image information, for example. The motion information generating unit 14 then performs arithmetic processing using the two pieces of information, thereby obtaining the coordinates of the respective joints in the world coordinate system.

The motion information generating unit 14 outputs the color image information generated by the color image acquiring unit 11, the distance image information generated by the distance image acquiring unit 12, and the speech recognition result output from the speech recognition unit 13 to the motion information processing apparatus 100 as needed. The motion information generating unit 14 then stores the pieces of information in the motion information storage unit, which will be described later. Pixel positions in the color image information can be associated with pixel positions in the distance image information in advance based on the positions of the color image acquiring unit 11 and the distance image acquiring unit 12 and the capturing direction. As a result, the pixel positions in the color image information and the pixel positions in the distance image information can also be associated with the world coordinate system derived by the motion information generating unit 14. The association processing and the use of the distance (m) calculated by the distance image acquiring unit 12 makes it possible to calculate the height and the length of each part of the body (the length of the arm and the length of the abdomen) and to calculate the distance between two pixels specified on a color image. Similarly, the capturing time information of the color image information can be associated with the capturing time information of the distance image information in advance. The motion information generating unit 14 refers to the speech recognition result and the distance image information. If the joint 2a is present near the direction in which a word recognized as speech at certain time is spoken, the motion information generating unit 14 can output the word as a word spoken by a person having the joint 2a. The motion information generating unit 14 outputs the information indicating the positional relation of the joints to the motion information processing apparatus 100 as needed and stores the information in the motion information storage unit, which will be described later.

Further, the motion information generating unit 14 generates depth image information of one frame that corresponds to the image taking region, by using the depth represented by the value of the coordinate in the z-axis direction in the world coordinate system. The depth image information of the one frame includes, for example, image taking time information and information in which each of the pixels contained in the image taking region is kept in correspondence with the depth corresponding to the pixel. In other words, in the depth image information, the depth information is kept in correspondence with each of the pixels, instead of the distance information kept in correspondence with each of the pixels in the distance image information. The depth information is able to express each of the pixel positions by using a distance image coordinate system that is similar to the one used by the distance image information. The motion information generating unit 14 outputs the generated depth image information to the motion information processing apparatus 100, so that the depth image information is stored into the motion information storage unit 131 (explained later). Alternatively, the depth image information may be output as a depth image in which different shades of colors corresponding to the depths of the pixels are arranged in a bitmap.

In the explanation above, the example is explained in which the motion information acquiring unit 10 detects the motions of the single person (the subject). However, possible embodiments are not limited to this example. The motion information acquiring unit 10 may detect motions of multiple persons (subjects) as long as these subjects are included in the image taking region (the detection region) of the motion information acquiring unit 10. When an image of multiple persons is captured in distance image information of a single frame, the motion information acquiring unit 10 prepares motion information in which pieces of skeleton information of the multiple persons generated from the distance image information of the single frame are kept in correspondence with one another and outputs the motion information to the motion information processing apparatus 100.

The configuration of the motion information acquiring unit 10 is not limited to the configuration described above. In the case where the motion information is generated by detecting a motion of a person with another motion capture, such as an optical, a mechanical, or a magnetic motion capture, for example, the motion information acquiring unit 10 does not necessarily include the distance image acquiring unit 12. In this case, the motion information acquiring unit 10 includes markers attached to the human body so as to detect a motion of the person and a sensor that detects the markers as a motion sensor. The motion information acquiring unit 10 detects a motion of the person with the motion sensor, thereby generating the motion information. The motion information acquiring unit 10 uses the positions of the markers included in an image captured by the color image acquiring unit 11 to associate the pixel positions in the color image information with the coordinates in the motion information. The motion information acquiring unit 10 outputs the motion information to the motion information processing apparatus 100 as needed. In the case where the motion information acquiring unit 10 outputs no speech recognition result to the motion information processing apparatus 100, for example, the motion information acquiring unit 10 does not necessarily include the speech recognition unit 13.

While the motion information acquiring unit 10 outputs the coordinates in the world coordinate system as the skeletal information in the embodiment, the embodiment is not limited thereto. The motion information acquiring unit 10 may output the coordinates in the distance image coordinate system yet to be converted, for example. The conversion from the distance image coordinate system to the world coordinate system may be performed by the motion information processing apparatus 100 as needed.

Returning to the description of FIG. 1, the motion information processing apparatus 100 performs a process to aid rehabilitation (which hereinafter may be referred to as "rehab") by using the motion information output from the motion information acquiring unit 10. More specifically, when aiding the rehabilitation by using the motion information acquired by the motion information acquiring unit 10, the motion information processing apparatus 100 makes it easy and convenient to provide aids (in evaluating the rehabilitation) that are in accordance with each point of interest.

As explained above, various types of training are conventionally performed as the rehabilitation function training. For example, walking training, joint range-of-motion training, squat training, jump training, and the like are performed. Further, with regard to walking training, for example, diseases (e.g., orthopedic diseases, cerebral diseases) of the subjects and health care providers who are in charge may vary. In other words, in the actual sites of rehabilitation, the point of interest of rehabilitation will vary depending on various circumstances. Accordingly, when aiding rehabilitation, it is important to provide flexible aids that are in accordance with each of the points of interest, instead of providing uniform aids. In this regard, the motion information processing apparatus 100 according to the present embodiment is configured to make it easy and convenient to provide aids that are in accordance with each of the points of interest.

For example, the motion information processing apparatus 100 may be an information processing apparatus such as a computer, a workstation, or the like. As illustrated in FIG. 1, the motion information processing apparatus 100 includes an output unit 110, an input unit 120, a storage unit 130, and a controlling unit 140.

The output unit 110 is configured to output various types of information used for aiding rehabilitation while using the motion information of the subject who undergoes rehabilitation. For example, the output unit 110 outputs various types of processing results obtained by the controlling unit 140 (explained later). Further, for example, the output unit 110 displays a Graphical User Interface (GUI) used by an operator who operates the motion information processing apparatus 100 when inputting various types of requests through the input unit 120, displays display information such as an output image generated by the motion information processing apparatus 100, or outputs a warning sound. For example, the output unit 110 may be configured by using a monitor, a speaker, headphones, or the headphone portion of a headset. Further, the output unit 110 may be configured by using a display device that is designed to be attached to the body of the user, e.g., a goggle-type display device or a head-mount display device.

The input unit 120 is configured to receive inputs of various types of information used for aiding rehabilitation in accordance with each of the points of interest. For example, the input unit 120 receives inputs of various types of requests (e.g., a request indicating that a predetermined threshold value used for evaluating the gradual motion or the quick motion should be set; a request indicating that an evaluating process should be started; a request indicating that a selection should be made from various types of information; and a request indicating that a measuring process should be performed using the GUI) from the operator of the motion information processing apparatus 100 and transfers the received various types of requests to the motion information processing apparatus 100. For example, the input unit 120 may be configured by using a mouse, a keyboard, a touch command screen, a trackball, a microphone, or the microphone portion of a headset. Further, the input unit 120 designates a site of the subject by receiving an operation to designate the site of the subject. Alternatively, the input unit 120 may be a sensor configured to obtain biological information such as a blood pressure monitor, a heart rate monitor, a clinical thermometer, or the like. The input unit 120 may be referred to as a designating operation receiving unit.

The storage unit 130 is a semiconductor memory element, such as a random access memory (RAM) and a flash memory, or a storage device, such as a hard disk device and an optical disk device, for example. The control unit 140 is provided by an integrated circuit, such as an application specific integrated circuit (ASIC) and a field programmable gate array (FPGA), or a central processing unit (CPU) executing a predetermined computer program.

A configuration of the motion information processing apparatus 100 according to the first embodiment has thus been explained. The motion information processing apparatus 100 according to the first embodiment configured as described above makes it possible to evaluate rehabilitation in accordance with each of the points of interest, by using configurations described below in detail. In this situation, the motion information processing apparatus 100 of the present disclosure makes it possible to evaluate the rehabilitation in accordance with each of the points of interest, by making it easy and convenient to provide aids that are in accordance with each of the points of interest. Further, the motion information processing apparatus 100 of the present disclosure makes it possible to evaluate the rehabilitation in accordance with each of the points of interest, by evaluating various types of rehabilitation. In the exemplary embodiments described below, first to sixth embodiments will describe the motion information processing apparatus 100 configured to make it easy and convenient to provide aids that are in accordance with each of the points of interest, whereas seventh to tenth embodiments will describe the motion information processing apparatus 100 configured to evaluate various types of rehabilitation. After that, an eleventh embodiment will describe the motion information processing apparatus 100 that combine those.

Figure 4:
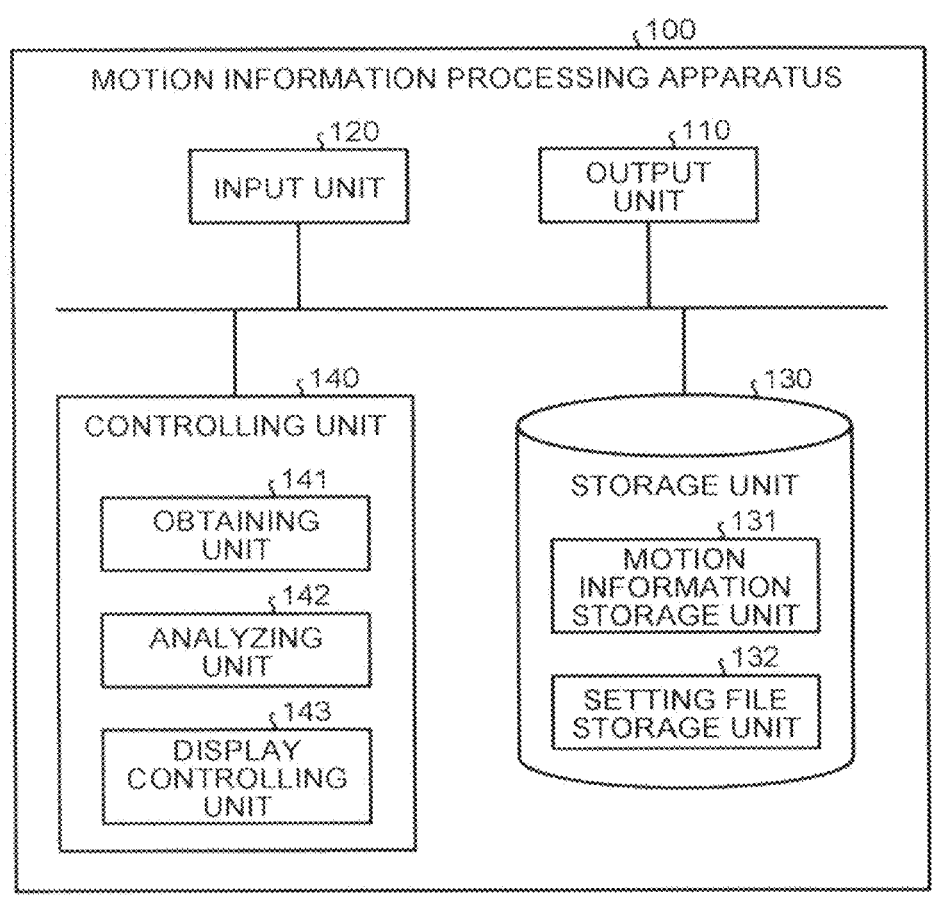
FIG. 4 is a diagram of an exemplary detailed configuration of the motion information processing apparatus according to the first embodiment.

First, exemplary embodiments of the motion information processing apparatus 100 configured to make it easy and convenient to provide aids that are in accordance with each of the points of interest will be explained. In the following embodiments, an example will be explained in which aids are provided for rehabilitation walking training. FIG. 4 is a diagram of an exemplary detailed configuration of the motion information processing apparatus 100 according to the first embodiment. First, the storage unit 130 included in the motion information processing apparatus 100 will be explained. As illustrated in FIG. 4, in the motion information processing apparatus 100, for example, the storage unit 130 includes the motion information storage unit 131 and a setting file storage unit 132.

The motion information storage unit 131 is configured to store therein the various types of information acquired by the motion information acquiring unit 10. More specifically, the motion information storage unit 131 stores therein the motion information generated by the motion information generating unit 14. Even more specifically, the motion information storage unit 131 stores therein the skeleton information corresponding to each of the frames generated by the motion information generating unit 14. In this situation, the motion information storage unit 131 may further store therein the color image information, the distance image information, and the speech recognition result that are output by the motion information generating unit 14, while keeping these pieces of information in correspondence with each of the frames.

FIG. 5 is a table of examples of the motion information stored in the motion information storage unit 131 according to the first embodiment. As illustrated in FIG. 5, the motion information storage unit 131 stores therein motion information in which, for each of the names, a name number, the date of training, and pieces of motion information are kept in correspondence with one another. In this situation, the "name number" is an identifier used for uniquely identifying the subject and is provided for each name. The "date of training" indicates the date on which the subject performed the walking training. The "motion information" represents the information acquired by the motion information acquiring unit 10.

For example, as illustrated in FIG. 5, the motion information storage unit 131 stores therein "Name: A; Name Number: 1; Date of Training: 20120801_1; Motion Information: color image information, distance image information, speech recognition result, skeleton information, . . . ". These pieces of information indicate that, as the motion information of the "first time" walking training performed by the person named "Name: A" of which the "Name Number" is "1" on "August 1st" in the year "2012", motion information including "color image information", "distance image information", "speech recognition result", and "skeleton information" is stored.

In this situation, in the motion information illustrated in FIG. 5, the "color image information", the "distance image information", the "speech recognition result", and the "skeleton information" for each of all the frames that were taken during the walking training are stored in time-series order, while being kept in correspondence with the time.

Further, as illustrated in FIG. 5, the motion information storage unit 131 stores therein "Name: A; Name Number: 1; Date of Training: 20120801_2; Motion Information: color image information, distance image information, speech recognition result, skeleton information, . . . ". In other words, the motion information storage unit 131 stores therein, in the same manner, the motion information of the "second time" walking training performed by the person named "Name: A" on "August 1st" in the year "2012".

Further, as illustrated in FIG. 5, the motion information storage unit 131 also stores therein motion information including "color image information", "distance image information", "speech recognition result", and "skeleton information", for the person identified as "Name: B; the Name Number: 2". As explained here, the motion information storage unit 131 stores therein the motion information of the walking training acquired for each of the subjects, while keeping the motion information in correspondence with each of the subjects. The motion information illustrated in FIG. 5 is merely an example. In other words, the motion information storage unit 131 may further store therein other information besides the "color image information", the "distance image information", the "speech recognition result", and the "skeleton information", while keeping the information in correspondence with one another. Further, for example, if the motion information acquiring unit 10 does not include the speech recognition unit 13, the motion information storage unit 131 stores therein information that includes no speech recognition result.

Further, the "color image information" and the "distance image information" included in the motion information contain image data in a binary format such as Bitmap, JPEG, or the like, or contain a link to such image data or the like. Further, instead of the recognition information described above, the "speech recognition result" included in the motion information may be audio data itself or a link to the recognition information or audio data.

The setting file storage unit 132 is configured to store therein a setting file stored by the controlling unit 140 (explained later). More specifically, the setting file storage unit 132 stores therein the setting file in which, for each of the points of interest, motion information to be obtained and contents of an analysis are kept in correspondence with each other. Details of the setting file will be explained later.

Next, details of the controlling unit 140 included in the motion information processing apparatus 100 will be explained. As illustrated in FIG. 4, in the motion information processing apparatus 100, for example, the controlling unit 140 includes an obtaining unit 141, an analyzing unit 142, and a display controlling unit 143.

The obtaining unit 141 is configured to obtain motion information of a subject who performs a predetermined motion. More specifically, the obtaining unit 141 obtains the motion information acquired by the motion information acquiring unit 10 and stored in the motion information storage unit 131. For example, the obtaining unit 141 obtains the color image information, the distance information, the speech recognition result, the skeleton information, and the like that are stored in the motion information storage unit 131 for each of the frames.

In this situation, the obtaining unit 141 obtains, from the motion information storage unit 131, motion information designated by using a designating part included in display information displayed by the output unit 110 under the control of the display controlling unit 143 (explained later). For example, the obtaining unit 141 obtains motion information in a position designated via the GUI displayed under the control of the display controlling unit 143. This process will be explained in detail later.

The analyzing unit 142 is configured to perform various types of analyses by using the motion information obtained by the obtaining unit 141. More specifically, the analyzing unit 142 calculates an analysis value related to a movement of the designated site by analyzing the motion information. More specifically, the analyzing unit 142 analyzes state information corresponding to a designating operation received by using the designating part included in the display information displayed by the output unit 110 under the control of the display controlling unit 143 (explained later). For example, the analyzing unit 142 analyzes the state of walking of a subject who performs walking training, by using the motion information in a position designated via the GUI displayed under the control of the display controlling unit 143. Details of the analysis performed by the analyzing unit 142 will be explained later.

The display controlling unit 143 is configured to display the display information based on the analysis value related to the movement of the designated site. More specifically, the display controlling unit 143 exercises control so that the output unit 110 displays the display information representing the analysis result (the analysis value) obtained from the analysis performed by the analyzing unit. Further, the display controlling unit 143 exercises control so as to cause display information to be displayed, the display information including the designating parts used for receiving a designating operation to designate such a piece state information that is to be displayed by the output unit 110, from among pieces of state information of the subject presented by using the motion information obtained by the obtaining unit 141. More specifically, the display controlling unit 143 exercises control so that the output unit 110 displays the display information (the information used for causing a site of the subject to be designated) used for designating a point of interest of an operator such as the subject or a health care provider during rehabilitation training. For example, as the information used for causing a site of the subject to be designated, the display controlling unit 143 exercises control so as to display information in which the designating part is arranged with at least one of image information of the subject and human body model information.

Figure 6A:
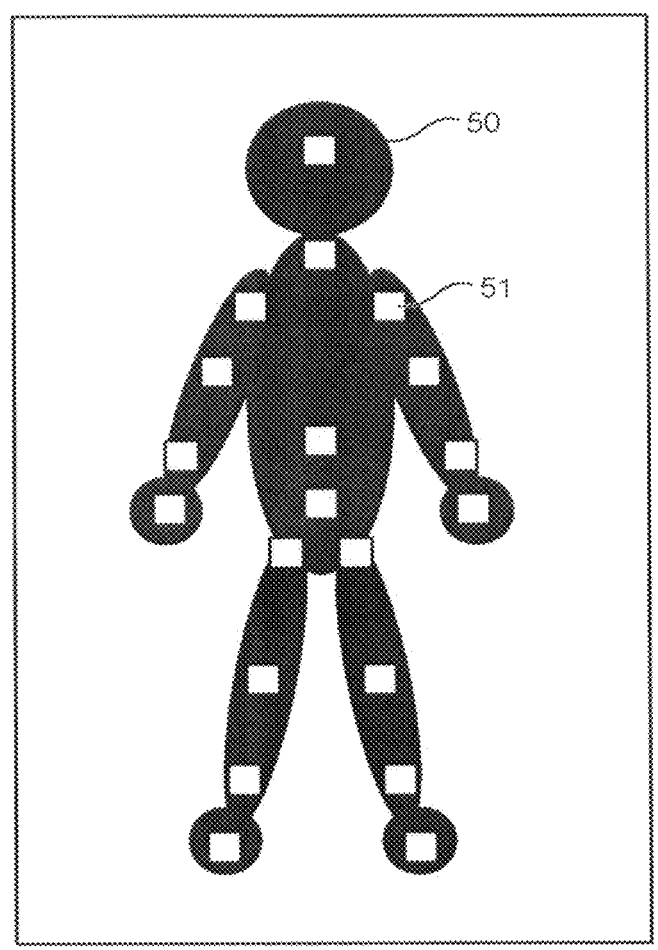
FIG. 6A is a drawing of an example of display information displayed by a display controlling unit according to the first embodiment.
Figure 6B:
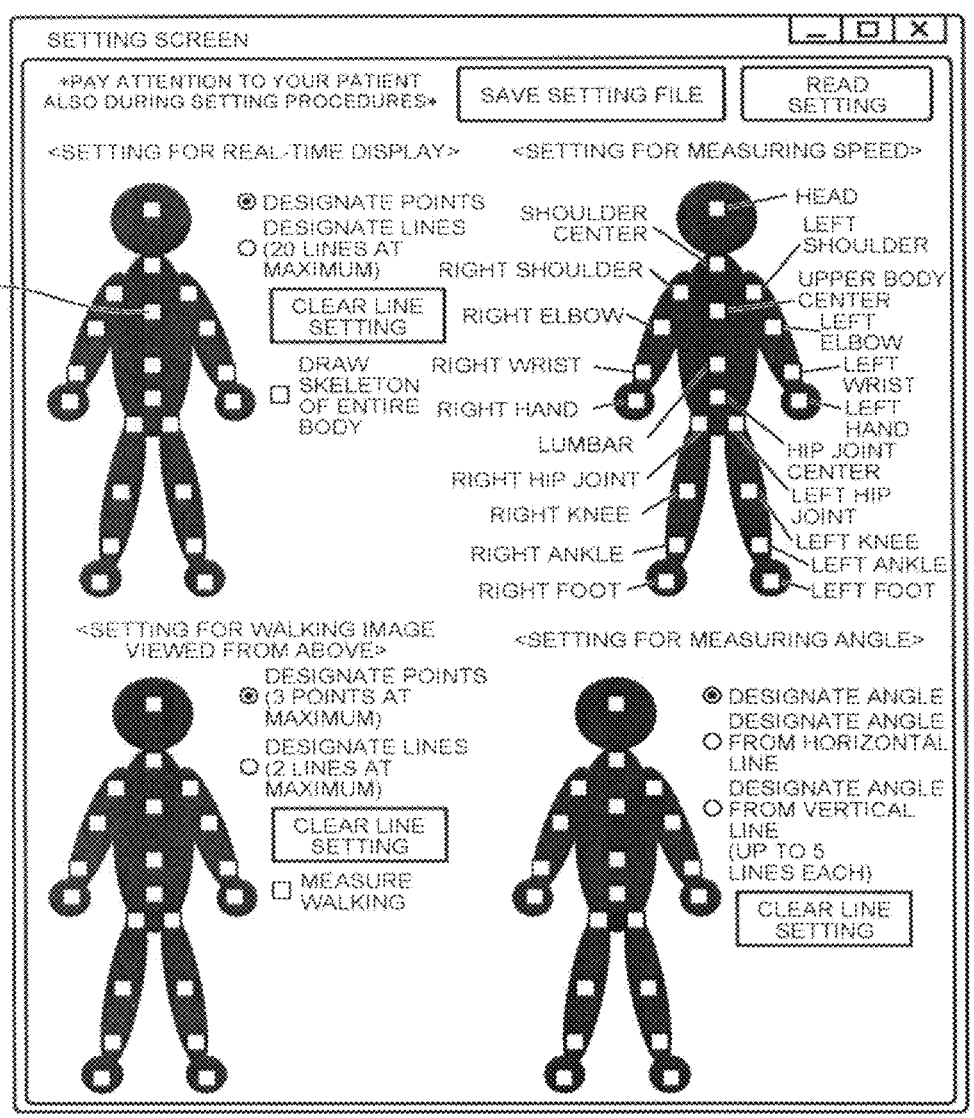
FIG. 6B is a drawing of another example of the display information displayed by the display controlling unit according to the first embodiment.

FIGS. 6A and 6B are drawings of examples of the display information displayed by the display controlling unit 143 according to the first embodiment. FIG. 6A illustrates an example of a human body model displayed by the display controlling unit 143. FIG. 6B illustrates an example of a window including human body models displayed by the display controlling unit 143. For example, as illustrated in FIG. 6A, the display controlling unit 143 causes the output unit 110 to display the display information in which a plurality of designating parts 51 are arranged with a human body model 50. The human body model 50 does not necessarily have to be configured as illustrated in the drawings, and it is acceptable to use a human body model of any of various types.

In one example, the display controlling unit 143 causes the output unit 110 to display the display information illustrated in FIG. 6A. In this situation, when the operator designates, via the input unit 120, any of the designating parts 51 included in the display information displayed by the output unit 110, the analyzing unit 142 analyzes various types of information of the designated position. In this situation, the designating parts 51 included in the display information illustrated in FIG. 6A correspond to the positions of the joints recognized by the motion information acquiring unit 10. In other words, from among the pieces of motion information acquired by the motion information acquiring unit 10, the analyzing unit 142 analyzes the various types of information by using such pieces of motion information of the joints in the positions corresponding to the designating parts 51 that were designated.

After that, as illustrated in FIG. 6B, for example, the display controlling unit 143 causes the output unit 110 to display, as the window including human body models, a window including human body models each of which corresponds to a setting for a real-time display, a setting for measuring a speed, a setting for a walking image viewed from above, a setting for measuring an angle, and the like. In this situation, the designating parts arranged with the human body models may be newly added or may be shifted to a different position. In other words, the input unit 120 receives an operation to arrange any of the designating parts in an arbitrary position of the human body model information. After that, the display controlling unit 143 exercises control so as to display information in which the designating part is arranged, in the position received by the input unit 120.

For example, as illustrated by the human body model in the upper left section of FIG. 6B, it is possible to add a new designating part 52 at the center of the upper body of the human body model. Further, it is possible to shift any of the designating parts illustrated in the drawings to an arbitrary position. For example, the operator is able to select a designating part to be shifted via the input unit 120 and to shift the selected designating part to a desired position by using cursor keys of the input unit 120 or is able to shift the selected designating part to a desired position by using arrow keys (not shown) arranged in the window. Alternatively, by performing a drag-and-drop operation on a designating part to be shifted, the operator is also able to shift the designating part to a desired position. In this situation, by shifting or adding a designating part to a position that is medically significant (e.g., the tiptoe of a foot, a gravity point, or the like), the operator is able to arrange the analysis performed by the analyzing unit 142 to have higher reliability.

Next, the settings using the human body models illustrated in FIG. 6B will be explained. First, the setting for a real-time display will be explained. As illustrated in FIG. 6B, in the setting for a real-time display, it is possible to select from between "designating points" and "designating lines", and further, it is possible to select "drawing the skeleton of the entire body". In other words, the designating parts arranged with the human body model are arranged with the human body model information in such a manner that a designating operation is performed on a predetermined position in the human body model information, in the form of at least one of a point and a line. Next, an example of the setting for a real-time display will be explained, with reference to FIG. 7. FIG. 7 is a drawing for explaining examples of the setting for a real-time display according to the first embodiment.

For example, as illustrated in FIG. 7(A), by using the human body model of the setting for a real-time display, the operator selects "designating points" via the input unit 120 and further designates the designating parts representing the two shoulders and the center of the upper body. In that situation, as illustrated in FIG. 7(B), the display controlling unit 143 causes the joints "2e" and "2i" corresponding to the two shoulders and the position "2u" corresponding to the center of the upper body to be displayed while being superimposed on an image of the subject who performs the walking training. After that, by using the human body model, the operator selects "designating lines" and designates the two shoulders and the left and right hip joints. In that situation, as illustrated in FIG. 7(B), the display controlling unit 143 causes a line connecting the joint "2e" to the joint "2i" and a line connecting the joint "2m" to the joint "2q" to be displayed while being superimposed on the image of the subject. When "drawing the skeleton of the entire body" is selected, all the skeleton information (the joints and lines connecting designated positions to joints) is displayed while being superimposed on the image of the subject.

In other words, in the setting for a real-time display, for example, it is possible to set the skeleton information to be superimposed on the real-time image of the subject who is performing the walking training or the like. In this situation, as explained above, the motion information processing apparatus 100 according to the first embodiment is able to shift the position of any of the designating parts to an arbitrary position and to add a new designating part. It is possible to perform these operations not only on the human body model but also on the image. For example, it is possible to shift the joints "2e" and "2i" corresponding to the two shoulders illustrated in FIG. 7(A) by using the cursor keys and to add a new point to the image.

Next, the setting for measuring a speed will be explained. As illustrated in FIG. 6(B), in the setting for measuring a speed, it is possible to arbitrarily designate designating parts such as joints and the center of the upper body. For example, when the operator designates a designating part arranged with the human body model via the input unit 120, the analyzing unit 142 analyzes a speed of the designated designating part. In one example, to analyze the speed, the analyzing unit 142 calculates a moving distance [m] indicating how much the coordinates corresponding to the designated designating part of the subject has moved for every predetermined time period (e.g., 0.5 seconds). After that, the analyzing unit 142 calculates a moving speed

[m/sec] of the subject for each of the predetermined time periods, on the basis of the calculated moving distance per predetermined time period.

In this situation, the analyzing unit 142 is also able to calculate an average value of moving speeds of the subject during the walking training, as a walking speed of the subject. In one example, the analyzing unit 142 calculates a moving speed of a site (e.g., one of the joints or a site of the body derived from joints) specified by the operator via the input unit 120, as a walking speed. In this situation, the analyzing unit 142 is also able to calculate acceleration by using the calculated speed. More specifically, the analyzing unit 142 calculates the acceleration (the rate of change in the speed per unit time period) by using the speed per unit time period calculated by using the abovementioned method. After that, the display controlling unit 143 causes the output unit 110 to display an analysis result.

Figure 8A:
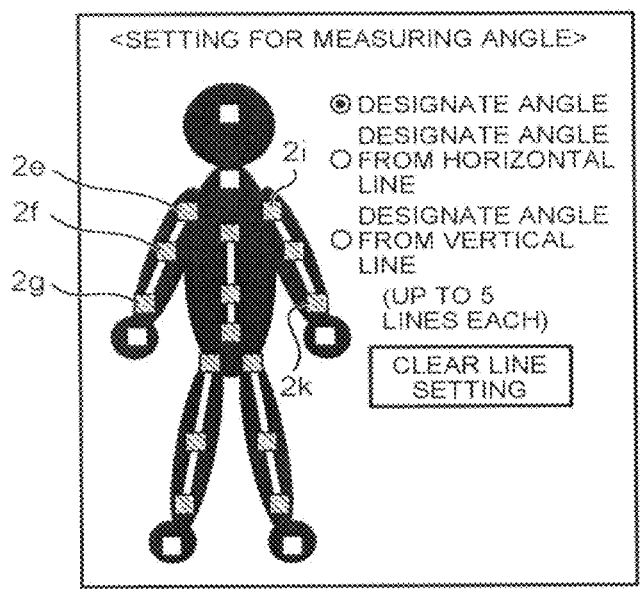
FIG. 8A is a drawing for explaining an example of a setting for measuring an angle according to the first embodiment.
Figure 8B:
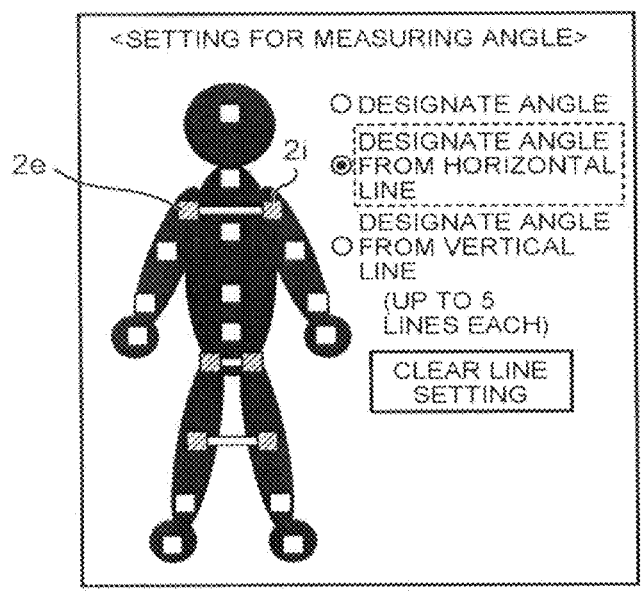
FIG. 8B is a drawing for explaining another example of the setting for measuring an angle according to the first embodiment.

Next, the setting for measuring an angle will be explained. As illustrated in FIG. 6B, in the setting for measuring an angle, it is possible to select from among "designating an angle", "designating an angle from a horizontal line", and "designating an angle from a vertical line". In other words, in the setting for measuring an angle, it is possible to make settings for measuring an angle formed by a plurality of designating parts and for measuring an angle of the subject with respect to a reference. Next, examples of the setting for measuring an angle will be explained, with reference to FIGS. 8A and 8B. FIGS. 8A and 8B are drawings for explaining the examples of the setting for measuring an angle according to the first embodiment. FIG. 8A illustrates an example in which a setting is made for measuring an angle formed by a plurality of designating parts. FIG. 8B illustrates an example in which a setting is made for measuring an angle of the subject with respect to a reference.

For example, to make a setting for measuring an angle formed by a plurality of designating parts, as illustrated in FIG. 8A, the operator selects "designating an angle" via the input unit 120 by using the human body model of the setting for measuring an angle and further designates designating parts serving as a target of the angle measuring process. In this situation, for example, when the operator designates three points of designating parts successively from the human body model, the angle of the position designated secondly is measured. In one example, when the operator sequentially designates the joint "2e", the joint "2f", and the joint "2g" illustrated in FIG. 8A, the analyzing unit 142 measures the angle of the joint "2f" that was designated secondly. In other words, the analyzing unit 142 measures the angle formed by the line (the bone) connecting the joint "2e" to the joint "2f" and the line (the bone) connecting the joint "2f" to the joint "2g".

Further, the setting method for making a setting for measuring an angle formed by a plurality of designating parts is not limited to the example described above. It is possible to make a setting by using any of various methods. For example, the operator may designate only such a designating part that serves as a target of the angle measuring process. In one example, the operator may cause the analyzing unit 142 to measure the angle formed by the line (the bone) connecting the joint "2e" to the joint "2f" and the line (the bone) connecting the joint "2f" to the joint "2g", by designating only the joint "2f" corresponding to the right elbow.

In yet another example, the analyzing unit 142 may measure the angle of a designating part that is positioned in the middle among three designating parts that are designated. In other words, for example, an arrangement is acceptable in which, when the operator has designated the designating parts of the joint "2e", the joint "2g", and the joint "2f" illustrated in FIG. 8A in the stated order, the analyzing unit 142 measures the angle of the joint "2f" that is positioned adjacent to the two of the three designating parts. Further, the three designating parts that are designated do not necessarily have to be three points that are positioned adjacent to one another. In other words, for example, an arrangement is acceptable in which, when the operator has designated the designating parts of the joint "2e", the joint "2i", and the joint "2k" illustrated in FIG. 8A in the stated order, the analyzing unit 142 measures the angle of the joint "2i" designated secondly. The number of designating parts to be designated does not necessarily have to be three. It is acceptable to designate four or more designating parts.

In contrast, to make the setting for measuring an angle of the subject with respect to a reference, as illustrated in FIG. 8B, the operator selects, for example, "designating an angle from a horizontal line" via the input unit 120 by using the human body model of the setting for measuring an angle and further designates designating parts serving as a target of the angle measuring process. In this situation, for example, when the operator designates two points of designating parts successively from the human body model, the angle of a designated position with respect to a reference is measured. In one example, when the operator selects "designating an angle from a horizontal line" and subsequently designates the joint "2e" and the joint "2i" illustrated in FIG. 8B, the analyzing unit 142 measures the angle of the line connecting the joint "2e" to the joint "2i" with respect to the horizontal direction. In other words, the analyzing unit 142 measures the angle formed by the line (the bone) connecting the joint "2e" to the joint "2f" and the line (the bone) connecting the joint "2f" to the joint "2g". When "designating an angle from a vertical line" is selected, the angle measuring process is performed in the same manner as described above.

Figure 9A:
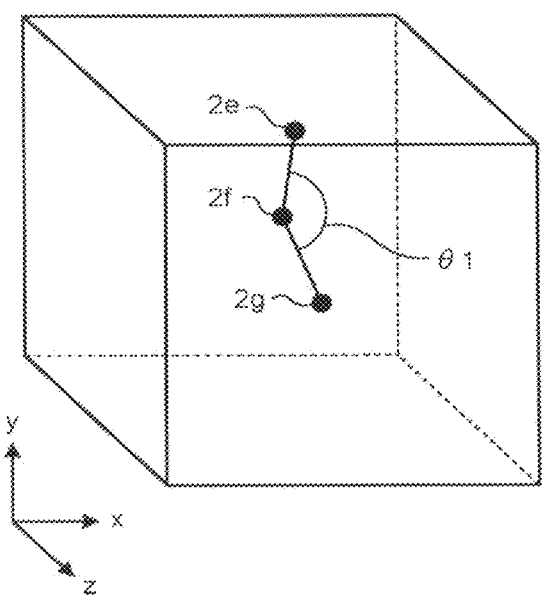
FIG. 9A is a drawing for explaining an example of an angle measuring process performed by an analyzing unit according to the first embodiment.
Figure 9B:
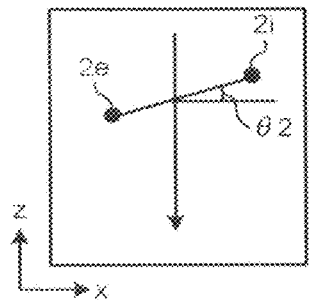
FIG. 9B is a drawing for explaining another example of the angle measuring process performed by the analyzing unit according to the first embodiment.
Figure 9C:
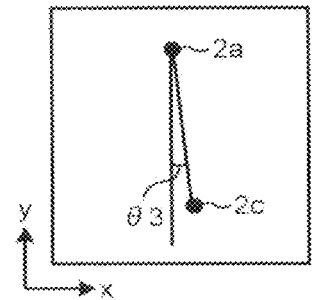
FIG. 9C is a drawing for explaining yet another example of the angle measuring process performed by the analyzing unit according to the first embodiment.
Figure 9D:
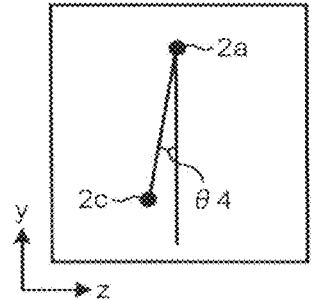
FIG. 9D is a drawing for explaining yet another example of the angle measuring process performed by the analyzing unit according to the first embodiment.

Next, the angle measuring process performed by the analyzing unit 142 will be explained. FIGS. 9A to 9D are drawings for explaining examples of the angle measuring process performed by the analyzing unit 142 according to the first embodiment. FIG. 9A illustrates an example in which an angle formed by a plurality of designating parts is measured. FIGS. 9B to 9D illustrate examples in which an angle of the subject with respect to a reference is measured.

For example, as illustrated in FIG. 9A, the analyzing unit 142 calculates an angle "θ1" formed by the line (the bone) connecting the joint "2e" corresponding to the right shoulder to the joint "2f" corresponding to the right elbow and the line (the bone) connecting the joint "2f" corresponding to the right elbow to the joint "2g" corresponding to the right wrist. In other words, the analyzing unit 142 analyzes the angle of the right arm (the right elbow) of the subject. In that situation, the analyzing unit 142 calculates a straight line that passes through the coordinate information (x5,y5,z5) of the joint "2e" corresponding to the right shoulder and the coordinate information (x6,y6,z6) of the joint "2f" corresponding to the right elbow in a predetermined frame. Further, the analyzing unit 142 calculates a straight line that passes through the coordinate information (x6,y6,z6) of the joint "2f" corresponding to the right elbow and the coordinate information (x7,y7,z7) of the joint "2g" corresponding to the right wrist. After that, the analyzing unit 142 calculates the angle formed by the two calculated straight lines as the angle "θ1".

Further, as illustrated in FIG. 9B, for example, the analyzing unit 142 calculates an angle "θ2" of the axis from the joint "2e" corresponding to the right shoulder to the joint "2*i*" corresponding to the left shoulder, with respect to the horizontal direction on the x-z plane. In that situation, the analyzing unit 142 calculates a straight line that passes through the coordinate information (x5,z5) of the joint "2*e*" corresponding to the right shoulder and the coordinate information (x9,z9) of the joint "2*i*" corresponding to the left shoulder in a predetermined frame and further calculates the angle formed by the calculated straight line and a straight line parallel to the x-axis as the angle "θ2". In other words, the analyzing unit 142 calculates a degree of deviation of the body in a rotation direction centered on the body axis, as the subject is viewed from above. Although not shown in the drawings, the analyzing unit 142 is also capable of calculating various angles with respect to the advancing direction of the walk indicated with an arrow in FIG. 9B.

In another example, as illustrated in FIG. 9C, the analyzing unit 142 calculates an angle "θ3" of the axis (the body axis) from the joint "2*a*" corresponding to the head to the joint "2*c*" corresponding to the lumbar, with respect to the vertical direction on the x-y plane. In that situation, the analyzing unit 142 calculates a straight line that passes through the coordinate information (x1,z1) of the joint "2*a*" corresponding to the head and the coordinate information (x3,z3) of the joint "2*c*" corresponding to the lumbar in a predetermined frame and further calculates the angle formed by the calculated straight line and a straight line parallel to the y-axis as the angle "θ3". In other words, the analyzing unit 142 calculates the degree of the left-right angle (the left-right angle for the subject), as the subject is viewed from the front.

In yet another example, as illustrated in FIG. 9D, the analyzing unit 142 calculates an angle "θ4" of the axis (the body axis) from the joint "2*a*" corresponding to the head to the joint "2*c*" corresponding to the lumbar, with respect to the vertical direction on the y-z plane. In that situation, the analyzing unit 142 calculates a straight line that passes through the coordinate information (y1,z1) of the joint "2*a*" corresponding to the head and the coordinate information (y3,z3) of the joint "2*c*" corresponding to the lumbar in a predetermined frame and further calculates the angle formed by the calculated straight line and a straight line parallel to the γ-axis as the angle "θ4". In other words, the analyzing unit 142 calculates the degree of the left-right angle (the front-back angle for the subject) as the subject is viewed from a side.

Returning to the description of FIG. 6B, the setting for a walking image viewed from above will be explained. As illustrated in FIG. 6B, in the setting for a walking image viewed from above, it is possible to select from among "designating points", "designating lines", and "measuring walking". In other words, in the setting for a walking image viewed from above, it is possible to make a setting for analyzing local state information or state information of the entire body of the subject during walking training. In the present example, the designation of designating parts performed by the operator in the setting for a walking image viewed from above is the same as the setting for a real-time display described above. In this situation, when the operator designates one or more designating parts by using the human body model of the setting for a walking image viewed from above illustrated in FIG. 6B, the analyzing unit 142 performs various analysis related to the designated designating parts, with respect to the subject who is performing walking training. For example, the analyzing unit 142 calculates x-coordinate values and y-coordinate values of the designated designating parts, to display a walking image viewed from above with respect to the designated designating parts.

Further, for example, if "measuring walking" is selected in the setting for a walking image viewed from above illustrated in FIG. 6B, the analyzing unit 142 analyzes state information of the walking that is set in advance. For example, the analyzing unit 142 calculates landing points of the feet of the subject or calculates a speed or an angle of the designating parts that is set in advance. The setting for the analysis that is performed when "measuring walking" is selected may arbitrarily be made. Next, an example in which the analyzing unit 142 calculates landing points of the feet will be explained, with reference to FIG. 10. FIG. 10 is a drawing for explaining the example in which the analyzing unit 142 according to the first embodiment calculates landing points of the feet.

For example, the analyzing unit 142 calculates landing points where the feet of the subject landed on the ground by using the skeleton information for each of the frames obtained by the obtaining unit 141. For example, the analyzing unit 142 calculates the landing points by using the coordinate information of the joints corresponding to sites of the feet included in the skeleton information of the subject who is performing the walking training. In one example, the analyzing unit 142 calculates the landing points of the subject by using the coordinate information of the joint "2*p*" corresponding to the right tarsus and the joint "2*t*" corresponding to the left tarsus. For example, the analyzing unit 142 obtains the z-coordinate values of the joint "2*p*" corresponding to the right tarsus and the joint "2*t*" corresponding to the left tarsus from each of all the frames and, as illustrated in FIG. 10, plots the obtained z-coordinate values into a chart in which the vertical axis expresses the coordinate values, whereas the horizontal axis expresses time.

In other words, as illustrated in FIG. 10, the analyzing unit 142 calculates a curve 21 indicating chronological changes in the z-coordinate of the left tarsus and a curve 22 indicating chronological changes in the z-coordinate of the left tarsus. After that, for example, from each of the curves, the analyzing unit 142 determines a point in time when the change in the z-coordinate value per unit time period is equal to or smaller than a predetermined threshold value, as the point in time when the foot landed on the ground.

For example, as illustrated in FIG. 10, from the curve 21 indicating the chronological changes in the z-coordinate of the left tarsus, the analyzing unit 142 determines a point in time 31 when the change in the coordinate per unit time period is equal to or smaller than the predetermined threshold value, as the point in time when the foot landed on the ground. Similarly, as illustrated in FIG. 10, from the curve 22 indicating the chronological changes in the z-coordinate of the right tarsus, the analyzing unit 142 determines a point in time 32 when the change in the coordinate per unit time period is equal to or smaller than the predetermined threshold value, as the point in time when the foot landed on the ground. The analyzing unit 142 then outputs the skeleton information of the frames corresponding to the points in time when the feet were determined to have landed on the ground, to the display controlling unit 143.

The example described above is merely an example, and the coordinates that can be used are not limited to those described in the above example. In other words, it is acceptable to use not only the z-coordinates of the tarsi, but also z-coordinates of the ankles or z-coordinates of the knees, for example. Further, it is also acceptable to perform a judging process comprehensively by using changes in the z-coordinates of not only a single type of joints, but two types of joints such as the tarsi and the knees. Further, the coordinates that can be used are not limited to z-coordinates, and it is acceptable to use y-coordinates or x-coordinates, for example.

In one example, when using y-coordinates, the analyzing unit 142 judges whether each foot has landed on the ground on the basis of the y-coordinate values of different joints (the heights of the joints). In other words, if the y-coordinate values of the joints are smaller than a predetermined threshold value, the analyzing unit 142 determines that the foot has landed on the ground. The predetermined threshold value may arbitrarily be set for each of the joints. When using x-coordinates, if the x-coordinate values are substantially constant, the analyzing unit 142 determines that the foot has landed on the ground. In other words, while the subject is walking, although the x-coordinate value of the joint of the foot that is on the ground hardly changes, the x-coordinate value of the foot that is in the air changes in small increments/decrements. Accordingly, the analyzing unit 142 determines that the foot is on the ground when the x-coordinate value is substantially constant.

Further, it is also acceptable to perform a judging process by comprehensively using a plurality of coordinates. For example, it is acceptable to analyze changes in the z-coordinate and changes in the y-coordinate and to judge whether the foot is on the ground on the basis of each of the analysis results. Further, it is also acceptable to add a predetermined coefficient to each of the coordinate values. For example, it is acceptable to perform the judging process by adding a coefficient "α" to y-coordinate values.

Further, as described above, the analyzing unit 142 is also capable of judging not only whether the foot has landed, but also whether the foot is in the air. In one example, if the change in the z-coordinate value per unit time period exceeds a predetermined threshold value, the analyzing unit 142 determines that the foot is in the air. In another example, if the y-coordinate value exceeds a predetermined threshold value, the analyzing unit 142 determines that the foot is in the air. In yet another example, if the x-coordinate value changes in small increments/decrements, the analyzing unit 142 determines that the foot is in the air. Subsequently, the analyzing unit 142 determines that the other foot that is different from the foot determined to be in the air is on the ground. For example, the analyzing unit 142 is able to determine that, during walking, if the right foot is in the air, the left foot is on the ground. Further, another arrangement is acceptable in which, by inputting the coordinates of the ground into a system in advance, the analyzing unit 142 determines that the foot is on the ground when the foot comes close to the coordinates of the ground.

As explained above, the analyzing unit 142 analyzes the positions (the coordinates) of the landing points of the feet. Further, on the basis of the positions of the landing points obtained from the analysis, the analyzing unit 142 analyzes, for example, a stride distance, a step length, a step width, the number of steps, a cadence value, a walking time period, and a time period during which each foot is on the ground. In other words, the analyzing unit 142 analyzes the various types of information above by using the coordinates of the landing points. In this situation, the analyzing unit 142 is able to calculate the stride distance, the step length, the step width, and the like, while using the walking direction as a reference.

The above example is explained by using the situation where the subject walks in the depth direction (the z-axis direction) (i.e., walks along the z-axis). However, the walking direction of the subject is arbitrary, and the analyzing unit 142 is capable of responding to any arbitrary walking direction. In other words, the analyzing unit 142 is capable of analyzing the advancing direction of the walking of the subject and determining the landing points of the feet by using the method described above. Further, if "measuring walking" is selected in the setting for a walking image viewed from above, the analyzing unit 142 also analyzes an angle and a speed of a position corresponding to a predetermined designating part. The method used for analyzing the angle and the speed is the same as above.

During the process performed by the analyzing unit 142 described above, if the designating part is a designating part that is newly added or that has been shifted, the analyzing unit 142 is able to perform the various types of processes described above, by using information about a relative positional relationship between the added position (or the shifted position) and a designating part positioned in the surrounding thereof. For example, when a designating part is newly added, the analyzing unit 142 calculates the coordinates of the added position on the basis of information about a positional relationship with a designating part positioned adjacent to the added position and further performs the various types of processes described above by using the calculated coordinates.

As explained above, the motion information processing apparatus 100 according to the first embodiment displays the window illustrated in FIG. 6B on the output unit 110, so that the desired setting can be made by each of the operators. Accordingly, the motion information processing apparatus 100 makes it easy and convenient to provide the aids that are in accordance with each of the points of interest. In this situation, in the window illustrated in FIG. 6B, it is possible to provide a "clear the line setting" button used for clearing lines that are set; a "save the setting file" button used for saving a setting; and a "read a setting" button used for reading a setting, as illustrated in FIG. 6B.

For example, when the operator has designated various designating parts and wishes to save the current setting, the operator presses the "save setting file" button displayed in the upper right section of the window, as illustrated in FIG. 11. As a result, a save window will appear, and the operator will be able to save the current setting as a setting file with a file name. In other words, the controlling unit 140 stores the current setting into the setting file storage unit 132, while keeping the current setting in correspondence with the input file name. In this situation, it is possible to have setting files stored for each of the operators (e.g., medical doctors, caregivers, or subjects), for each of the diseases (e.g., orthopedic diseases, cerebral diseases), for each of the training menu items (e.g., walking training, joint range-of-motion training, squat training, jump training), or for each of the sites of the body (e.g., the Knees, the arms). In one example, in a setting file, the following may be stored in correspondence with walking training: the designation of the whole feet and the center of the upper body in the setting for a real-time display; the designation of the center of the upper body in the setting for measuring a speed; and the designation of the angle formed by the two shoulders and the horizontal direction in the setting for measuring an angle.

Further, when the operator presses the "read a setting" button displayed in the upper right section of the window, a read window will appear. By selecting a desired setting file on the basis of displayed file names and pressing the "open button", the operator is able to cause the selected setting file to be read. FIG. 11 is a drawing for explaining an example of the setting file saving and reading processes according to the first embodiment.

Further, in the window used for performing the various designating processes, other various types of information may be displayed. For example, as illustrated in FIGS. 6B and 11, it is also possible to display an important notice such as "*pay attention to your patient also during setting procedures*" or the maximum number of points or lines (e.g., 20 lines at maximum, 3 points at maximum, up to 5 lines) that can be designated in each setting.

Figure 12:
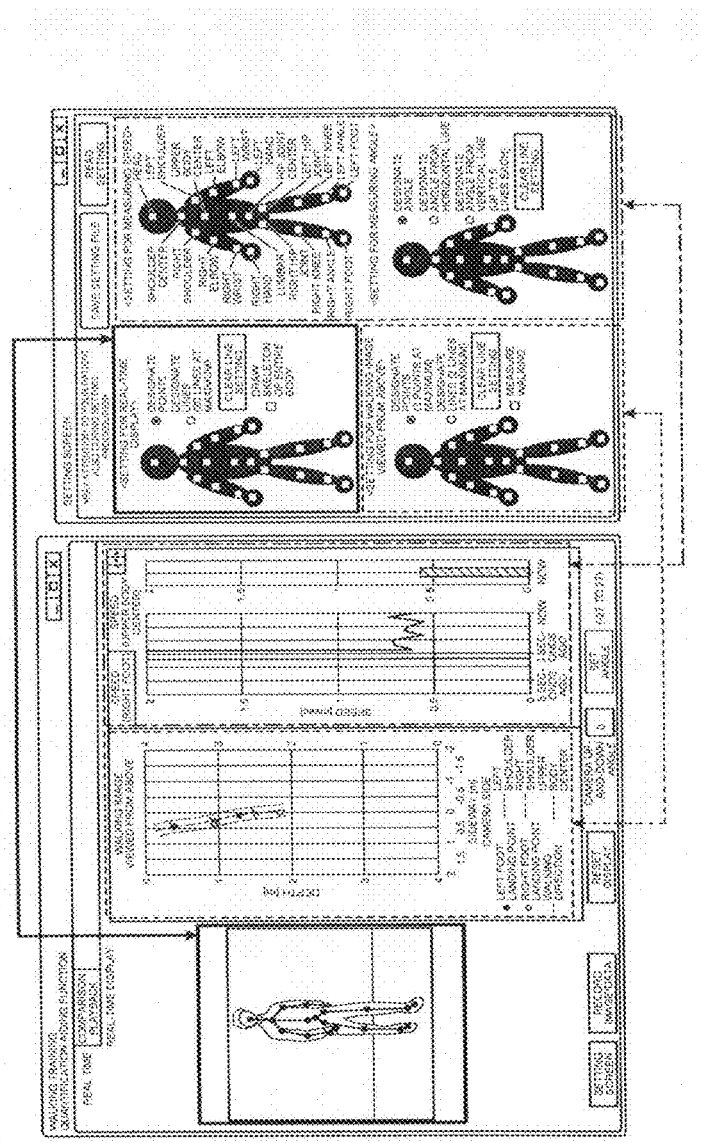
FIG. 12 is a drawing of an example of an aiding application according to the first embodiment.

Next, an example of an application to which the window described above is applied will be explained, with reference to FIG. 12. FIG. 12 is a drawing of an example of an aiding application according to the first embodiment. FIG. 12 illustrates the example of the aiding application used for aiding walking training. For example, as illustrated in the window on the left side of FIG. 12, the display controlling unit 143 displays, on the output unit 110, a window that includes a "real time" tab and a "comparison playback" tab and that has a display region used for the color image information and various types of analysis information.

The operator causes a setting window illustrated on the right side of FIG. 12 to be displayed, by pressing the "setting screen" button arranged in the lower left section of the window. After that, the operator causes the skeleton information to be displayed in a real-time manner, causes a walking image viewed from above to be displayed, or causes the analysis information such as a speed or an angle to be displayed, by designating one or more designating parts with respect to a desired setting selected from the displayed setting window. In this situation, as illustrated in FIG. 12, for example, the display controlling unit 143 causes a display image to be displayed in the region for a real-time display, the display image having the skeleton information superimposed on the color image. Further, as illustrated in FIG. 12, for example, the display controlling unit 143 displays, in the region for a walking image viewed from above, the landing points of the left and right feet, movement loci of the left and right shoulders and the center of the upper body, and line segments connecting the left and right shoulders together, on a plane expressing the sideway direction and the depth direction. Further, as illustrated in FIG. 12, for example, the display controlling unit 143 displays, in the region for the analysis information, information about the speed, information about the angle, and the like for each of the sites such as the right foot, the center of the upper body, and the like. The aiding application illustrated in FIG. 12 is merely an example, and possible embodiments are not limited to this example.

Figure 13:
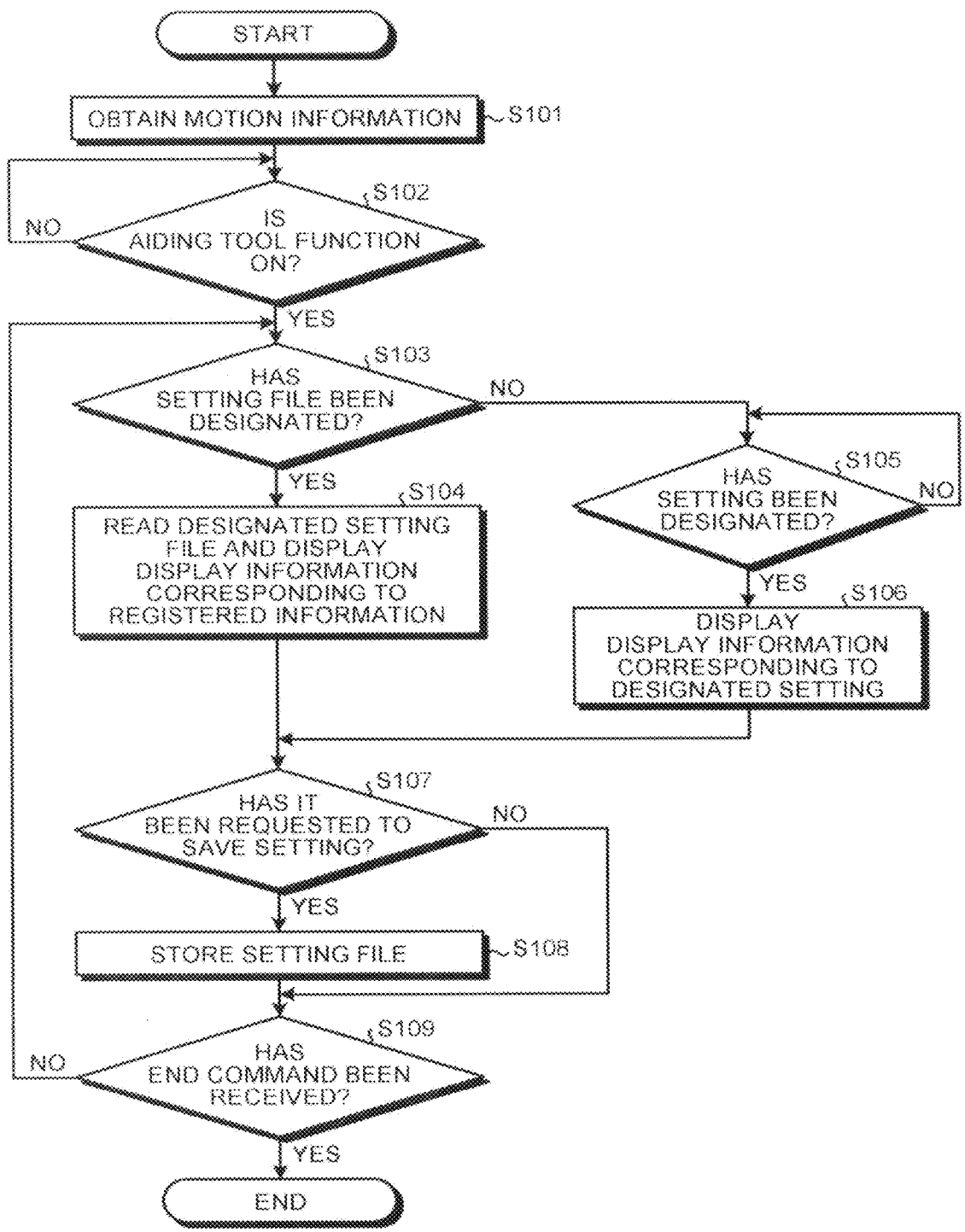
FIG. 13 is a flowchart of a procedure in a process performed by the motion information processing apparatus according to the first embodiment.

Next, a process performed by the motion information processing apparatus 100 according to the first embodiment will be explained, with reference to FIG. 13. FIG. 13 is a flowchart of a procedure in the process performed by the motion information processing apparatus 100 according to the first embodiment. As illustrated in FIG. 13, in the motion information processing apparatus 100 according to the first embodiment, when the obtaining unit 141 has obtained motion information of a subject (step S101), the display controlling unit 143 judges whether the aiding function tool is on (step S102).

If the aiding function tool is on (step S102: Yes), the display controlling unit 143 judges whether a setting file has been designated (step S103). If a setting file has been designated (step S103: Yes), the analyzing unit 142 reads the designated setting file and performs an analysis corresponding to the registered information, and the display controlling unit 143 displays display information including an analysis result obtained by the analyzing unit 142 (step S104).

On the contrary, if no setting file has been designated (step S103: No), the display controlling unit 143 judges whether a setting has been designated (step S105). If a setting has been designated (step S105: Yes), the analyzing unit 142 performs an analysis corresponding to the designated setting, and the display controlling unit 143 displays display information including an analysis result obtained by the analyzing unit 142 (step S106).

After that, the controlling unit 140 judges whether it has been requested to save the setting (step S107). If it has been requested to save the setting (step S107: Yes), the controlling unit 140 stores the setting file (step S108). After the setting file is stored or if it has not been requested to save the setting (step S107: No), the controlling unit 140 judges whether an end command has been received (step S109).

If no end command has been received (step S109: No), the process returns to step S103, so that the display controlling unit 143 judges whether a setting file has been designated (step S103). On the contrary, if an end command has been received (step S109: Yes), the motion information processing apparatus 100 ends the process.

As explained above, according to the first embodiment, the obtaining unit 141 obtains the motion information of the subject who performs the predetermined motion. The input unit 120 designates the sites of the subject. The analyzing unit 142 calculates the analysis values related to the movements of the designated sites by analyzing the motion information. The display controlling unit 143 displays the display information based on the analysis values related to the movements of the designated sites. Further, the display controlling unit 143 exercises control so as to cause the display information to be displayed, the display information including the designating parts used for receiving the designating operation to designate such a piece of state information that is to be displayed by the output unit 110, from among the pieces of state information of the subject presented by using the motion information obtained by the obtaining unit 141. Consequently, the motion information processing apparatus 100 according to the first embodiment facilitates the operation to cause the state information of the subject in which the operator is interested to be displayed. The motion information processing apparatus 100 thus makes it easy and convenient to provide the aids that are in accordance with each of the points of interest.

As a result, the motion information processing apparatus 100 facilitates a clinically useful evaluation, for each of the diseases, for each of the types of training, or for each of the health care providers. Thus, the motion information processing apparatus 100 thus makes it possible to provide the aids that are effective for rehabilitation training, exercise training, or the like. For example, the motion information processing apparatus 100 is able to provide health care providers with an evaluation method that is useful for each patient. In other words, the motion information processing apparatus 100 is able to recommend the health care providers what is the best way to evaluate each of their patients.

Further, according to the first embodiment, the display controlling unit 143 exercises control so as to display, as the information used for causing one or more sites of the subject to be designated, the information in which the designating parts are arranged with at least one of the image information of the subject and the human body model information. Consequently, the motion information processing apparatus 100 according to the first embodiment makes it possible for the operator to easily understand the points of interest.

Further, according to the first embodiment, the input unit 120 receives the operation to arrange a designating part in the arbitrary position of the image information of the subject and the human body model information. The display controlling unit 143 exercises control so as to display the display information in which the designating part is arranged in the position received by the input unit 120. Consequently, the motion information processing apparatus 100 according to the first embodiment is able to set the point of interest in a flexible manner and thus makes it possible to provide the aids for various types of training. For example, the motion information processing apparatus 100 is able to set the designating parts in medically significant positions and thus makes it possible to perform the evaluation more accurately.

Further, according to the first embodiment, the designating parts are arranged with the image information of the subject and the human body model information in such a manner that a designating operation is performed on the predetermined position in the image information of the subject and the human body model information, in the form of at least one of a point and a line. Consequently, the motion information processing apparatus 100 according to the first embodiment makes it possible to set the various points of interest regarding the subject.

Further, according to the first embodiment, the designating parts are configured to designate the sites used for analyzing at least one of the following: the skeleton information corresponding to the time when the subject is performing the predetermined motion; the speed information and the angle information in the predetermined position of the subject; and the walking information corresponding to the time when the subject is performing a walking motion. Consequently, the motion information processing apparatus 100 according to the first embodiment makes it possible to provide the various types of information related to the various types of training including the walking training.

Further, according to the first embodiment, the analyzing unit 142 analyzes the state information corresponding to the designating operation received by using the designating parts. The display controlling unit 143 exercises control so that the state information resulting from the analysis by the analyzing unit 142 is displayed by the output unit 110. Consequently, the motion information processing apparatus 100 according to the first embodiment makes it possible to provide the various types of analysis information.

Second Embodiment

In the first embodiment described above, the example is explained in which the various types of information are displayed in accordance with the designated designating parts. In the second embodiment, an analysis and a display of deviations of the knees that are applied to the setting window described in the first embodiment will be explained. The analysis and the display of the deviations of the knees explained below may be implemented when "measuring walking" included in the setting for a walking image viewed from above is selected from the setting window, or alternatively, an exclusive-use setting button may be provided. The motion information processing apparatus 100 according to the second embodiment is different from that in the first embodiment for the contents of the processes performed by the analyzing unit 142 and the display controlling unit 143. The second embodiment will be explained below while a focus is placed on the difference.

The analyzing unit 142 according to the second embodiment is configured to analyze, as state information, sways of the knees in the direction orthogonal to the walking direction that are observed while the subject is performing a walking motion. For example, the analyzing unit 142 first calculates the walking direction during walking of the subject and further calculates the distance of each of the knees from the calculated walking direction, as a knee deviation. In one example, the analyzing unit 142 calculates the walking direction on the basis of changes of a predetermined position (e.g., the center of the hip joints, the head, the center of the shoulders, or the like) of the subject during walking training. For example, the analyzing unit 142 calculates an approximation curve obtained by performing a least-squares analysis on the coordinates of a predetermined position of the subject who is walking, as the walking direction. Alternatively, the analyzing unit 142 calculates a straight line connecting the coordinates of a predetermined position at the start of a walk to the coordinates of the predetermined position at the end of the walk, as the walking direction. After that, by calculating the distance of each of the left and right knees from the calculated walking direction for each of the frames, the analyzing unit 142 analyzes the deviations of the knees during the walk.

Figure 14:
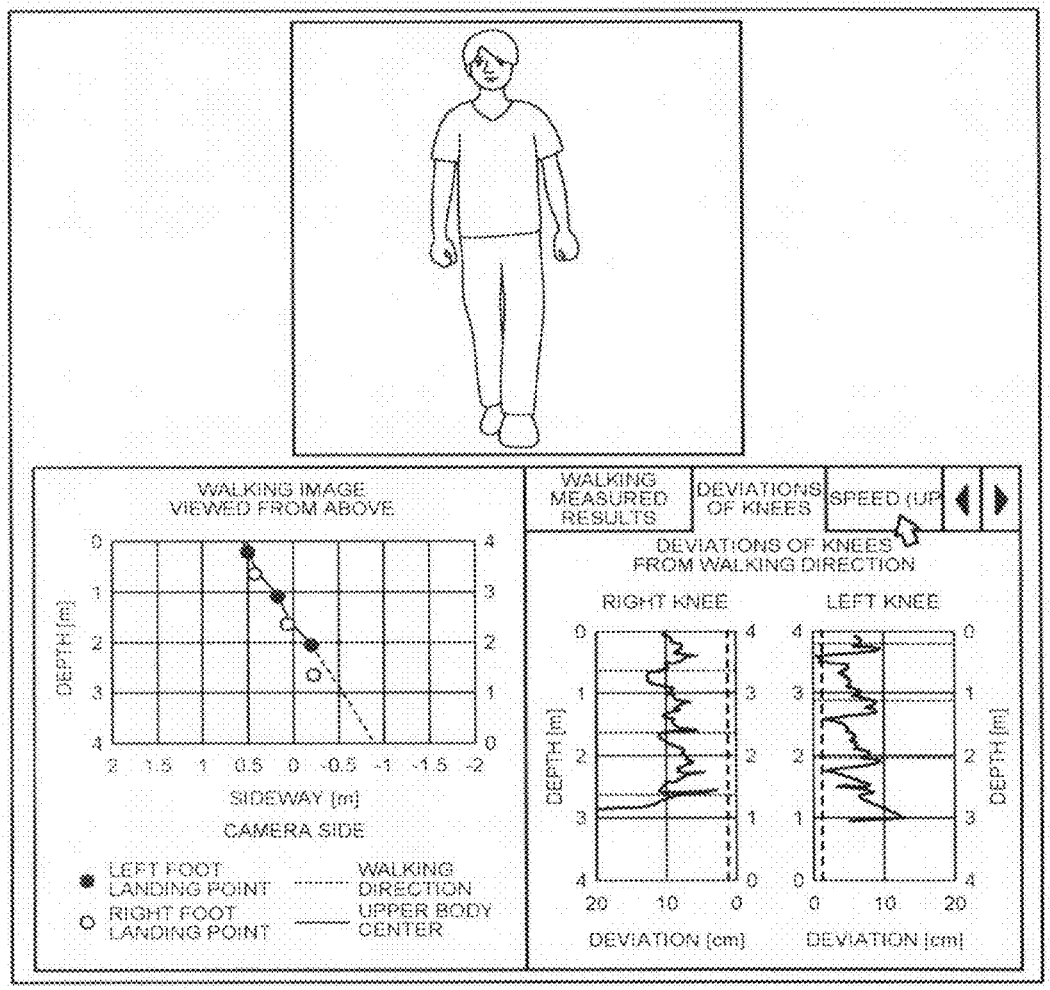
FIG. 14 is a drawing of examples of knee deviation analysis results displayed by a display controlling unit according to a second embodiment.

The display controlling unit 143 according to the second embodiment displays, on the output unit 110, analysis results regarding the deviations of the knees resulting from the analysis by the analyzing unit 142. FIG. 14 is a drawing of examples of the knee deviation analysis results displayed by the display controlling unit 143 according to the second embodiment. For example, as illustrated in FIG. 14, the display controlling unit 143 displays the analysis results including a display region for the color image, a walking image viewed from above, and an analysis result. In this situation, in the display region for the analysis information, the display controlling unit 143 displays the analysis result regarding the deviations of the right knee and the left knee from the walking direction.

For example, as illustrated in FIG. 14(A), the display controlling unit 143 displays a planar chart for each of the left and right knees in which the vertical axis expresses the depth, whereas the horizontal axis expresses the deviation. Further, as illustrated in FIG. 14(B), for example, the display controlling unit 143 displays the maximum values of the deviations of the left and right knees. It is possible to arbitrarily switch the display between the chart indicating the deviations of the knees and the numerical values indicating the maximum values of the deviations of the knees illustrated in FIG. 14.

Figure 15:
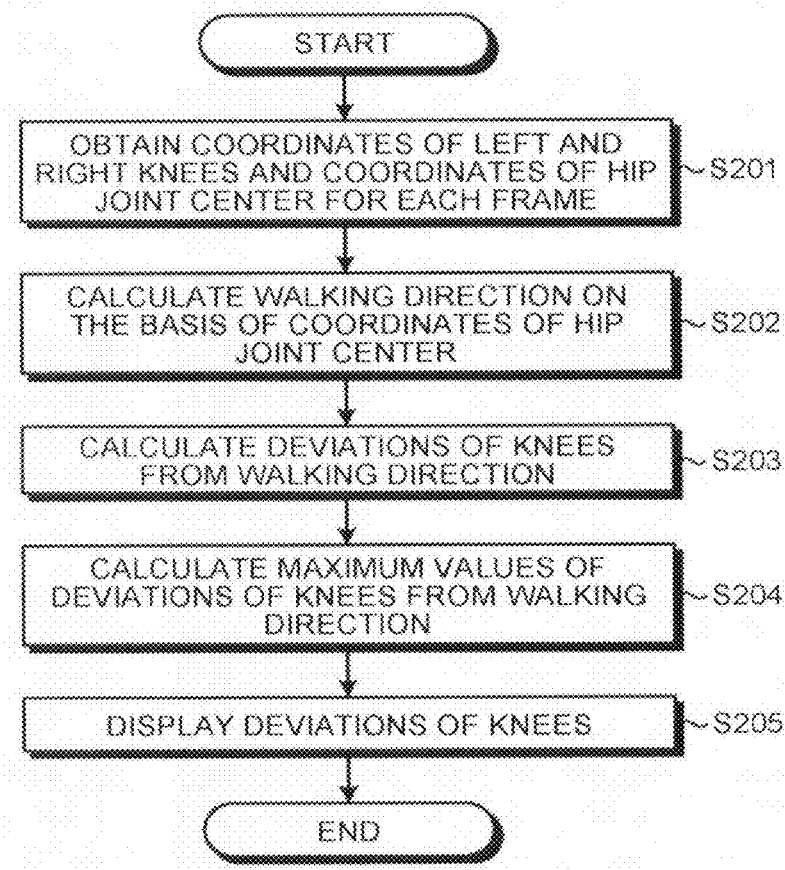
FIG. 15 is a flowchart of a procedure in a knee deviation analyzing process performed by a motion information processing apparatus according to the second embodiment.

Next, the knee deviation analyzing process performed by the motion information processing apparatus 100 according to the second embodiment will be explained, with reference to FIG. 15. FIG. 15 is a flowchart of a procedure in the knee deviation analyzing process performed by the motion information processing apparatus 100 according to the second embodiment. As illustrated in FIG. 15, in the motion information processing apparatus 100 according to the second embodiment, when the obtaining unit 141 has obtained the coordinates of the left and the right knees and the coordinates of the center of the hip joints for each of the frames (step S201), the analyzing unit 142 calculates a walking direction on the basis of the coordinates of the center of the hip joints (step S202).

After that, the analyzing unit 142 calculates deviations of the knees by calculating the distance of the coordinates of each of the knees from the calculated walking direction (step S203) and further calculates the maximum values of the deviations of the knees from the walking direction (step S204). After that, with regard to the deviations of the knee, the display controlling unit 143 displays a chart indicating the deviations of the knees and the maximum values of the deviations of the knees (step S205).

As explained above, according to the second embodiment, the analyzing unit 142 analyzes, as the state information, the sways of the knees in the direction orthogonal to the walking direction that are observed while the subject is performing the walking motion. Consequently, the motion information processing apparatus 100 according to the second embodiment makes it possible to analyze, in detail, the state of the knees of the subject during the walking training.

Third Embodiment

In the second embodiment described above, the example in which the deviations of the knees are analyzed and displayed is explained. In the third embodiment, an analysis and a display of knee varus/valgus angles that are applied to the setting window described in the first embodiment will be explained. The analysis and the display of the varus/valgus angles explained below may be implemented when "measuring walking" included in the setting for a walking image viewed from above is selected from the setting window, or alternatively, an exclusive-use setting button may be provided. The motion information processing apparatus 100 according to the third embodiment is different from that in the first embodiment for the contents of the processes performed by the analyzing unit 142 and the display controlling unit 143. The third embodiment will be explained below while a focus is placed on the difference.

The analyzing unit 142 according to the third embodiment is configured to analyze, as state information, the varus/valgus angles of the knees that are observed while the subject is performing a walking motion. For example, on the basis of information illustrated in FIG. 16A, the analyzing unit 142 performs an analysis on the varus/valgus angles of the knees. FIG. 16A is a drawing for explaining an example of reference information about the varus/valgus angles of the knees that is referred to by the analyzing unit 142 according to the third embodiment.

For example, as illustrated in FIG. 16A, in accordance with the outside angle of the knee in the coronal plane direction during walking, the analyzing unit 142 judges the following: the knee joint is in a valgus state ("genu valgum"); the knee joint is in a normal state ("normal"); or the knee joint is in a varus state ("genu varum"). In one example, as illustrated in FIG. 16A, the analyzing unit 142 determines that the knee joint is "normal" if "the outside angle≈180°" is satisfied, that the subject has "genu valgum" if "the outside angle<<180°" is satisfied, and that the subject has "genu varum" if "the outside angle>>180°" is satisfied.

Further, for example, the analyzing unit 142 calculates the outside angle of each knee in a coronal plane direction during the walking, by using the method illustrated in FIG. 16B. FIG. 16B is a drawing for explaining the knee angle calculating process performed by the analyzing unit 142 according to the third embodiment. For example, as illustrated in FIG. 16B, the analyzing unit 142 calculates an angle "θ5" formed by a vector V1 from the right hip joint to the right knee and a vector V2 from the right knee to the right ankle. Details of the calculation of the angle "θ5" will be explained more specifically later.

After that, the analyzing unit 142 calculates the outside angle by using the calculated angle "θ5". More specifically, the analyzing unit 142 first judges whether the subject is in a knock-kneed state (or a bow-legged state). If the subject is in a knock-kneed state (i.e., is not in a bow-legged state), the analyzing unit 142 calculates the outside angle by subtracting the calculated angle "θ5" from "180°". On the contrary, if the subject is not in a knock-kneed state (i.e., is in a bow-legged state), the analyzing unit 142 calculates the outside angle by adding "180°" to the calculated angle "θ5".

After that, the analyzing unit 142 performs the same process as described above on the left leg.

In this situation, it is possible to judge whether the subject is in a knock-kneed state or not by using, for example, the vectors of the two legs calculated above. For example, if the subject is standing vertically straight, the angle formed by: a vector V3 expressed as an outer product of a vector V1 connecting the joint "2m" corresponding to the right hip joint to the joint "2n" corresponding to the right knee and a vector V2 connecting the joint "2n" corresponding to the right knee to the joint "2o" corresponding to the right ankle; and a vector V6 expressed as an outer product of a vector V4 connecting the joint "2q" corresponding to the left hip joint to the joint "2r" corresponding to the left knee and a vector V5 connecting the joint "2r" corresponding to the left knee to the joint "2s" corresponding to the left ankle is "approximately 180 degrees". In contrast, if the subject is standing in a knock-kneed state, the angle is smaller than "180 degrees". On the contrary, if the subject is standing in a bow-legged state, the angle is larger than "180 degrees".

Accordingly, the analyzing unit 142 calculates the vectors from the motion information acquired by the obtaining unit 141 and calculates the angles from the calculated vectors. After that, on the basis of the calculated angles, the analyzing unit 142 judges whether the subject is in a knock-kneed state or a bow-legged state.

Further, it is also acceptable to judge a degree of knock-kneed state or a degree of bow-legged state by calculating how much the knees are positioned apart from each other on the basis of a distance (an inter-knee distance) between the right knee and the left knee. For example, the analyzing unit 142 may calculate a degree of knock-kneed state or a degree of bow-legged state by calculating the inter-knee distance for each of the frames and comparing each of the distance values with a predetermined threshold value. For example, if the distance is smaller than the predetermined threshold value, the analyzing unit 142 determines that the subject is in a knock-kneed state. On the contrary, if the distance is larger than the predetermined threshold value, the analyzing unit 142 determines that the subject is in a bow-legged state. In this situation, the threshold value used for judging a knock-kneed state or a bow-legged state on the basis of the distance may arbitrarily be set by the user (e.g., the subject, a caregiver, or the like).

Figure 17:
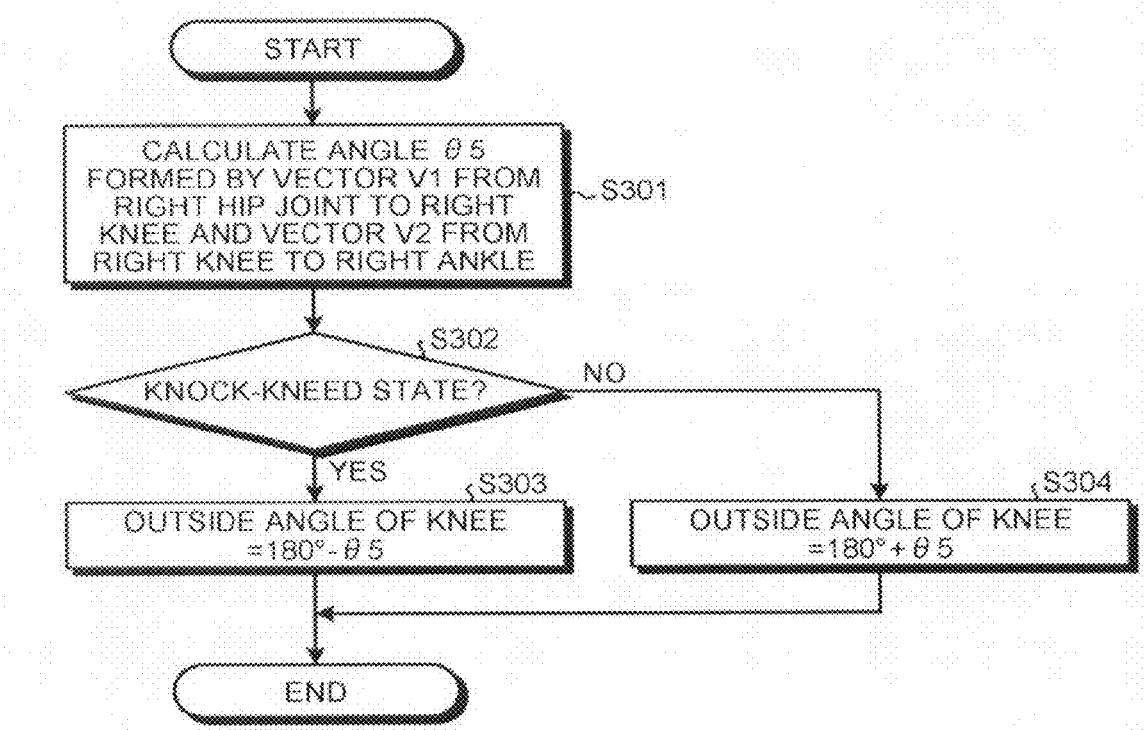
FIG. 17 is a flowchart of a procedure in an angle calculating process performed by a motion information processing apparatus according to the third embodiment.

Next, the process of calculating the outside angles of the knees performed by the motion information processing apparatus 100 according to the third embodiment will be explained, with reference to FIG. 17. FIG. 17 is a flowchart of a procedure in the angle calculating process performed by the motion information processing apparatus 100 according to the third embodiment. Although, FIG. 17 illustrates a process performed on the right knee, the process can also be performed on the left knee in the same manner, in actuality.

As illustrated in FIG. 17, in the motion information processing apparatus 100 according to the third embodiment, when the obtaining unit 141 has obtained the motion information of a subject, the analyzing unit 142 calculates the angle "θ5" formed by the vector V1 from the right hip joint to the right knee and the vector V2 from the right knee to the right ankle (step S301).

After that, the analyzing unit 142 judges whether or not the subject is in a knock-kneed state (step S302). If it has been determined that the subject is in a knock-kneed state (step S302: Yes), the analyzing unit 142 calculates the outside angle of the knee by calculating "180°−θ5" (step S303). On the contrary, if it has been determined that the subject is not in a knock-kneed state (step S302: No), the analyzing unit 142 calculates the outside angle of the knee by calculating "180°+θ5" (step S304).

As explained above, according to the third embodiment, the analyzing unit 142 analyzes, as the state information, the varus/valgus angles of the knees that are observed while the subject is performing the walking motion. Consequently, the motion information processing apparatus 100 according to the third embodiment makes it possible to analyze, further in detail, the state of the knees of the subject during the walking.

Fourth Embodiment

In the fourth embodiment, an analysis and a display of a speed of a gravity point position that are applied to the setting window described in the first embodiment will be explained. The analysis and the display of the speed of the gravity point position explained below may be implemented when "measuring walking" included in the setting for a walking image viewed from above is selected from the setting window, or alternatively, an exclusive-use setting button may be provided. The motion information processing apparatus 100 according to the fourth embodiment is different from that in the first embodiment for the contents of the processes performed by the analyzing unit 142 and the display controlling unit 143. The fourth embodiment will be explained below while a focus is placed on the difference.

The analyzing unit 142 according to the fourth embodiment is configured to analyze, as state information, a speed of a gravity point of the subject that is observed while the subject is performing a walking motion. FIG. 18 is a drawing for explaining examples of contents of a process performed by the motion information processing apparatus 100 according to the fourth embodiment. For example, as illustrated in FIG. 18(A), the analyzing unit 142 calculates the speed of a gravity point position on the basis of changes in the coordinates of the gravity point position, by using information in which a position slightly above the sacrum (the second sacral segment) of the pelvis of the subject is defined a the gravity point position.

After that, as illustrated in FIG. 18(B), the display controlling unit 143 according to the fourth embodiment displays, on the output unit 110, an analysis result indicating the speed of the gravity point position plotted in a chart in which the horizontal axis expresses time and the vertical axis expresses the speed (m/second). In this situation, as illustrated in FIG. 18(B), the display controlling unit 143 may display analysis results from mutually-different time periods that are arranged next to each other.

As explained above, according to the fourth embodiment, the analyzing unit 142 analyzes, as the state information, the speed of the gravity point of the subject observed while the subject is performing the walking motion. Consequently, the motion information processing apparatus 100 according to the fourth embodiment is able to analyze the speed of the walking by setting the gravity point position that is medically well-founded. The motion information processing apparatus 100 according to the fourth embodiment thus makes it possible to perform the evaluation more accurately.

Fifth Embodiment

In the fifth embodiment, an analysis and a display of angles of flexion and extension of the knees during walking that are applied to the setting window described in the first embodiment will be explained. The analysis and the display of the angles of the flexion and the extension of the knees explained below may be implemented when "measuring walking" included in the setting for a walking image viewed from above is selected from the setting window, or alternatively, an exclusive-use setting button may be provided. The motion information processing apparatus 100 according to the fifth embodiment is different from that in the first embodiment for the contents of the processes performed by the analyzing unit 142 and the display controlling unit 143. The fifth embodiment will be explained below while a focus is placed on the difference.

The analyzing unit 142 according to the fifth embodiment is configured to analyze, as state information, the angles of the flexion and the extension of the knees of the subject that are observed while the subject is performing a walking motion. FIG. 19 is a drawing for explaining an example of a process performed by the analyzing unit 142 according to the fifth embodiment. For example, as illustrated in FIG. 19(A), the analyzing unit 142 analyzes the angle in a flexion state and the angle in an extension state of each of the knees. In other words, as illustrated in FIG. 19(A), the analyzing unit 142 analyzes the angles starting from the state in which the leg is extended and through different states in which the knee is bent, with respect to the extension state in which the leg is completely extended, as well as when the lower leg below the knee starts being flexed into the flexion state in which the lower leg is completely flexed. Generally speaking, the flexion is approximately "0° to 130°", whereas the extension is "0°".

In other words, as illustrated in FIG. 19(B), the analyzing unit 142 analyzes the angle formed by the line "from 2q to 2r" and the line "from 2r to 2s (or 2t)" and the angle formed by the line "from 2m to 2n" and the line "from 2n to 2o (or 2p)". In this situation, for example, as illustrated in FIG. 19(C), if the coordinates of 2m are (Xm,Ym,Zm), while the coordinates of 2n are (Xn,Yn,Zn), and the coordinates of 20 are (Xo,Yo,Zo), the analyzing unit 142 calculates a vector Vmn (Xn-Xm,Yn-Ym,Zn-Zm) and a vector Vno (Xo-Xn, Yo-Yn, Zo-Zn). After that, as illustrated in FIG. 19(C), the analyzing unit 142 calculates an angle "θ6" as "θ6=cos−1 (Vmn·Vno/|Vmn|·|Vno|)". The analyzing unit 142 calculates the angle for each of the frames by performing the analysis described above for each of the frames obtained by the obtaining unit 141. The method for calculating the angle "θ6" described above may be used as a method for calculating the angle "θ5" described above.

The display controlling unit 143 according to the fifth embodiment causes the output unit 110 to display an analysis result obtained by the analyzing unit 142. FIG. 20 is a drawing of examples of angle analysis results displayed by the display controlling unit 143 according to the fifth embodiment. For example, as illustrated in FIG. 20(A), the display controlling unit 143 causes an analysis result to be displayed in a chart in which the horizontal axis expresses time, whereas the vertical axis expresses the angle [degrees]. Further, as illustrated in FIG. 20(B), for example, the display controlling unit 143 causes the output unit 110 to display an animation showing the extension and the flexion corresponding to the angles resulting from the analysis by the analyzing unit 142.

In the example described above, to calculate the angle "θ6", the angle formed by, for example, the line "from 2q to 2r" and the line "from 2r to 2s (or 2t)" illustrated in FIG. 19(B) is calculated. However, possible embodiments are not limited to this example. For instance, it is also acceptable to directly calculate the angle "θ6", by setting a designating part in a virtual position. In that situation, the angle "θ6" is directly calculated by, for example, arranging a designating part on a dotted line extended from the knee as illustrated in FIG. 19(C).

As explained above, according to the fifth embodiment, the analyzing unit 142 analyzes, as the state information, the angles of the flexion and the extension of the knees that are observed while the subject is performing the walking motion. Consequently, the motion information processing apparatus 100 according to the fifth embodiment makes it possible to evaluate, in detail, the manner in which the feet kick the ground during the walking.

Sixth Embodiment

The first to the fifth embodiments have thus been explained. The present disclosure may be carried out in other various modes besides the first to the fifth embodiments described above.

Figure 21:
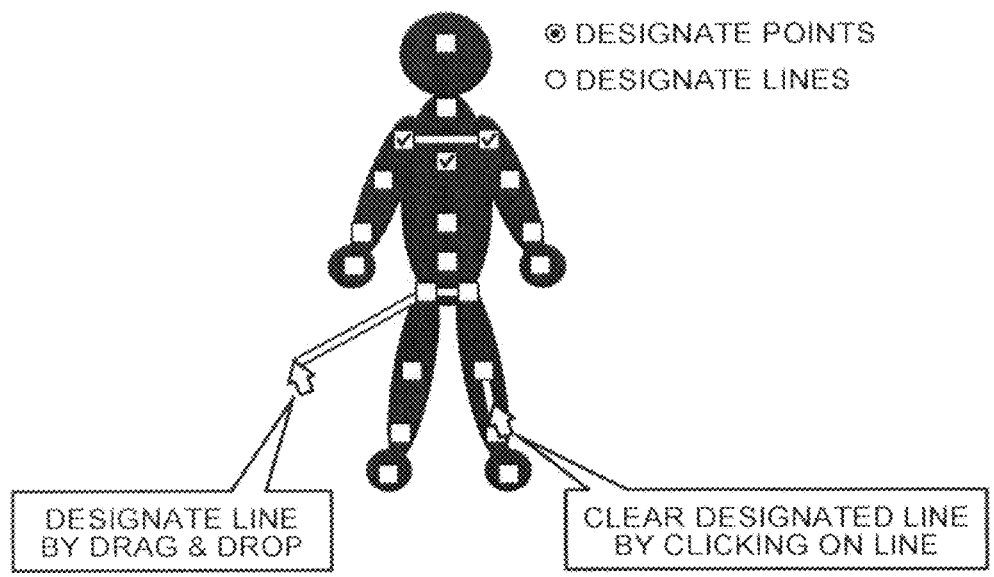
FIG. 21 is a drawing of an example of a line designating process according to a sixth embodiment.

In the first to the fifth embodiments described above, to designate a line, "designating lines" is selected and subsequently, for example, three designating parts are successively designated so as to designate a line. However, possible embodiments are not limited to this example. For instance, it is also acceptable to directly manipulate lines. FIG. 21 is a drawing of an example of a line designating process according to the sixth embodiment. For example, as illustrated in FIG. 21, when a plurality of designating parts are arranged with a human body model, and a number of lines are designated after "designating points" and "designating lines" are selected, the operator is also able to directly manipulate the lines via the input unit 120.

In one example, as illustrated in FIG. 21, the operator is able to directly designate a line by performing a drag-and-drop operation via the input unit 120. Further, for example, by clicking on any of the designated lines, the operator is also able to clear the line.

Further, in the first to the fifth embodiments described above, the rehabilitation walking training is performed as the predetermined motion. However, the motion information processing apparatus 100 of the present disclosure is applicable not only to walking training, but also to other motions. For example, the motion information processing apparatus 100 of the present disclosure is applicable to joint range-of-motion training performed as rehabilitation, squat training or jump training performed as an exercise, and the like.

Seventh Embodiment

The motion information processing apparatus 100 that makes it easy and convenient to provide the aids that are in accordance with each of the points of interest has thus been explained. Next, the motion information processing apparatus 100 configured to evaluate various types of rehabilitation will be explained. In the seventh embodiment, an example will be explained in which the motion information processing apparatus 100 evaluates various types of rehabilitation, by setting a reference plane that serves as a plane of reference for an evaluation regarding a motion in rehabilitation. In this situation, examples of the reference plane include: a coronal plane corresponding to a cross-sectional plane that divides the body of the subject into a front part and a rear part; a sagittal plane corresponding to a cross-sectional plane that divides the body of the subject into a left part and a right part; a horizontal plane corresponding to a cross-sectional plane that divides the body of the subject horizontally; and the like.

Figure 22:
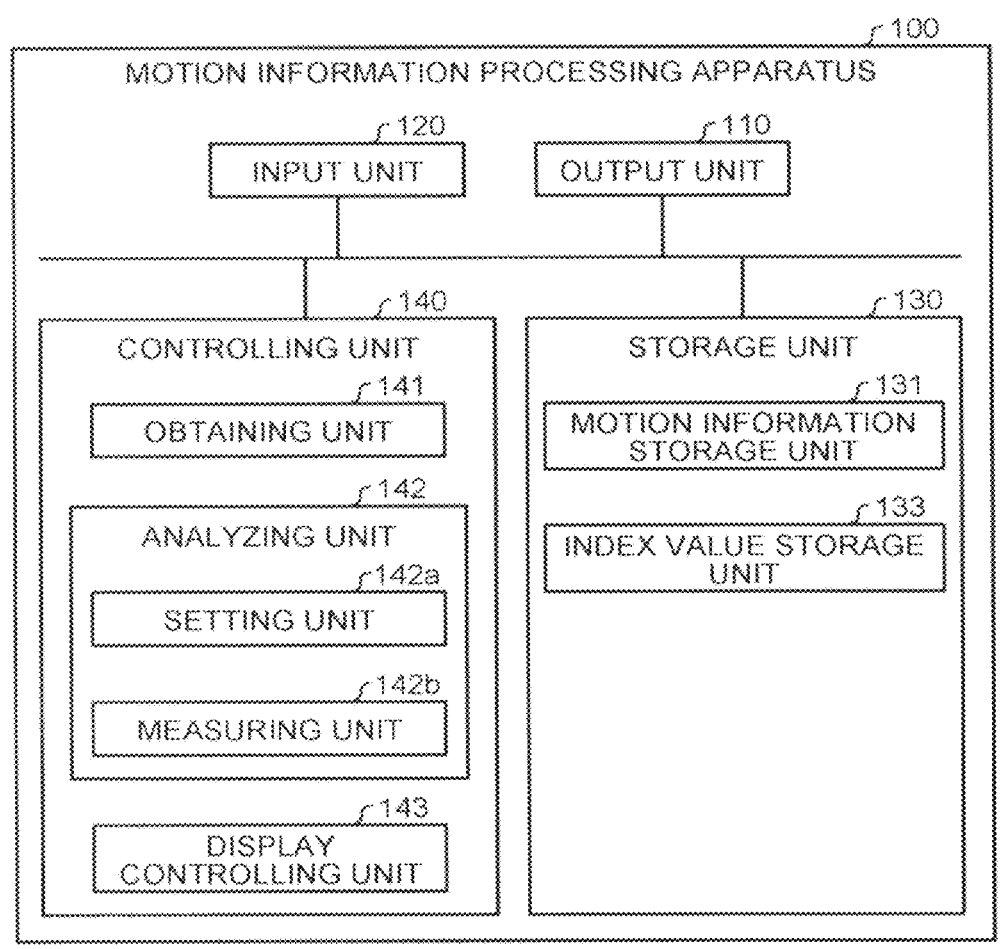
FIG. 22 is a block diagram of an exemplary detailed configuration of a motion information processing apparatus according to a seventh embodiment.

FIG. 22 is a block diagram of an exemplary detailed configuration of the motion information processing apparatus 100 according to the seventh embodiment. As illustrated in FIG. 22, in the motion information processing apparatus 100, the storage unit 130 includes the motion information storage unit 131 and an index value storage unit 133.

The motion information storage unit 131 is configured to store therein the motion information acquired by the motion information acquiring unit 10. The motion information is the skeleton information corresponding to each of the frames generated by the motion information generating unit 14. For example, every time a piece of motion information is acquired by the motion information acquiring unit 10, the acquired piece of motion information is stored into the motion information storage unit 131. In this situation, the motion information storage unit 131 may further store therein the color image information, the distance image information, and the speech recognition result that are output by the motion information generating unit 14, while keeping these pieces of information in correspondence with each of the frames.

The index value storage unit 133 is configured to store therein, for example, an index value that serves as an index for an evaluation of rehabilitation. In this situation, the index value is a value defined for each type of rehabilitation performed by the subject. For example, when flexion and extension of the right shoulder are performed as rehabilitation, the index value storage unit 133 stores therein, for each of the frames, an angle formed by a coronal plane and the upper arm (the line connecting the joint 2e to the joint 2f) as an index value. The information stored in the index value storage unit 133 is measured by a measuring unit 142b (explained later). The information stored in the index value storage unit 133 is not limited to this example. For instance, the index value storage unit 133 may store therein an angular velocity, which represents an amount of change in an angle over the course of time.

In the motion information processing apparatus 100, the controlling unit 140 includes the obtaining unit 141, a setting unit 142a, the measuring unit 142b, and the display controlling unit 143.

The obtaining unit 141 is configured to obtain the motion information of the subject who undergoes the rehabilitation. For example, after the electric power sources of the motion information acquiring unit 10 and the motion information processing apparatus 100 are turned on, every time skeleton information corresponding to one frame is stored into the motion information storage unit 131, the obtaining unit 141 obtains, from the motion information storage unit 131, the stored skeleton information and color image information of the frame corresponding to the stored skeleton information.

The setting unit 142a is configured to set reference information that serves as a reference for an evaluation regarding a motion of rehabilitation, by using the motion information in an initial state of the subject who undergoes the rehabilitation. For example, by using the motion information of the subject obtained by the obtaining unit 141, the setting unit 142a sets at least one of the following: coronal plane information that is information about a coronal plane of the subject; sagittal plane information that is information about a sagittal plane of the subject; and horizontal plane information that is information about a horizontal plane of the subject. In this situation, the coronal plane information, the sagittal plane information, and the horizontal plane information are examples of the reference information. Further, the coronal plane information, the sagittal plane information, and the horizontal plane information may collectively be referred to as reference plane information.

In one example, the setting unit 142a receives a setting instruction indicating that reference information should be set. The setting instruction includes information about a reference plane to be set, e.g., an instruction indicating that coronal plane information should be set. For example, after confirming that the subject is in an initial state for performing rehabilitation, a caregiver inputs a setting instruction indicating that coronal plane information should be set, by using the input unit 120. When having received that the setting instruction indicating that coronal plane information should be set, the setting unit 142a sets the coronal plane information by using the motion information corresponding to a time at which the instruction was received. In this situation, the initial state refers to, for example, a posture of the subject in which the index value (explained later) is "0" in the rehabilitation. The setting instruction does not necessarily have to be input by a caregiver, and may be input by the subject himself/herself.

Figure 23A:
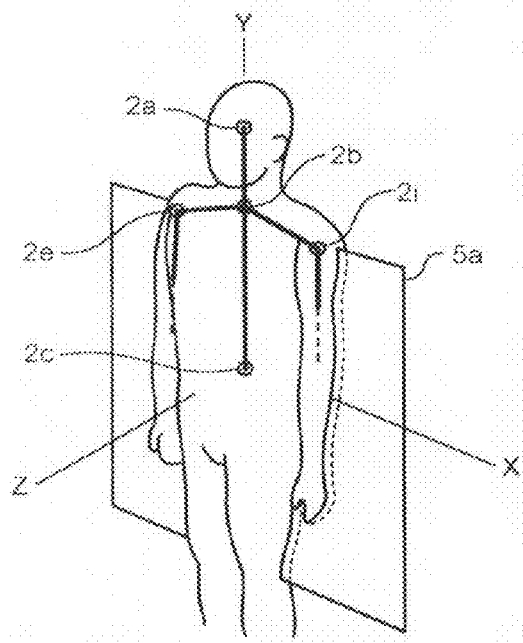
FIG. 23A is a drawing for explaining a process of setting reference plane information performed by a setting unit according to the seventh embodiment.
Figure 23B:
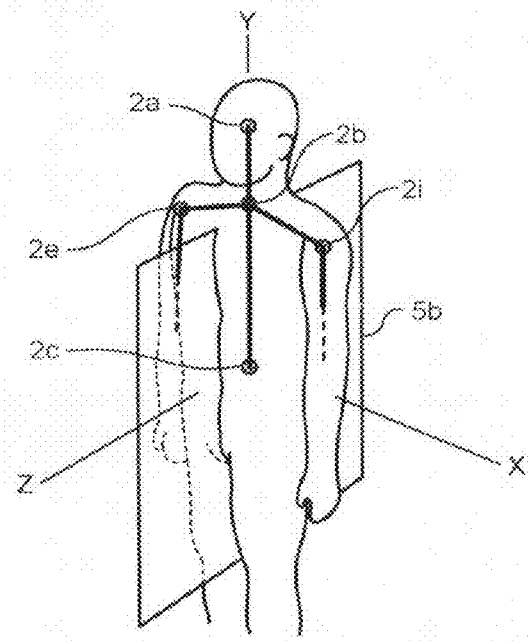
FIG. 23B is another drawing for explaining the process of setting the reference plane information performed by the setting unit according to the seventh embodiment.
Figure 23C:
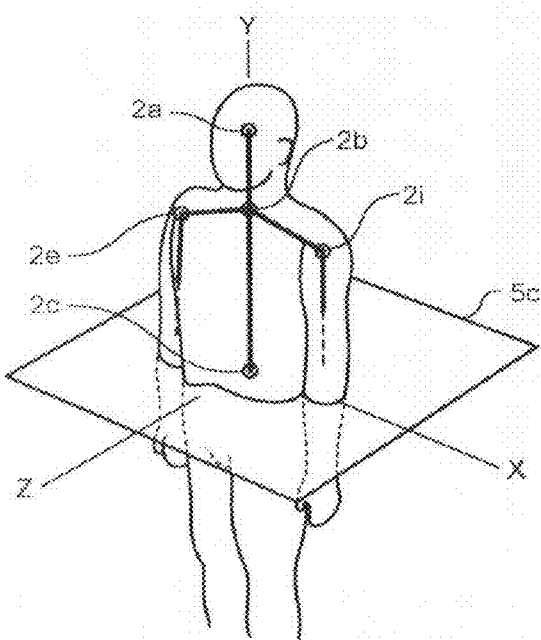
FIG. 23C is yet another drawing for explaining the process of setting the reference plane information performed by the setting unit according to the seventh embodiment.

Next, a process of setting the reference plane information performed by the setting unit 142a will be explained, with reference to FIGS. 23A to 23C. FIG. 23A to FIG. 23C are drawings for explaining the process of setting the reference plane information performed by the setting unit 142a according to the seventh embodiment. FIG. 23A illustrates skeleton information of the subject and a coronal plane 5a of the subject. FIG. 23B illustrates the skeleton information of the subject and a sagittal plane 5b of the subject. FIG. 23C illustrates the skeleton information of the subject and a horizontal plane 5c of the subject.

In the example illustrated in FIG. 23A, when having received a setting instruction indicating that coronal plane information should be set, the setting unit 142a calculates a plane that passes through the right shoulder (the joint 2e) and the left shoulder (the joint 2i) and that is parallel to the y axis of the world coordinate system, and further sets information about the calculated coronal plane 5a as the coronal plane information. After that, the setting unit 142a outputs the coronal plane information that was set, to the measuring unit 142b.

In the example illustrated in FIG. 23B, when having received a setting instruction indicating that sagittal plane information should be set, the setting unit 142a calculates a plane that orthogonally intersects a line segment connecting the right shoulder (the joint 2e) to the left shoulder (the joint 2i) at the middle point thereof and that is parallel to the y axis of the world coordinate system, and further sets information about the calculated sagittal plane 5b as the sagittal plane information. After that, the setting unit 142a outputs the sagittal plane information that was set, to the measuring unit 142b.

In the example illustrated in FIG. 23C, when having received a setting instruction indicating that horizontal plane information should be set, the setting unit 142a calculates a plane that passes through the lumbar (the joint 2c) and that is parallel to the x-z plane of the world coordinate system, and further sets information about the calculated horizontal plane 5c as the horizontal plane information. After that, the setting unit 142a outputs the horizontal plane information that was set, to the measuring unit 142b.

In the description above, the example is explained in which the setting unit 142a sets the reference information of the single reference plane indicated in the instruction from among the coronal plane 5a, the sagittal plane 5b, and the horizontal plane 5c. However, possible embodiments are not limited to this example. For instance, when a plurality of reference planes are indicated in the instruction, it is acceptable to set the plurality of reference planes as instructed.

Further, in the description above, the example is explained in which the reference plane set by the setting unit 142a is indicated in the instruction from the user. However, possible embodiments are not limited to this example. For instance, another arrangement is acceptable in which one of the reference planes is automatically selected in accordance with the specifics of the rehabilitation, so that reference information of the selected reference plane is set. In that situation, the motion information processing apparatus 100 stores therein, in advance, specifics of rehabilitation and reference planes that correspond to the specifics of rehabilitation. Further, for example, when rehabilitation is started, the setting unit 142a receives information including specifics of the rehabilitation. After that, the setting unit 142a refers to the stored information, selects one of the reference planes that corresponds to the specifics of the rehabilitation included in the received information, and sets reference plane information of the selected reference plane.

Further, the method for calculating the reference plane information described above is merely an example. It is acceptable to set the reference plane information by using other calculation methods. For example, to set coronal plane information, the setting unit 142a may calculate a plane that passes through the three points of the right shoulder (the joint 2e), the left shoulder (the joint 2i), and the lumbar (the joint 2c). As another example, to set sagittal plane information, the setting unit 142a may calculate a plane that passes through the head (the joint 2a) and the lumbar (the joint 2c) and that is orthogonal to a line connecting the right shoulder (the joint 2e) to the left shoulder (the joint 2i). As yet another example, to set horizontal plane information, the setting unit 142a may calculate a plane that passes through the right shoulder (the joint 2e) and the left shoulder (the joint 2i) and that is orthogonal to a line connecting the head (the joint 2a) to the lumbar (the joint 2c). Further, besides these examples, the setting unit 142a may set the reference plane information by using other calculation methods.

The measuring unit 142b is configured to measure, every time motion information is obtained, an index value that serves as an index for an evaluation of rehabilitation by using the obtained motion information and the reference information.

In one example, the measuring unit 142b receives the reference information set by the setting unit 142a. After that, the measuring unit 142b receives a start instruction indicating that a measuring process should be started. The start instruction includes information indicating the specifics of the rehabilitation to be measured and, for example, includes information indicating that rehabilitation of flexion and extension of the right shoulder is to be performed. When having received a start instruction that includes the information indicating that the rehabilitation of flexion and extension of the right shoulder is to be performed, the measuring unit 142b measures, every time motion information is obtained by the obtaining unit 141 after the time at which the instruction was received, an index value for the flexion and the extension of the right shoulder, by using the obtained motion information and the received reference information. In other words, the measuring unit 142b measures the index value for the flexion and the extension of the right shoulder, for each of the frames in which the motion information was obtained. The index values measured in this situation will be further explained later. After that, the measuring unit 142b stores the measured index values corresponding to the frames, into the index value storage unit 133.

In the description above, the example is explained in which the measuring process is started as being triggered by the receiving of the start instruction by the measuring unit 142b. However, possible embodiments are not limited to this example. For instance, the measuring unit 142b may automatically start the measuring process as being triggered by the receiving of the reference information from the setting unit 142a.

Next, the index values measured by the measuring unit 142b will be explained. In the following sections, various types of index values that are measured as the reference information by the measuring unit 142*b* while using the coronal plane information, the sagittal plane information, and the horizontal plane information will be sequentially explained.

The Coronal Plane Information

By using the coronal plane information, the measuring unit 142*b* measures index values for rehabilitation such as, for example, flexion and extension of the shoulder, horizontal flexion and extension of the shoulder, flexion and extension of the shoulder girdle, flexion and extension of the hip, forward flexion and rearward flexion of the neck, forward flexion and rearward flexion of the thoracolumbar area, a rotation of the thoracolumbar area, and the like.

Figure 24B:
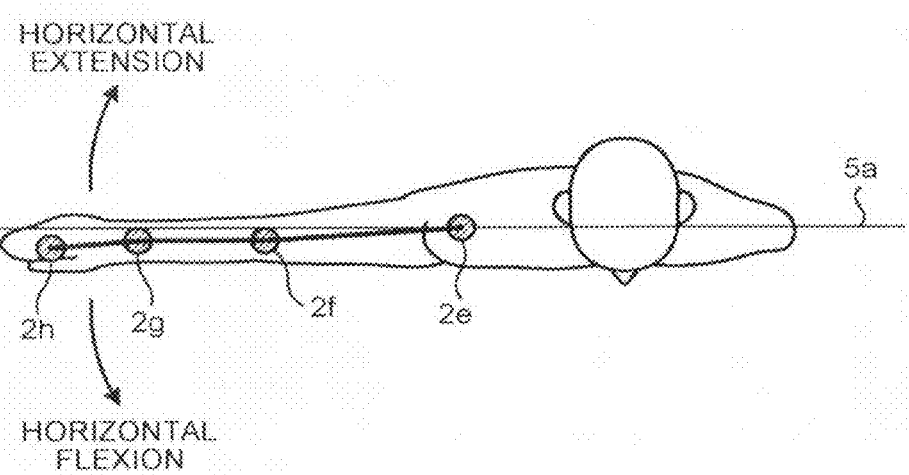
FIG. 24B is another drawing for explaining the index values measured by the measuring unit according to the seventh embodiment while using the coronal plane information.
Figure 24C:
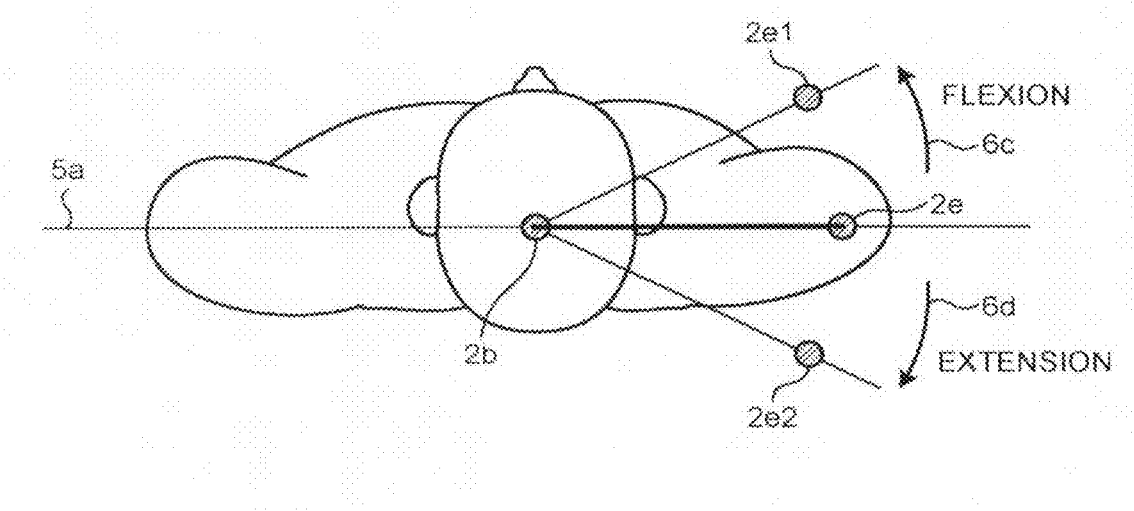
FIG. 24C is yet another drawing for explaining the index values measured by the measuring unit according to the seventh embodiment while using the coronal plane information.
Figure 24D:
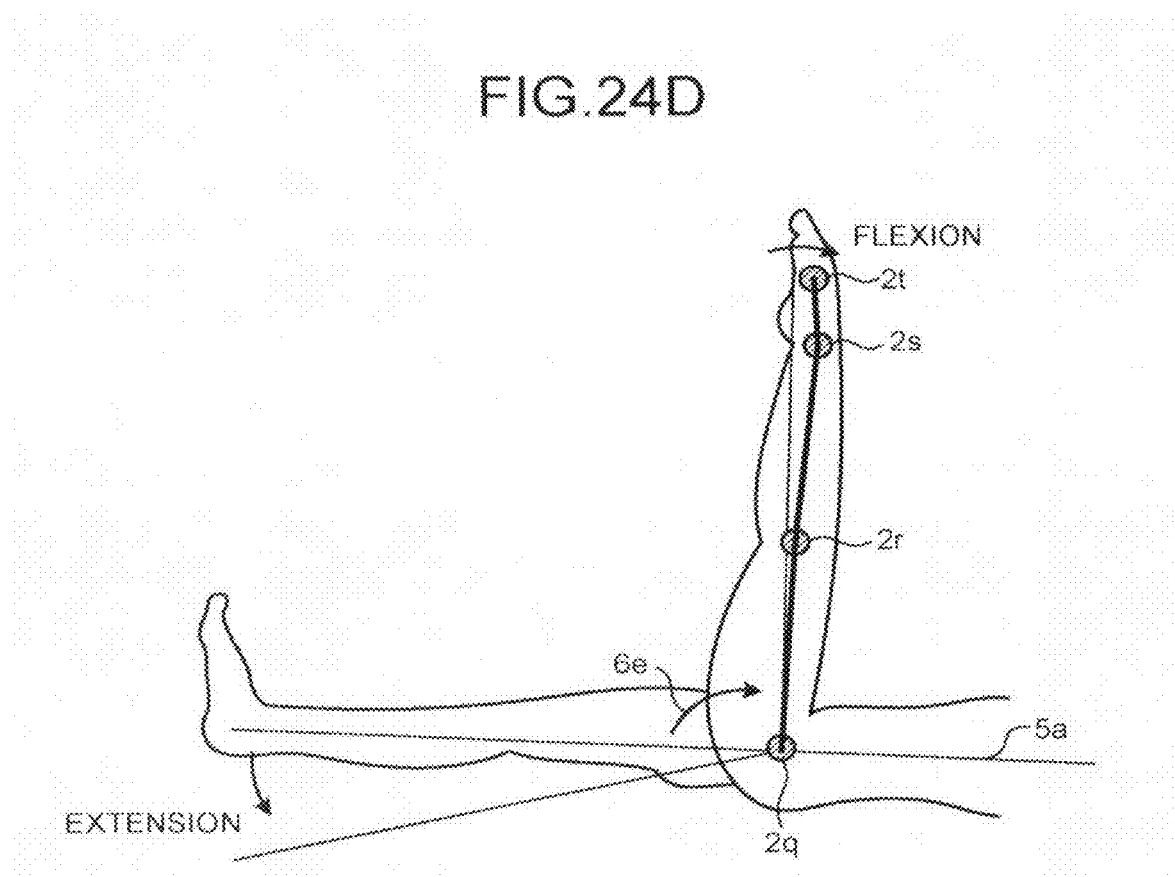
FIG. 24D is yet another drawing for explaining the index values measured by the measuring unit according to the seventh embodiment while using the coronal plane information.
Figure 24E:
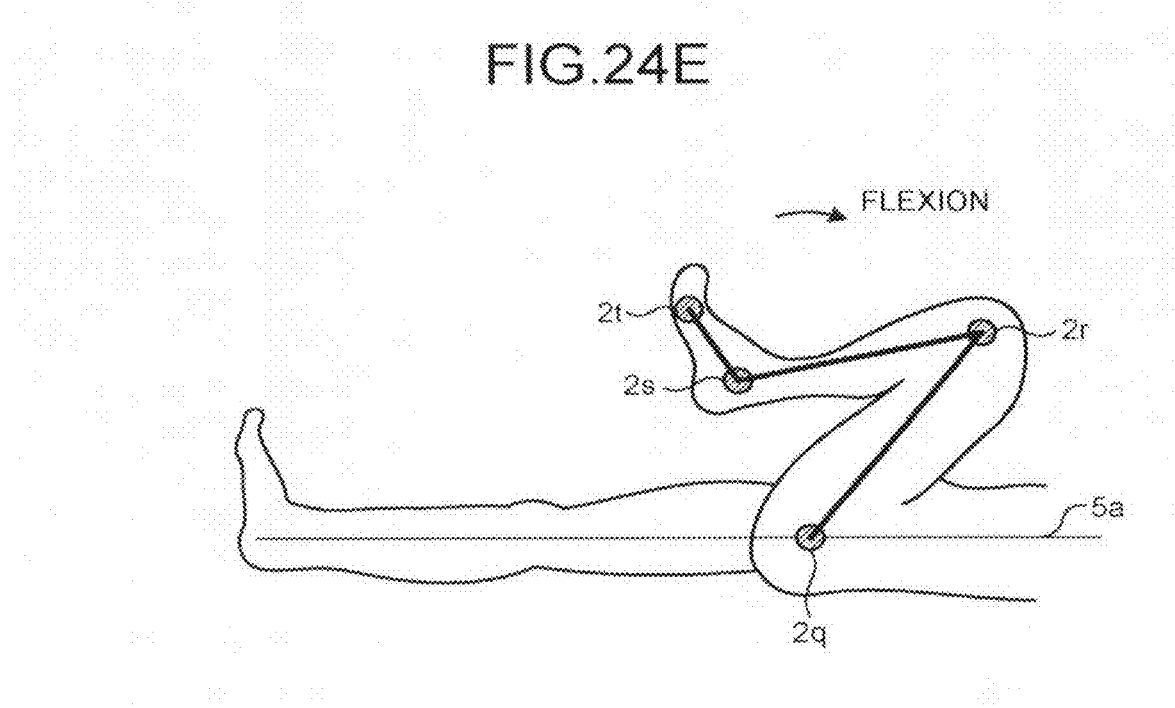
FIG. 24E is yet another drawing for explaining the index values measured by the measuring unit according to the seventh embodiment while using the coronal plane information.
Figure 24G:
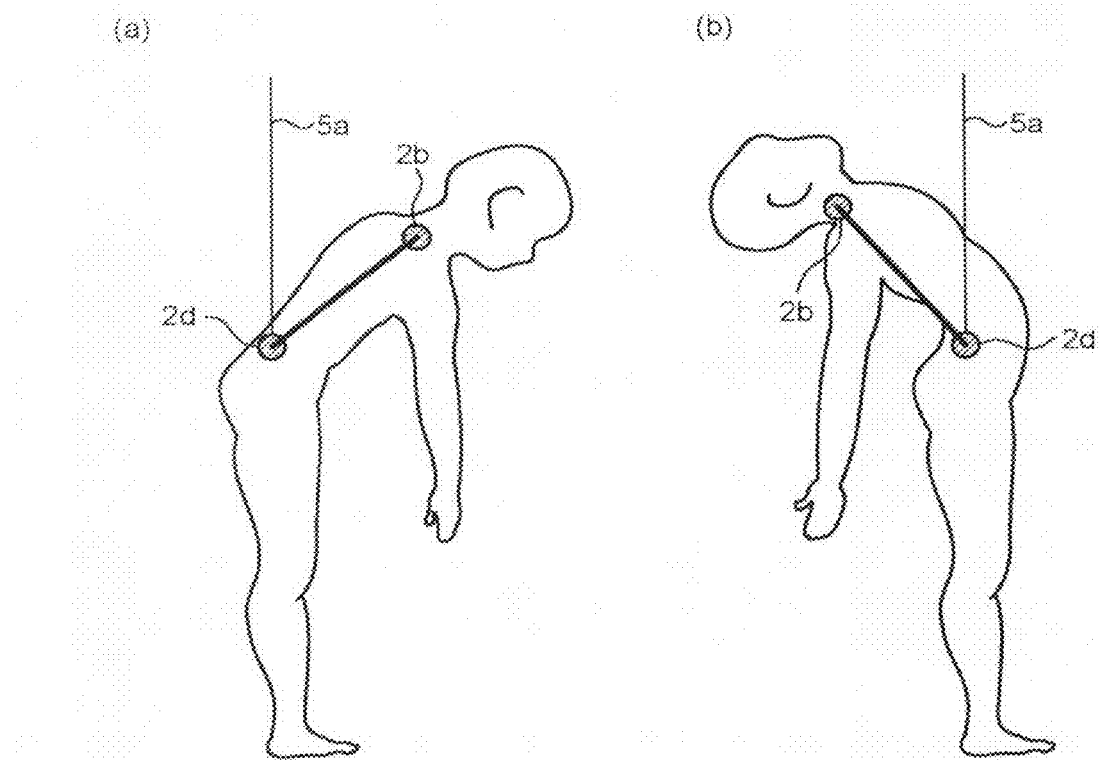
FIG. 24G is yet another drawing for explaining the index values measured by the measuring unit according to the seventh embodiment while using the coronal plane information.
Figure 24H:
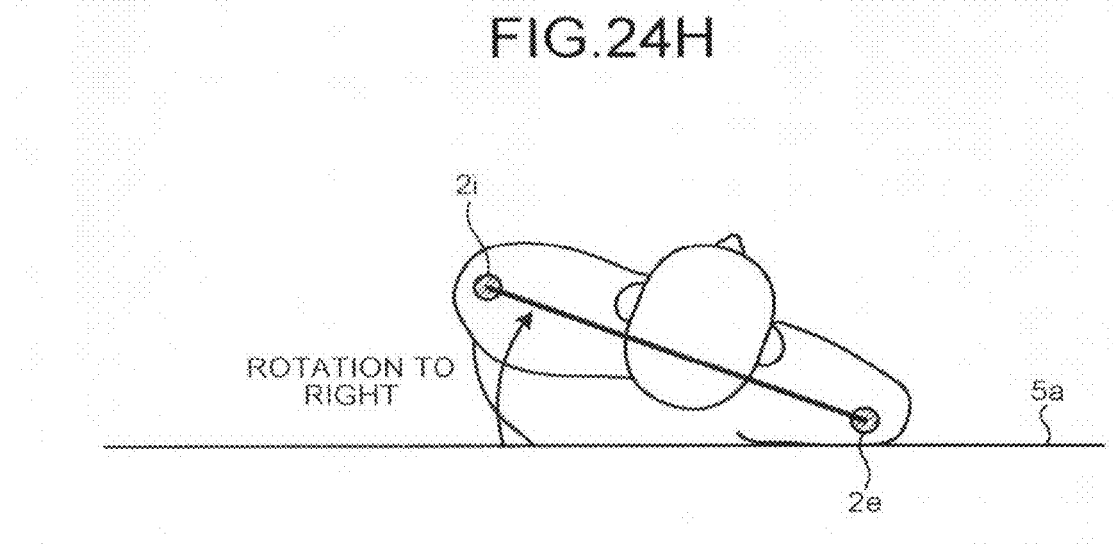
FIG. 24H is yet another drawing for explaining the index values measured by the measuring unit according to the seventh embodiment while using the coronal plane information.

FIGS. 24A to 24H are drawings for explaining the index values measured by the measuring unit 142*b* according to the seventh embodiment while using the coronal plane information. FIG. 24A illustrates index values for flexion and extension of the shoulder. FIG. 24B illustrates an index value for horizontal flexion and extension of the shoulder. FIG. 24C illustrates index values for flexion and extension of the shoulder girdle. FIGS. 24D and 24E illustrate index values for flexion and extension of the hip. FIG. 24F illustrates index values for forward flexion and rearward flexion of the neck. FIG. 24G illustrates index values for forward flexion and rearward flexion of the thoracolumbar area. FIG. 24H illustrates an index value for a rotation of the thoracolumbar area.

An example in which the index values for the flexion and the extension of the shoulder are measured will be explained, with reference to FIG. 24A. FIG. 24A illustrates a view from the left side of a subject, with an example in which the measuring unit 142*b* measures index values for flexion and extension of the left shoulder. FIG. 24A(a) illustrates an example in which the left shoulder is flexed, whereas FIG. 24A(b) illustrates an example in which the left shoulder is extended.

As illustrated in FIG. 24A, to measure the index values for the flexion and the extension of the left shoulder, the measuring unit 142*b* measures the angles formed by the coronal plane 5*a* and the left upper arm (the line connecting the joint 2*i* to the joint 2*j*), as the index values. More specifically, for the flexion, the measuring unit 142*b* measures an angle 6*a* formed by the coronal plane 5*a* and the line segment "from 2*i* to 2*j*", as the index value. For the extension, the measuring unit 142*b* measures an angle 6*b* formed by the coronal plane 5*a* and the line segment "from 2*i* to 2*j*", as the index value.

The index values measured by the measuring unit 142*b* are not limited to the example described above. For instance, for the flexion, the measuring unit 142*b* may measure the angle formed by the coronal plane 5*a* and the line segment "from 2*i* to 2*k* (or 2*l*)", as an index value. For the extension, the measuring unit 142*b* may measure the angle formed by the coronal plane 5*a* and the line segment "from 2*i* to 2*k* (or 2*l*)", as an index value. Further, the position of the coronal plane 5*a* is not limited to the examples illustrated in the drawings. The coronal plane 5*a* may be parallel-displaced to a position arbitrarily selected by the user. Even if the position of the coronal plane 5*a* is changed, the calculated angle does not change.

Further, in the above example, the left shoulder is used as the target of the measuring process, for the sake of convenience in the explanation. However, it is also possible to perform the measuring process on the right shoulder in the same manner. In that situation, for example, the measuring unit 142*b* measures the angle formed by the coronal plane 5*a* and the right upper arm (the line connecting the joint 2*e* to the joint 2*f* (or 2*g* or 2*h*)), as an index value.

Next, an example in which the index value for the horizontal flexion and extension of the shoulder is measured will be explained, with reference to FIG. 24B. FIG. 24B illustrates a view from the head side of a subject, with an example in which the measuring unit 142*b* measures an index value for horizontal flexion and extension of the right shoulder.

As illustrated in FIG. 24B, to measure the index value for the horizontal flexion and extension of the right shoulder, the measuring unit 142*b* measures the angle formed by the coronal plane 5*a* and the right upper arm (the line connecting the joint 2*e* to the joint 2*f*), as the index value. More specifically, the measuring unit 142*b* measures the angle formed by the coronal plane 5*a* and the line segment "from 2*e* to 2*f*", as the index value.

The index value measured by the measuring unit 142*b* is not limited to the example described above. For instance, the measuring unit 142*b* may measure the angle formed by the coronal plane 5*a* and the line segment "from 2*e* to 2*g* (or 2*h*)", as an index value. Further, the position of the coronal plane 5*a* is not limited to the examples illustrated in the drawings. The coronal plane 5*a* may be parallel-displaced to a position arbitrarily selected by the user.

Further, in the above example, the right shoulder is used as the target of the measuring process, for the sake of convenience in the explanation. However, it is also possible to perform the measuring process on the left shoulder in the same manner. In that situation, for example, the measuring unit 142*b* measures the angle formed by the coronal plane 5*a* and the left upper arm (the line connecting the joint 2*i* to the joint 2*j* (or 2*k* or 2*l*)), as an index value.

Next, an example in which the index values for the flexion and the extension of the shoulder girdle are measured will be explained, with reference to FIG. 24C. FIG. 24C illustrates a view from the head side of a subject, with an example in which the measuring unit 142*b* measures index values for flexion and extension of the right shoulder girdle. In FIG. 24C, the joint 2*e*1 indicates the position of the right shoulder when the right shoulder is flexed, whereas the joint 2*e*2 indicates the position of the right shoulder when the right shoulder is extended.

As illustrated in FIG. 24C, to measure the index values for the flexion and the extension of the right shoulder girdle, the measuring unit 142*b* measures the angles formed by the coronal plane 5*a* and the line connecting the joint 2*b* to the joint 2*e*, as the index values. More specifically, for the flexion, the measuring unit 142*b* measures an angle 6*c* formed by the coronal plane 5*a* and the line segment "from 2*b* to 2*e*1", as the index value. For the extension, the measuring unit 142*b* measures an angle 6*e* formed by the coronal plane 5*a* and the line segment "from 2*b* to 2*e*2", as the index value.

Further, in the above example, the right shoulder is used as the target of the measuring process, for the sake of convenience in the explanation. However, it is also possible to perform the measuring process on the left shoulder in the same manner. In that situation, for example, the measuring unit 142*b* measures the angle formed by the coronal plane 5*a* and the line connecting the joint 2*b* to the joint 2*i*, as an index value. Further, the position of the coronal plane 5*a* is not limited to the examples illustrated in the drawings. The coronal plane 5*a* may be parallel-displaced to a position arbitrarily selected by the user.

Next, an example in which the index values for the flexion and the extension of the hip are measured will be explained, with reference to FIGS. 24D and 24E. FIGS. 24D and 24E each illustrate a view from the left side a subject, with an example in which the measuring unit 142b measures an index value for flexion and extension of the left hip.

As illustrated in FIG. 24D, to measure the index value for the flexion and the extension of the left hip, the measuring unit 142b measures the angle formed by the coronal plane 5a and the left thigh bone (the line connecting the joint 2q to the joint 2r), as the index value. More specifically, the measuring unit 142b measures an angle 6e formed by the coronal plane 5a and the line segment "from 2q to 2r", as the index value.

The index value measured by the measuring unit 142b is not limited to the example described above. For instance, the measuring unit 142b may measure the angle formed by the coronal plane 5a and the line segment "from 2q to 2s (or 2t)", as an index value. Further, as illustrated in FIG. 24E, the measuring unit 142b may perform the measuring process while the knee is bent. Further, the position of the coronal plane 5a is not limited to the examples illustrated in the drawings. The coronal plane 5a may be parallel-displaced to a position arbitrarily selected by the user.

Further, in the above example, the left side is used as the target of the measuring process, for the sake of convenience in the explanation. However, it is also possible to perform the measuring process on the right side in the same manner. In that situation, for example, the measuring unit 142b measures the angle formed by the coronal plane 5a and the right thigh bone (the line connecting the joint 2m to the joint 2n (or 2o or 2p)), as an index value.

Next, an example in which the index values for the forward flexion and the rearward flexion of the neck are measured will be explained, with reference to FIG. 24F. FIG. 24F illustrates a view from the left side of a subject, with an example in which the measuring unit 142b measures the index values for the forward flexion and the rearward flexion of the neck. FIG. 24F(a) illustrates an example in which the neck is flexed forward, whereas FIG. 24F(b) illustrates an example in which the neck is flexed rearward.

As illustrated in FIG. 24F, to measure the index values for the forward reflection and the rearward flexion of the neck, the measuring unit 142b measures the angles formed by the coronal plane 5a and the line connecting the joint 2b to the joint 2a, as the index values. More specifically, for the forward flexion, the measuring unit 142b measures the angle formed by the coronal plane 5a and the line segment "from 2b to 2a", as the index value. For the rearward flexion, the measuring unit 142b measures the angle formed by the coronal plane 5a and the line segment "from 2b to 2a", as the index value. The position of the coronal plane 5a is not limited to the examples illustrated in the drawings. The coronal plane 5a may be parallel-displaced to a position arbitrarily selected by the user.

Next, an example in which the index values for the forward flexion and the rearward flexion of the thoracolumbar area are measured will be explained, with reference to FIG. 24G. FIG. 24G illustrates a view from the right side of a subject, with an example in which the measuring unit 142b measures the index values for the forward flexion and the rearward flexion of the thoracolumbar area. FIG. 24G(a) illustrates an example in which the thoracolumbar area is flexed forward, whereas FIG. 24G(b) illustrates an example in which the thoracolumbar area is flexed rearward.

As illustrated in FIG. 24G, to measure the index values for the forward flexion and the rearward flexion of the thoracolumbar area, the measuring unit 142b measures the angles formed by the coronal plane 5a and the thoracolumbar area (the line connecting the joint 2d to the joint 2b), as the index values. More specifically, for the forward flexion, the measuring unit 142b measures the angle formed by the coronal plane 5a and the line segment "from 2d to 2b", as the index value. For the rearward flexion, the measuring unit 142b measures the angle formed by the coronal plane 5a and the line segment "from 2d to 2b", as the index value. The position of the coronal plane 5a is not limited to the examples illustrated in the drawings. The coronal plane 5a may be parallel-displaced to a position arbitrarily selected by the user.

Next, an example in which the index value for the rotation of the thoracolumbar area is measured will be explained, with reference to FIG. 24H. FIG. 24H illustrates a view from above a subject, with an example in which the measuring unit 142b measures an index value for a right rotation of the thoracolumbar area.

As illustrated in FIG. 24H, to measure the index value for the right rotation of the thoracolumbar area, the measuring unit 142b measures the angle formed by the coronal plane 5a and the two shoulders (the line connecting the joint 2i to the joint 2e), as the index value. The position of the coronal plane 5a is not limited to the examples illustrated in the drawings. The coronal plane 5a may be parallel-displaced to a position arbitrarily selected by the user.

As explained above, by using the coronal plane information, the measuring unit 142b measures the index values for the rehabilitation such as the flexion and the extension of the shoulder, the horizontal flexion and extension of the shoulder, the flexion and the extension of the shoulder girdle, the flexion and the extension of the hip, the forward flexion and the rearward flexion of the head, the forward flexion and the rearward flexion of the thoracolumbar area, and the rotation of the thoracolumbar area. The index values measured by the measuring unit 142b while using the coronal plane information are not necessarily limited to the examples described above. It is acceptable to measure an angle formed by the coronal plane 5a and a line connecting two arbitrary joints together. Further, the index values measured by the measuring unit 142b while using the coronal plane information are not limited to angles. For example, the measuring unit 142b may measure the distance between the coronal plane 5a and the joint 2j, as an index value for the flexion and the extension of the left shoulder. Further, the measuring unit 142b may measure two or more of the index values described above at the same time.

The Sagittal Plane Information

By using the sagittal plane information, the measuring unit 142b measures index values for rehabilitation such as, for example, abduction and adduction of the shoulder, an external rotation and an internal rotation of the shoulder, abduction and adduction of the hip, lateral flexion (left flexion and right flexion) of the neck, lateral flexion (left flexion and right flexion) of the thoracolumbar area, and the like.

Figure 25A:
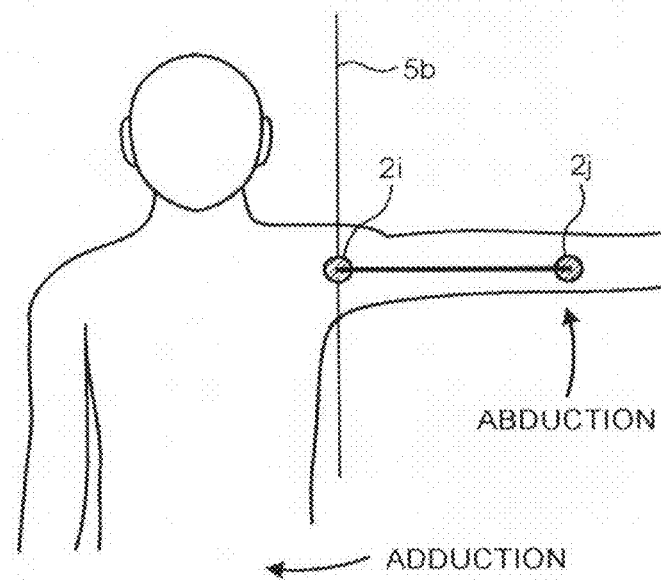
FIG. 25A is a drawing for explaining index values measured by the measuring unit according to the seventh embodiment while using sagittal plane information.
Figure 25B:
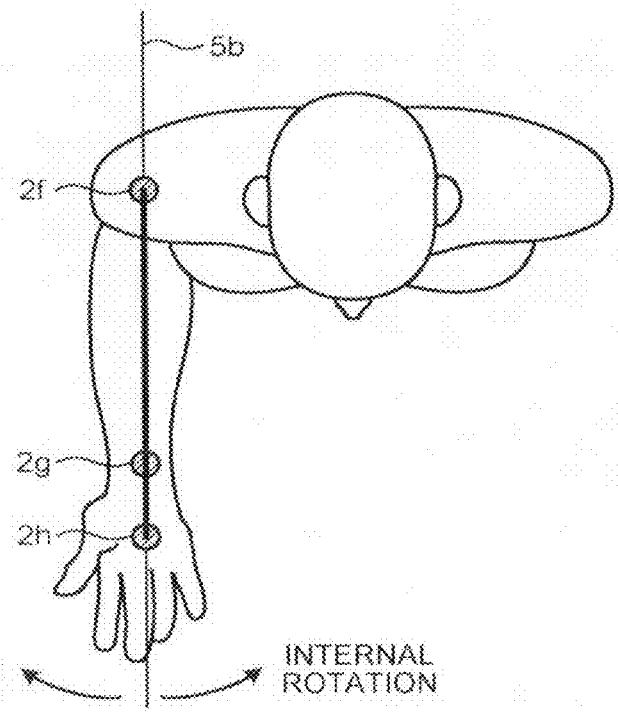
FIG. 25B is another drawing for explaining the index values measured by the measuring unit according to the seventh embodiment while using the sagittal plane information.
Figure 25C:
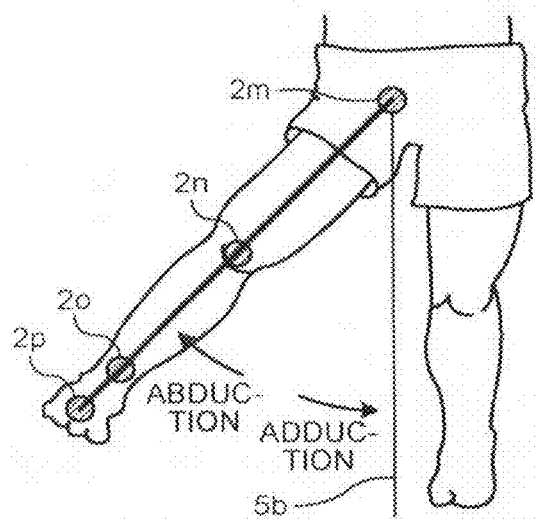
FIG. 25C is yet another drawing for explaining the index values measured by the measuring unit according to the seventh embodiment while using the sagittal plane information.
Figure 25D:
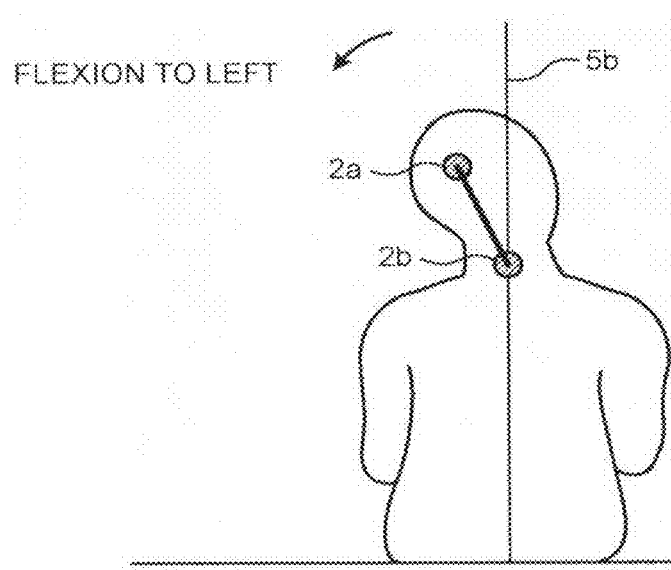
FIG. 25D is yet another drawing for explaining the index values measured by the measuring unit according to the seventh embodiment while using the sagittal plane information.

FIGS. 25A to 25E are drawings for explaining index values measured by the measuring unit 142b according to the seventh embodiment while using the sagittal plane information. FIG. 25A illustrates an index value for the abduction and the adduction of the shoulder. FIG. 25E illustrates an index value for the external rotation and the internal rotation of the shoulder. FIG. 25C illustrates an index value for the abduction and the adduction of the hip. FIG. 25D illustrates an index value for the lateral flexion (the left flexion and the right flexion) of the neck. FIG. 25E illustrates an index value for the lateral flexion (the left flexion and the right flexion) of the thoracolumbar area.

An example in which the index value for the abduction and the adduction of the shoulder is measured will be explained, with reference to FIG. 25A. FIG. 25A illustrates a view from the front of a subject, with an example in which the measuring unit 142b measures an index value for abduction and adduction of the left shoulder. FIG. 25A illustrates the example in which the sagittal plane 5b is set in such a position so as to pass through the joint 2i, for the sake of convenience in the explanation.

As illustrated in FIG. 25A, to measure the index value for the abduction and the adduction of the left shoulder, the measuring unit 142b measures the angle formed by the sagittal plane 5b and the left upper arm (the line connecting the joint 2i to the joint 2j), as the index value. More specifically, the measuring unit 142b measures the angle formed by the sagittal plane 5b and the line segment "from 2i to 2j", as the index value.

The index value measured by the measuring unit 142b is not limited to the example described above. For instance, the measuring unit 142b may measure the angle formed by the sagittal plane 5b and the line segment "from 2i to 2k (or 2l)", as an index value. Further, the position of the sagittal plane 5b is not limited to the examples illustrated in the drawings. The sagittal plane 5b may be parallel-displaced to a position arbitrarily selected by the user.

Further, in the above example, the left shoulder is used as the target of the measuring process, for the sake of convenience in the explanation. However, it is also possible to perform the measuring process on the right shoulder in the same manner. In that situation, for example, the measuring unit 142b measures the angle formed by the sagittal plane 5b and the right upper arm (the line connecting the joint 2e to the joint 2f (or 2g or 2h)), as an index value.

Next, an example in which the index value for the external rotation and the internal rotation of the shoulder is measured will be explained, with reference to FIG. 25B. FIG. 25B illustrates a view from above a subject, with an example in which the measuring unit 142b measures an index value for an external rotation and an internal rotation of the right shoulder. FIG. 25B illustrates the example in which the sagittal plane 5b is set in such a position so as to pass through the joint 2f, for the sake of convenience in the explanation.

As illustrated in FIG. 25B, to measure the index value for the external rotation and the internal rotation of the right shoulder, the measuring unit 142b measures the angle formed by the sagittal plane 5b and the right lower arm (the line connecting the joint 2f to the joint 2g), as the index value. More specifically, the measuring unit 142b measures the angle formed by the sagittal plane 5b and the line segment "from 2f to 2g", as the index value.

The index value measured by the measuring unit 142b is not limited to the example described above. For instance, the measuring unit 142b may measure the angle formed by the sagittal plane 5b and the line segment "from 2f to 2h", as an index value. Further, the position of the sagittal plane 5b is not limited to the examples illustrated in the drawings. The sagittal plane 5b may be parallel-displaced to a position arbitrarily selected by the user.

Further, in the above example, the right shoulder is used as the target of the measuring process, for the sake of convenience in the explanation. However, it is also possible to perform the measuring process on the left shoulder in the same manner. In that situation, for example, the measuring unit 142b measures the angle formed by the sagittal plane 5b and the left lower arm (the line connecting the joint 2j to the joint 2k (or 2l)), as an index value.

Next, an example in which the index value for the abduction and the adduction of the hip is measured will be explained, with reference to FIG. 25C. FIG. 25C illustrates a view from the front of a subject, with an example in which the measuring unit 142b measures an index value for abduction and adduction of the right hip. FIG. 25C illustrates the example in which the sagittal plane 5b is set in such a position so as to pass through the joint 2m, for the sake of convenience in the explanation.

As illustrated in FIG. 25C, to measure the index value for the abduction and the adduction of the right hip, the measuring unit 142b measures the angle formed by the sagittal plane 5b and the right thigh bone (the line connecting the joint 2m to the joint 2n), as the index value. More specifically, the measuring unit 142b measures the angle formed by the sagittal plane 5b and the line segment "from 2m to 2n", as the index value.

The index value measured by the measuring unit 142b is not limited to the example described above. For instance, the measuring unit 142b may measure the angle formed by the sagittal plane 5b and the line segment "from 2m to 2o (or 2p)", as an index value. Further, the position of the sagittal plane 5b is not limited to the examples illustrated in the drawings. The sagittal plane 5b may be parallel-displaced to a position arbitrarily selected by the user.

Further, in the above example, the right side is used as the target of the measuring process, for the sake of convenience in the explanation. However, it is also possible to perform the measuring process on the left side in the same manner. In that situation, for example, the measuring unit 142b measures the angle formed by the sagittal plane 5b and the left thigh bone (the line connecting the joint 2q to the joint 2r (or 2s or 2t)), as an index value.

Next, an example in which the index value for the lateral flexion (the right flexion and the left flexion) of the neck is measured will be explained, with reference to FIG. 25D. FIG. 25D illustrates a view from the back of a subject, with an example in which the measuring unit 142b measures the index value for the lateral flexion of the neck. FIG. 25D illustrates the example in which the sagittal plane 5b is set in such a position so as to pass through the joint 2b, for the sake of convenience in the explanation.

As illustrated in FIG. 25D, to measure the index value for the lateral flexion of the neck, the measuring unit 142b measures the angle formed by the sagittal plane 5b and the line connecting the joint 2b to the joint 2a, as the index value. More specifically, the measuring unit 142b measures the angle formed by the sagittal plane 5b and the line segment "from 2b to 2a", as the index value. Further, the position of the sagittal plane 5b is not limited to the examples illustrated in the drawings. The sagittal plane 5b may be parallel-displaced to a position arbitrarily selected by the user.

Next, an example in which the index value for the lateral flexion (the left flexion and the right flexion) of the thoracolumbar area is measured will be explained, with reference to FIG. 25E. FIG. 25E illustrates a view from the back of a subject, with an example in which the measuring unit 142b measures the index value for the lateral flexion of the thoracolumbar area. FIG. 25E illustrates the example in which the sagittal plane 5b is set in such a position so as to pass through the joint 2d, for the sake of convenience in the explanation.

As illustrated in FIG. 25E, to measure the index value for the lateral flexion of the thoracolumbar area, the measuring unit 142b measures the angle formed by the sagittal plane 5b and the line connecting the joint 2b to the joint 2c, as the index value. More specifically, the measuring unit 142b measures the angle formed by the sagittal plane 5b and the line segment "from 2b to 2c", as the index value.

The index value measured by the measuring unit 142b is not limited to the example described above. For instance, the measuring unit 142b may measure the angle formed by the sagittal plane 5b and the line segment "from 2b to 2d", as an index value. Further, for example, the measuring unit 142b may measure the angle formed by the sagittal plane 5b and the line segment "from 2a to 2c (or 2d)", as an index value. Further, the position of the sagittal plane 5b is not limited to the examples illustrated in the drawings. The sagittal plane 5b may be parallel-displaced to a position arbitrarily selected by the user.

As explained above, by using the sagittal plane information, the measuring unit 142b measures the index values for the rehabilitation such as, for example, the abduction and the adduction of the shoulder, the external rotation and the internal rotation of the shoulder, the abduction and the adduction of the hip, the lateral flexion (the left flexion and the right flexion) of the neck, the lateral flexion (the left flexion and the right flexion) of the thoracolumbar area, and the like. The index values measured by the measuring unit 142b while using the sagittal plane information are not necessarily limited to the examples described above. It is acceptable to measure an angle formed by the sagittal plane 5b and a line connecting two arbitrary joints together. Further, the index values measured by the measuring unit 142b while using the sagittal plane information are not limited to angles. For example, the measuring unit 142b may measure the distance between the sagittal plane 5b and the joint 2j, as an index value for the flexion and the extension of the left shoulder. Further, the measuring unit 142b may measure two or more of the index values described above at the same time.

The Horizontal Plane Information

By using the horizontal plane information, the measuring unit 142b measures index values for rehabilitation such as, for example, raising and lowering the shoulder girdle, an external rotation and an internal rotation of the shoulder, and the like.

Figure 26A:
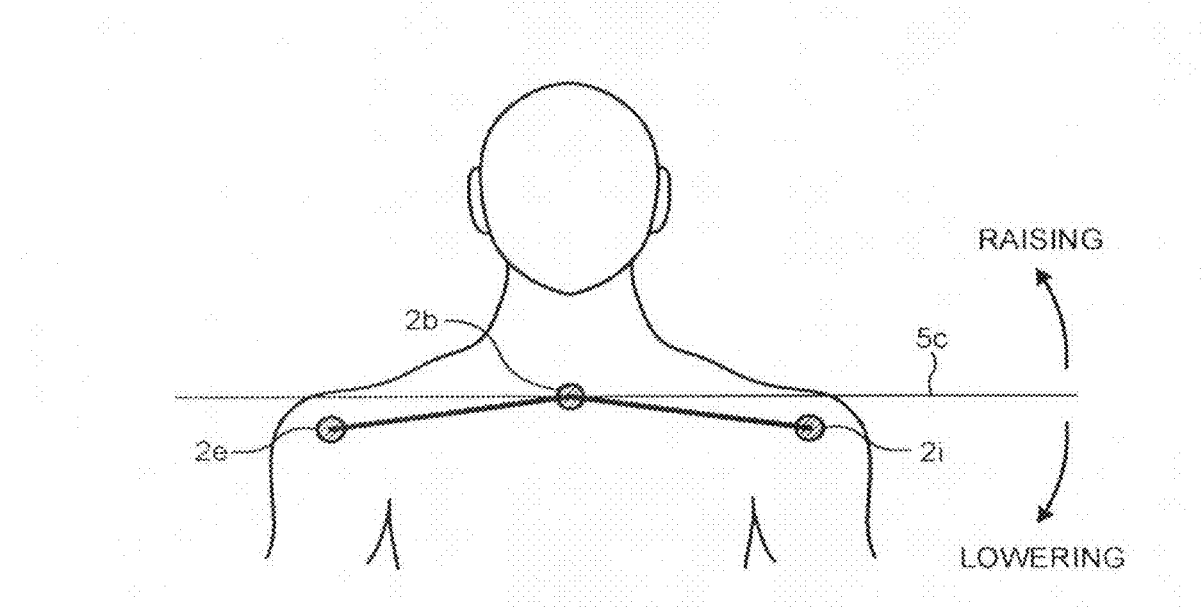
FIG. 26A is a drawing for explaining index values measured by the measuring unit according to the seventh embodiment while using horizontal plane information.
Figure 26B:
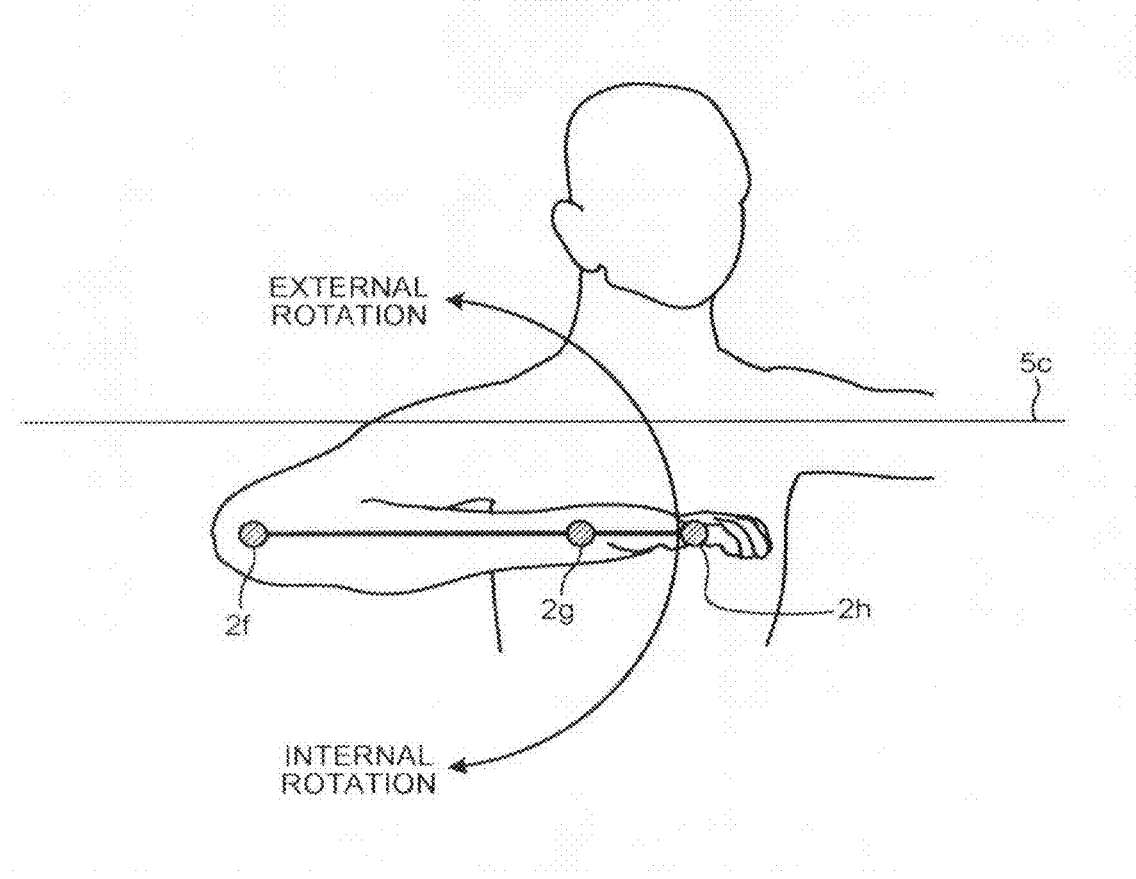
FIG. 26B is another drawing for explaining the index values measured by the measuring unit according to the seventh embodiment while using the horizontal plane information.

FIGS. 26A and 26B are drawings for explaining index values measured by the measuring unit 142b according to the seventh embodiment while using the horizontal plane information. FIG. 26A illustrates the index value for the raising and the lowering of the shoulder girdle. FIG. 26B illustrates the index value for the external rotation and the internal rotation of the shoulder.

An example in which the index value for the raising and the lowering of the shoulder girdle is measured will be explained, with reference to FIG. 26A. FIG. 26A illustrates a view from the front of a subject, with an example in which the measuring unit 142b measures an index value for raising and lowering of the left shoulder girdle. FIG. 26A illustrates the example in which the horizontal plane 5c is set in such a position so as to pass through the joint 2b, for the sake of convenience in the explanation.

As illustrated in FIG. 26A, to measure the index value for the raising and the lowering of the left shoulder girdle, the measuring unit 142b measures the angle formed by the horizontal plane 5c and the line connecting the joint 2b to the joint 2i, as the index value. More specifically, the measuring unit 142b measures the angle formed by the horizontal plane 5c and the line segment "from 2b to 2i", as the index value.

In the above example, the left side is used as the target of the measuring process, for the sake of convenience in the explanation. However, it is also possible to perform the measuring process on the right side in the same manner. In that situation, for example, the measuring unit 142b may measure the angle formed by the horizontal plane 5c and the line connecting the joint 2b to the joint 2e, as an index value. Further, the position of the horizontal plane 5c is not limited to the examples illustrated in the drawings. The horizontal plane 5c may be parallel-displaced to a position arbitrarily selected by the user.

Next, an example in which the index value for the external rotation and the internal rotation of the shoulder is measured will be explained, with reference to FIG. 26B. FIG. 26B illustrates a view from the front of a subject, with an example in which the measuring unit 142b measures an index value for an external rotation and an internal rotation of the right shoulder. FIG. 26B illustrates the example in which the horizontal plane 5c is set in such a position so as to pass through the joint 2f, for the sake of convenience in the explanation.

As illustrated in FIG. 26B, to measure the index value for the external rotation and the internal rotation of the right shoulder, the measuring unit 142b measures the angle formed by the horizontal plane 5c and the right lower arm (the line connecting the joint 2f to the joint 2g), as the index value. More specifically, the measuring unit 142b measures the angle formed by the horizontal plane 5c and the line segment "from 2f to 2g", as the index value.

The index value measured by the measuring unit 142b is not limited to the example described above. For instance, the measuring unit 142b may measure the angle formed by the horizontal plane 5c and the line segment "from 2f to 2h", as an index value. Further, the position of the horizontal plane 5c is not limited to the examples illustrated in the drawings. The horizontal plane 5c may be parallel-displaced to a position arbitrarily selected by the user.

In the above example, the right shoulder is used as the target of the measuring process, for the sake of convenience in the explanation. However, it is also possible to perform the measuring process on the left side in the same manner. In that situation, for example, the measuring unit 142b may measure the angle formed by the horizontal plane 5c and the left lower arm (the line connecting the joint 2j to the joint 2k (or 2l)), as an index value.

As explained above, by using the horizontal plane information, the measuring unit 142b measures the index values for the rehabilitation such as, for example, the raising and the lowering of the shoulder girdle, the external rotation and the internal rotation of the shoulder, and the like. The index values measured by the measuring unit 142b while using the horizontal plane information are not necessarily limited to the examples described above. It is acceptable to measure an angle formed by the horizontal plane 5c and a line connecting two arbitrary joints together. Further, the index values measured by the measuring unit 142b while using the horizontal plane information are not limited to angles. For example, the measuring unit 142b may measure the distance between the horizontal plane 5c and the joint 2i, as an index value for the raising and the lowering of the left shoulder girdle. Further, the measuring unit 142b may measure two or more of the index values described above at the same time.

Returning to the description of FIG. 22, the display controlling unit 143 is configured to exercise display control over the measured index values. For example, the display controlling unit 143 displays, on the output unit 110, at least one of the following: the color image information; the reference information set by the setting unit 142a; and a site serving as a target of the measuring process performed by the measuring unit 142b.

FIG. 27 is a drawing for explaining a process performed by the display controlling unit 143 according to the seventh embodiment. FIG. 27 is an example of a display screen 9a displayed by the display controlling unit 143, while flexion and extension of the right shoulder are performed. The display screen 9a includes a display image 9b, a chart 9c, a chart 9d, normal movable range information 9e, and important notice information 9f. Of these displayed items, the display image 9b is obtained by superimposing the coronal plane 5a set by the setting unit 142a and the right upper arm (the line connecting the joint 2e to the joint 2f) serving as the target of the measuring process performed by the measuring unit 142b, on the color image information obtained by the obtaining unit 141. Further, in the chart 9c, the vertical axis expresses the angle, whereas the horizontal axis expresses the chronological changes. Further, the chart 9d expresses the maximum angle of the rehabilitation that is performed at this time. The point 9g indicates the maximum angle of the flexion. The point 9h indicates the maximum angle of the extension. The bar 9i indicates a current angle. Further, the normal movable range information 9e indicates normal ranges of the index values for the rehabilitation that is performed at this time. The important notice information 9f indicates an important notice for the rehabilitation that is performed at this time. The information included in the normal movable range information 9e and the important notice information 9f is stored in the storage unit 130, for each of the specifics of the rehabilitation.

As illustrated in FIG. 27, the display controlling unit 143 generates the display image 9b by superimposing the coronal plane 5a set by the setting unit 142a and the right upper arm serving as the target of the measuring process performed by the measuring unit 142b, on the color image information stored in the motion information storage unit 131. After that, the display controlling unit 143 causes the output unit 110 to display the generated display image 9b. Although FIG. 27 is depicted in monochrome for the sake of convenience in the explanation, it is desirable to display the items displayed in the superimposed manner in mutually-different colors. For example, the coronal plane 5a may be displayed as a blue translucent plane, whereas the right upper arm may be displayed by using a red straight line. Further, the colors are not limited to those mentioned in the example, and it is acceptable to realize the display by arbitrarily selecting any colors that are not included in the color image used as the background image. Further, the modes of the display are not limited to the example illustrated in the drawing. For instance, the coronal plane 5a may be displayed in a size different from that illustrated in the drawing. The right upper arm may be displayed with a straight line that is longer than that illustrated in the drawing. Further, the charts 9c and 9d are not limited to the examples illustrated in the drawing. For instance, the charts may be in different formats such as pie charts. Further, the methods for displaying the current angle (the measured result) are not limited to those using the charts 9c and 9d. For instance, it is acceptable to display the current angle by using numerals in an arbitrary position of the screen. More specifically, the current angle (the numeral) may be displayed near the right upper arm in the display image 9b or may be displayed together with animation (a moving picture of an illustration) that is created to depict a person moving his/her arm.

Further, the display controlling unit 143 obtains the angle for each of the frames from the index value storage unit 133. After that, the display controlling unit 143 calculates an average value of the angles for a predetermined number of frames and plots the average values into the chart 9c. The display controlling unit 143 updates the chart 9c every time a value is plotted. Although FIG. 27 is depicted in monochrome for the sake of convenience in the explanation, it is desirable to display the plotted result (the waveform in the chart) in a color (e.g., by using a light blue curve) that is different from the color of the background. The color is not limited to this example. It is also acceptable to display the plotted result by arbitrarily selecting a color that is, for example, different from that of the graduation lines of the chart. The plotted result does not necessarily have to be the average value. For example, it is acceptable to plot angles each corresponding to one of a number of frames. The intent of these configurations is that the plotted chart is continuously displayed.

Further, the display controlling unit 143 displays the point 9g and the point 9h indicating the maximum angles. For example, the display controlling unit 143 obtains the angle for each of the frames from the index value storage unit 133. After that, the display controlling unit 143 calculates an average value of the angles for a predetermined number of frames and stores the calculated average values. Subsequently, the display controlling unit 143 determines the largest value among the already-calculated average values of the angles to be the maximum angle for the flexion and plots the maximum angle as the point 9g. Further, the display controlling unit 143 determines the smallest value among the already-calculated average values of the angles to be the maximum angle for the extension and plots the maximum angle as the point 9h. After that, the display controlling unit 143 updates and displays the points 9g and 9h indicating the maximum angles and the chart 9d including the bar 9i that indicates the current value to be compared with the points 9g and 9h. Although FIG. 27 is depicted in monochrome for the sake of convenience in the explanation, it is desirable to display the points 9g and 9h and the bar 9i in mutually-different colors. For example, the points 9g and 9h may be displayed in yellow, whereas the bar 9i may be displayed in blue. Further, the colors are not limited these examples. It is acceptable to display the points and the bar by arbitrarily selecting colors that are different from that of the graduation lines.

Further, the display controlling unit 143 displays, on the output unit 110, the normal movable range information 9e and the important notice information 9f. For example, the display controlling unit 143 obtains, from the storage unit 130, the normal movable range information 9e and the important notice information 9f that correspond to the index value measured by the measuring unit 142b. After that, the display controlling unit 143 displays the normal movable range information 9e and the important notice information 9f that were obtained, on the output unit 110. In the example illustrated in FIG. 27, the display controlling unit 143 displays "normal movable range for flexion: 0 to 180 degrees" and "normal movable range for extension: 0 to 50 degrees" as the normal movable range information 9e. In addition, the display controlling unit 143 displays "Important Notice: Stabilize body trunk so as not to move. Ensure that spine is not flexed forward or rearward" as the important notice information 9f. The present example uses the normal movable range information 9e and the important notice information 9f that are displayed when the index value for the flexion and the extension of the shoulder has been measured; however, the displayed information is not limited to the example illustrated in the drawing. For instance, the storage unit 130 stores therein pieces of normal movable range information 9e and pieces of important notice information 9f in correspondence with the index values for the rehabilitation. Further, the display controlling unit 143 obtains, from the storage unit 130, one of the pieces of normal movable range information 9e and one of the pieces of important notice information 9f in accordance with an index value measured by the measuring unit 142b and displays the obtained pieces of information. The region indicated with hatching in the chart 9d corresponds to the normal movable range.

In the seventh embodiment, the example is explained in which the index value is measured by setting one reference plane, when each type of rehabilitation is performed. However, possible embodiments are not limited to this example. For instance, it is acceptable to measure an index value by using two or more reference planes. More specifically, for the flexion and the extension of the left shoulder (FIG. 24A), the motion information processing apparatus 100 may measure the angle formed by the coronal plane 5a and the left upper arm (from 2i to 2j) as an index value and may measure the angle formed by the sagittal plane 5b and the left upper arm (from 2i to 2j) as a deviation in the rehabilitation motion. Further, by integrating the measured index value and the deviation together, the motion information processing apparatus 100 may perform an evaluation while taking the deviation into account.

Next, a procedure in a process performed by the motion information processing apparatus 100 according to the seventh embodiment will be explained. FIG. 28 is a flowchart of the procedure in the process performed by the motion information processing apparatus 100 according to the seventh embodiment.

As illustrated in FIG. 28, the obtaining unit 141 obtains motion information of a subject (step S401). For example, after the electric power sources of the motion information acquiring unit 10 and the motion information processing apparatus 100 are turned on, every time skeleton information corresponding to one frame is stored into the motion information storage unit 131, the obtaining unit 141 obtains, from the motion information storage unit 131, the stored skeleton information and color image information of the frame corresponding to the stored skeleton information.

When having received a setting instruction (step S402: Yes), the setting unit 142a sets reference information, by using the motion information corresponding to an initial state of the subject (step S403). For example, when having received a setting instruction indicating that coronal plane information should be set, the setting unit 142a sets coronal plane information by using the motion information corresponding to the time at which the instruction was received. The setting unit 142a is in a standby state until the setting instruction is received (step S402: No).

When having received a start instruction (step S404: Yes), every time motion information is obtained by the obtaining unit 141, the measuring unit 142b measures an index value for rehabilitation by using the obtained motion information and the reference information set by the setting unit 142a (step S405). For example, to measure an index value for flexion and extension of the left shoulder, the measuring unit 142b measures the angle formed by the coronal plane 5a and the left upper arm (the line connecting the joint 2i to the joint 2j), as the index value. The measuring unit 142b is in a standby state until the start instruction is received (step S404: No).

The display controlling unit 143 exercises display control over the measured index value (step S406). For example, as illustrated in FIG. 27, the display controlling unit 143 displays, on the output unit 110, at least one of the following: the color image information, the reference information set by the setting unit 142a; and the site serving as the target of the measuring process performed by the measuring unit 142b.

Until the display controlling unit 143 receives an end instruction indicating that the display control should be ended (step S407: No), the process advances to step S405 so that the process at step S405 and the process at step S406 are repeatedly performed. After that, when the end instruction is received (step S407: Yes), the display controlling unit 143 ends the process.

As explained above, when the rehabilitation is performed, the motion information processing apparatus 100 according to the seventh embodiment sets the reference information that serves as a reference for the evaluation, on the basis of the motion information of the subject in the initial state. After that, by using the set reference information and the motion information, the motion information processing apparatus 100 measures the index value that serves as an index for the rehabilitation. Accordingly, the motion information processing apparatus 100 is able to evaluate the various types of rehabilitation.

For example, as the reference information, the motion information processing apparatus 100 sets the reference plane represented by at least one of the coronal plane, the sagittal plane, and the horizontal plane, and further measures the index value for the rehabilitation by using the set reference plane and the motion information. Accordingly, the motion information processing apparatus 100 is able to measure the index values even if the rehabilitation is performed on various sites such as the upper limbs, the lower limbs, the body trunk, and the like.

Further, for example, the motion information processing apparatus 100 displays at least one of the following: the image information including the reference plane and the site serving as the target of the index value measuring process; and the chart indicating the index value. Accordingly, the motion information processing apparatus 100 is able to visually display the index value and to clearly display the changes in the numerical value of the index value.

Further, for example, the motion information processing apparatus 100 displays at least one of the following: the normal movable range information indicating the range of normal index values for the rehabilitation; and the important notice information indicating the important notice for the rehabilitation. Accordingly, the motion information processing apparatus 100 is able to guarantee the quality of the performed rehabilitation, even if the subject and/or the caregiver are not a rehabilitation expert.

Eighth Embodiment

In the seventh embodiment, the example is explained in which the motion information processing apparatus 100 evaluates the various types of rehabilitation by setting the reference planes. However, possible embodiments are not limited to this example. For instance, the motion information processing apparatus 100 may evaluate rehabilitation by setting a reference line that serves as a line of reference for an evaluation regarding a motion of the rehabilitation. Thus, as the eighth embodiment, an example will be explained in which the motion information processing apparatus 100 evaluates rehabilitation by setting the reference line.

The motion information processing apparatus 100 according to the eighth embodiment has a similar configuration to that of the motion information processing apparatus 100 illustrated in FIG. 22, except that the processes performed by the setting unit 142a and the measuring unit 142b are partially different. Accordingly, the eighth embodiment will be explained below while a focus is placed on the difference from the seventh embodiment. The elements having the same functions as those in the configuration explained in the seventh embodiment will be referred to by using the same reference characters as in FIG. 22, and the explanation thereof will be omitted.

The setting unit 142a according to the eighth embodiment has a similar function to that of the setting unit 142a described in the seventh embodiment. Additionally, the setting unit 142a according to the eighth embodiment is configured to set reference line information that is information about a reference line that serves as a line of reference for the evaluation regarding a motion of rehabilitation, by using the motion information of the subject obtained by the obtaining unit 141.

In one example, the setting unit 142a receives a setting instruction indicating that reference line information should be set. The setting instruction includes specifics of the rehabilitation to be performed at this time. For example, the setting unit 142a receives a setting instruction indicating that rehabilitation of flexion and extension of the right elbow is to be performed, from the user (including a caregiver and the subject) who uses the motion information processing apparatus 100. When having received the setting instruction, the setting unit 142a calculates the upper right arm (the line connecting the joint 2e to the joint 2f) by using the motion information corresponding to the time at which the instruction was received and sets information about the calculated right upper arm as reference line information. After that, the setting unit 142a outputs the reference line information that was set, to the measuring unit 142b.

In another example, the setting unit 142a receives, from the user, a setting instruction indicating that rehabilitation of flexion and extension of the left knee is to be performed. When having received the setting instruction, the setting unit 142a calculates the left thigh bone (the line connecting the joint 2q to the joint 2r) by using the motion information corresponding to the time at which the setting instruction was received and sets information about the calculated left thigh bone as reference line information. After that, the setting unit 142a outputs the reference line information that was set, to the measuring unit 142b.

The measuring unit 142b according to the eighth embodiment has a similar function to that of the measuring unit 142b described in the seventh embodiment. Additionally, the measuring unit 142b according to the eighth embodiment is configured to measure an index value that serves as an index for an evaluation of the rehabilitation, by using the reference line information that was set by the setting unit 142a.

The index value measured by the measuring unit 142b according to the eighth embodiment while using the reference line information will be explained, with reference to FIGS. 29A and 29B. FIGS. 29A and 29B are drawings for explaining index values measured by the measuring unit 142b according to the eighth embodiment while using the reference line information. FIG. 29A illustrates a view from the back of a subject, with an example in which the measuring unit 142b measures an index value for flexion and extension of the right elbow. FIG. 29A(a) illustrates an example in which the right elbow is flexed, whereas FIG. 29A(b) illustrates an example in which the right elbow is extended. Further, FIG. 29B illustrates a view from the left side of a subject, with an example in which the measuring unit 142b measures an index value for flexion and extension of the left leg. FIG. 29B(a) illustrates an example in which the left leg is flexed, whereas FIG. 29B(b) illustrates an example in which the left leg is extended.

As illustrated in FIG. 29A, to measure the index value for the flexion and the extension of the right elbow, the measuring unit 142b measures the angle formed by the right upper arm (the line connecting the joint 2e to the joint 2f) set by the setting unit 142a and the right lower arm (the line connecting the joint 2f to the joint 2g), as the index value. More specifically, the measuring unit 142b measures the angle formed by the set line segment "from 2e to 2f" and the line segment "from 2f to 2g", as the index value.

Further, as illustrated in FIG. 29B, to measure the index value for the flexion and the extension of the left leg, the measuring unit 142b measures the angle formed by the left thigh bone (the line connecting the joint 2q to the joint 2r) set by the setting unit 142a and the left tibia (the line connecting the joint 2r to the joint 2s), as the index value. More specifically, the measuring unit 142b measures the angle formed by the set line segment "from 2q to 2r" and the line segment "from 2r to 2s", as the index value.

The index values measured by the measuring unit 142b are not limited to the examples described above. For instance, to measure an index value for the flexion and the extension of the left leg (FIG. 29B), the measuring unit 142b may measure the angle formed by the coronal plane 5a explained in the seventh embodiment and the left tibia (the line connecting the joint 2r to the joint 2s), as the index value.

As explained above, when the rehabilitation is performed, the motion information processing apparatus 100 according to the eighth embodiment sets the reference line information that serves as a reference for the evaluation, on the basis of the motion information of the subject in the initial state. After that, the motion information processing apparatus 100 measures the index value that serves as an index for the rehabilitation, by using the reference line information that was set and the motion information. Accordingly, the motion information processing apparatus 100 is able to evaluate the various types of rehabilitation.

Ninth Embodiment

In the embodiments described above, the examples are explained in which the motion information processing apparatus 100 measures, as the index value, the angle formed by the reference plane or the reference line and the measuring target site of the subject who is performing the rehabilitation. However, possible embodiments are not limited to these examples. For instance, the motion information processing apparatus 100 may use a reference plane or a reference line to measure an exercise in a rotation direction by using the depth information. Thus, in the ninth embodiment, examples will be explained in which the motion information processing apparatus 100 measures index values for exercises in rotation directions, by using a reference plane or a reference line.

Figure 30:
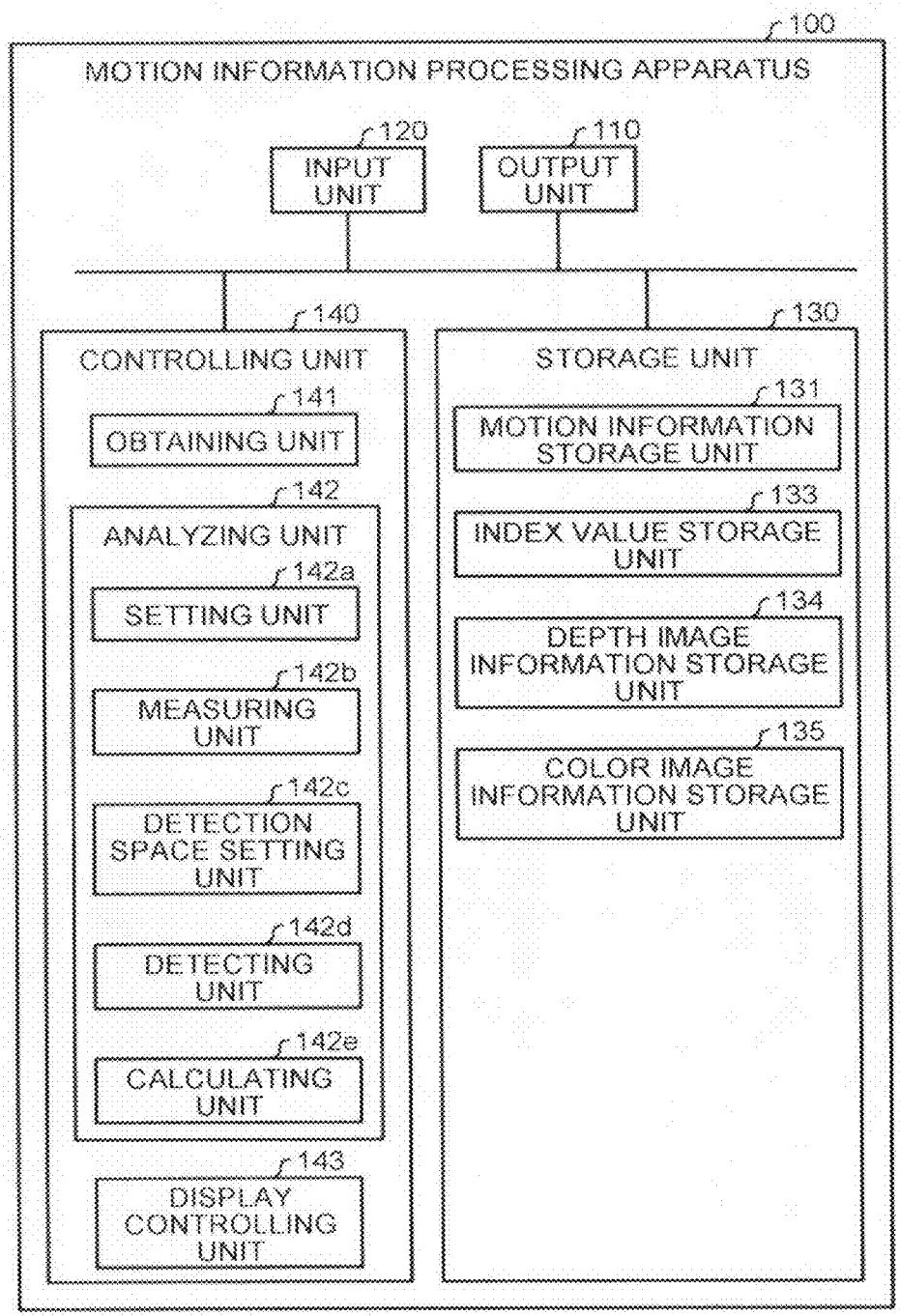
FIG. 30 is a block diagram of an exemplary detailed configuration of a motion information processing apparatus according to a ninth embodiment.

FIG. 30 is a block diagram of an exemplary detailed configuration of the motion information processing apparatus 100 according to the ninth embodiment. The motion information processing apparatus 100 according to the ninth embodiment is different from the motion information processing apparatus 100 illustrated in FIG. 22 for further including a detection space setting unit 142c, a detecting unit 142d, a calculating unit 142e, a depth image information storage unit 134, and a color image information storage unit 135. Thus, the ninth embodiment will be explained while a focus is placed on the difference from the seventh embodiment. The elements having the same functions as those in the configuration explained in the seventh embodiment will be referred to by using the same reference characters as in FIG. 22, and the explanation thereof will be omitted.

The depth image information storage unit 134 is configured to store therein the depth image information generated by the motion information acquiring unit 10. For example, every time a piece of depth image information is generated by the motion information acquiring unit 10, the generated piece of depth image information is stored into the depth image information storage unit 134.

The color image information storage unit 135 is configured to store therein the color image information acquired by the motion information acquiring unit 10. For example, every time a piece of color image information is acquired by the motion information acquiring unit 10, the acquired piece of color image information is stored into the color image information storage unit 135.

In the motion information storage unit 131, the depth image information storage unit 134, and the color image information storage unit 135, the coordinates of the joints in the skeleton information, the pixel positions in the depth image information, and the pixel positions in the color image information are kept in correspondence with one another, in advance. Further, the image taking time information of the skeleton information, the image taking time information of the depth image information, and the image taking time information of the color image information are also kept in correspondence with one another, in advance.

The obtaining unit 141 according to the ninth embodiment has a similar function to that of the obtaining unit 141 described in the seventh embodiment. Additionally, the obtaining unit 141 according to the ninth embodiment is configured to obtain the depth image information including the coordinate information and the depth information of a subject of taken images (hereinafter, "imaged subject") that is present in a space where rehabilitation is performed. For example, after the electric power sources of the motion information acquiring unit 10 and the motion information processing apparatus 100 are turned on, every time skeleton information corresponding to one frame is stored into the motion information storage unit 131, the obtaining unit 141 obtains the stored skeleton information and depth image information and color image information of the frame corresponding to the stored skeleton information, from the motion information storage unit 131, the depth image information storage unit 134, and the color image information storage unit 135, respectively.

Figure 31:
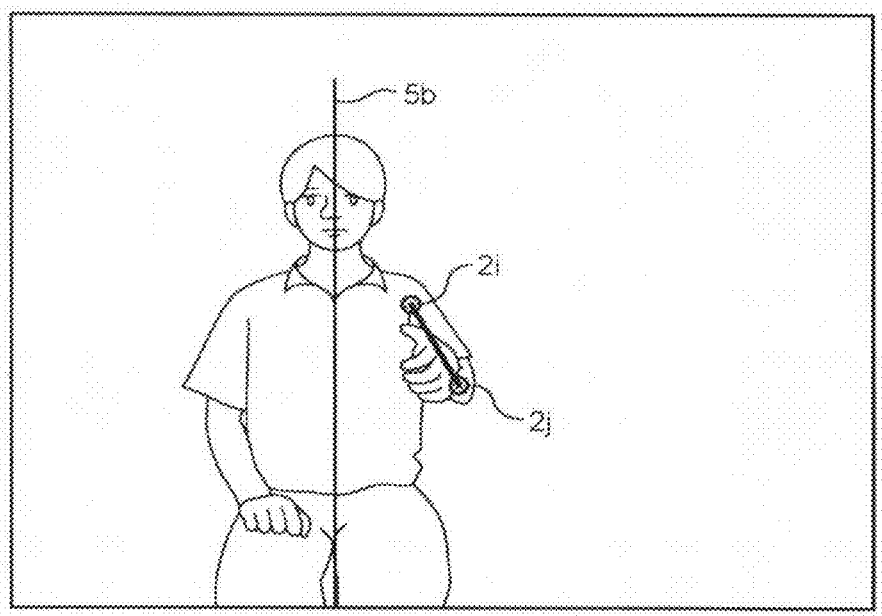
FIG. 31 is a drawing for explaining a process performed by a setting unit according to the ninth embodiment.

The setting unit 142a according to the ninth embodiment has a similar function to that of the setting unit 142a described in the seventh embodiment. FIG. 31 is a drawing for explaining a process performed by the setting unit 142a according to the ninth embodiment. As illustrated in FIG. 31, when rehabilitation of a rotation exercise of the left forearm is performed, the setting unit 142a sets sagittal plane information indicating the sagittal plane 5b. However, possible embodiments are not limited to this example. For instance, when the rehabilitation of the rotation exercise of the left forearm is performed, the setting unit 142a may set reference line information indicating the left upper arm (the line connecting the joint 2i to the joint 2j).

The detection space setting unit 142c according to the ninth embodiment is configured to set a detection space that includes a site serving as a processing target. For example, the detection space setting unit 142c receives an input designating a rehabilitation target site and specifics of an exercise, from the user via the input unit 120. Subsequently, the detection space setting unit 142c extracts the coordinates of the joint serving as a processing target from the motion information obtained by the obtaining unit 141, according to the site and the specifics of the exercise designated by the input. After that, the detection space setting unit 142c sets the detection space that includes the extracted coordinates of the joint, with respect to the space in which the rehabilitation is performed.

In this situation, the detection space setting unit 142c sets the detection space for the purpose of narrowing down the space in which the exercise in a rotation direction is performed, from the space in which the rehabilitation is performed. In other words, the detection space setting unit 142c narrows down the space in which the exercise in a rotation direction is performed with respect to the x-y-z directions. Further, as a result of narrowing down the space in the x-y directions, it becomes possible to analyze the exercise performed by the subject in a rotation direction, while distinguishing the exercise from other exercises or the positional changes of other imaged subjects. In a specific example, even when a forearm rotation exercise is performed with both arms, by setting a detection space centered on the position of each of the right and the left hands, it is possible to analyze the rotation exercises of both of the arms at the same time. In this situation, it is possible to graphically capture the exercise in a rotation direction performed in the detection space, by analyzing images taken in substantially the same image taking direction as the rotation axis. Details of this process will be explained later.

Figure 32A:
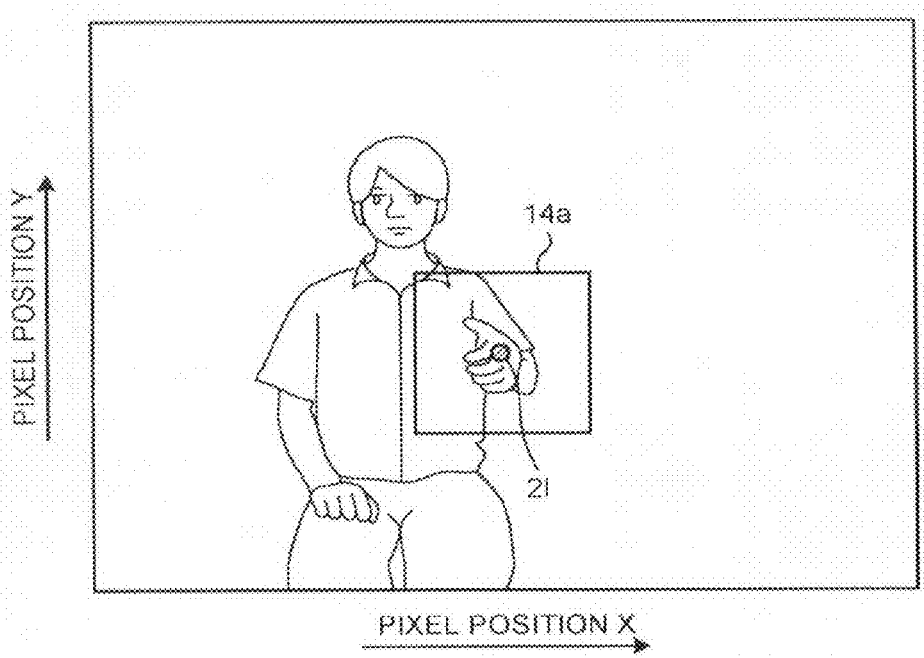
FIG. 32A is a drawing for explaining a process performed by a detection space setting unit according to the ninth embodiment.
Figure 32B:
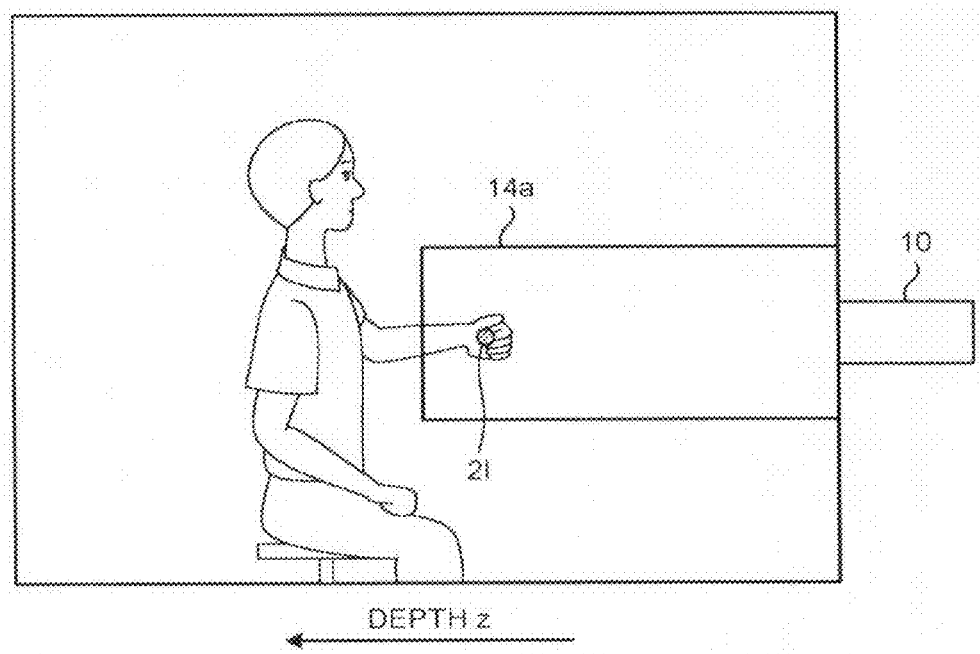
FIG. 32B is another drawing for explaining the process performed by the detection space setting unit according to the ninth embodiment.

FIGS. 32A and 32B are drawings for explaining a process performed by the detection space setting unit 142c according to the ninth embodiment. FIGS. 32A and 32B illustrate an example in which a person performs a rotation exercise of the left forearm. In this situation, it is assumed that the detection space setting unit 142c has received an input indicating that the rotation exercise of the left forearm is to be performed, from the user via the input unit 120. FIG. 32A illustrates a view from the front of the person performing the rotation exercise and corresponds to a color image taken by the motion information acquiring unit 10. The left-and-right direction of the color image corresponds to a "pixel position X" in the distance image coordinate system, whereas the up-and-down direction of a depth image corresponds to a "pixel position Y" in the distance image coordinate system. Further, FIG. 32B is a view from the side of the person performing the rotation exercise. The left direction in FIG. 32B corresponds to the z-axis direction of the world coordinate system, i.e., the depth.

As illustrated in FIGS. 32A and 32B, when having received the input indicating that the rotation exercise of the left forearm is to be performed, the detection space setting unit 142c extracts the coordinates of the joint 2l of the left hand from the motion information obtained by the obtaining unit 141. After that, the detection space setting unit 142c sets the extracted coordinates of the joint 2l, with respect to the space in which the rehabilitation is performed. A detection space 14a is expressed by using a world coordinate system. More specifically, for example, as for the x-axis direction of the detection space 14a, a 30-cm-long range centered on the x-axis direction value of the joint 2l is set. As for the y-axis direction of the detection space 14a, a 30-cm-long range centered on the y-axis direction value of the joint 2l is set. In other words, as illustrated in FIG. 32A, the range in the x-axis direction and the range in the y-axis direction of the detection space 14a are each expressed in the color image, as a result of the conversion into the distance image coordinate system (the range of the pixel position X and the range of the pixel position Y). Further, as for the z-axis direction of the detection space 14a, a range from the position having a value 1.2 times as large as the z-axis direction value of the joint 2l to the position of the motion information acquiring unit 10 is set, as illustrated in FIG. 32B. As explained here, the detection space setting unit 142c sets the prism-shaped space that includes the position of the joint serving as the processing target, as the detection space. The detection space set by the detection space setting unit 142c is not limited to the example described above. The values described above may arbitrarily be changed in accordance with the site serving as a processing target. Alternatively, the detection space setting unit 142c may set a space having an arbitrary shape such as a regular hexahedron or a sphere, as a detection space.

The detecting unit 142d according to the ninth embodiment is configured to detect a site of an imaged subject from the depth image information, on the basis of the depth information. For example, the detecting unit 142d detects the site serving as a processing target, by binarizing the depth image information while using the detection space set by the detection space setting unit 142c.

Figure 33:
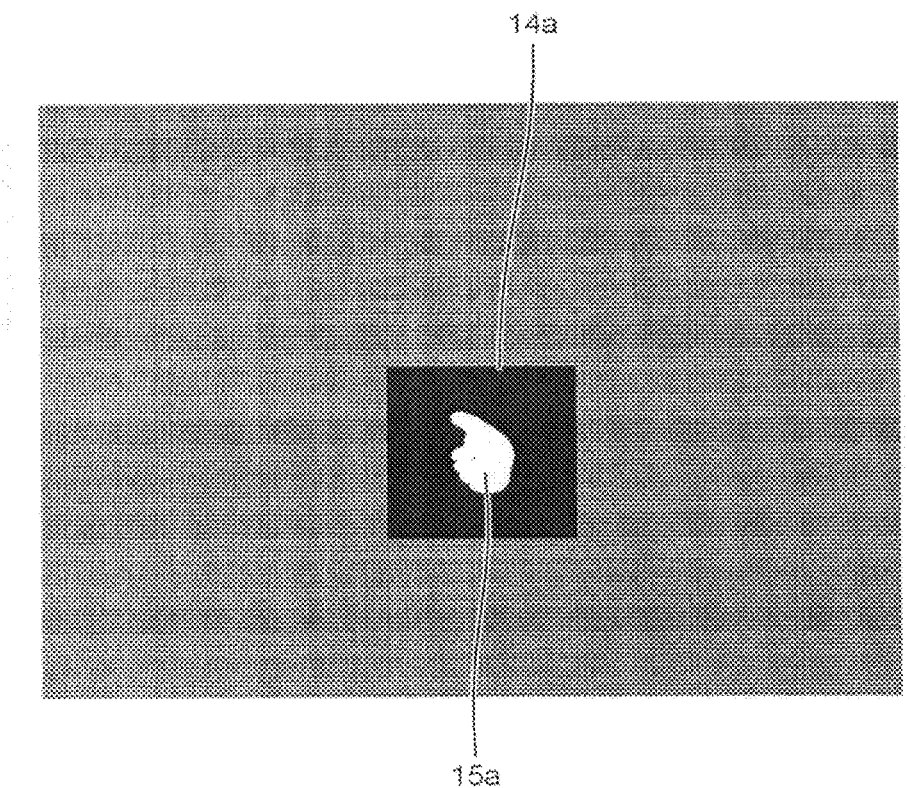
FIG. 33 is a drawing for explaining a process performed by a detecting unit according to the ninth embodiment.

FIG. 33 is a drawing for explaining a process performed by the detecting unit 142d according to the ninth embodiment. FIG. 33 illustrates an example in which the depth image corresponding to FIG. 32A is binarized. As illustrated in FIG. 33, within the depth image obtained by the obtaining unit 141, the detecting unit 142d determines the region defined by the range in the x-axis direction and the range in the y-axis direction of the detection space 14a, as a target of a detecting process. After that, the detecting unit 142d binarizes each of the pixels included in the region serving as the target of the detecting process, by using a value that is 1.2 times as large as the z-axis direction value of the joint 2l as a threshold value. In the example illustrated in FIG. 33, the detecting unit 142d binarizes each of the pixels by expressing pixels equal to or larger than the threshold value (i.e., the pixels at which the imaged subject is no present in the detection space 14a) in black and expressing pixels smaller than the threshold value (i.e., the pixels at which the imaged subject is present in the detection space 14a) in white. As a result, the detecting unit 142d detects a region 15a in which the left hand of the person is present in the depth image. Within the depth image, the region other than the detection space 14a is indicated with hatching, because the region is not the target of the detecting process.

The calculating unit 142e according to the ninth embodiment is configured to, by using the coordinate information of the site detected from the depth image information, calculate orientation information indicating the orientation of the site. For example, within the depth image binarized by the detecting unit 142d, the calculating unit 142e determines the region defined by the range in the x-axis direction and the range in the y-axis direction of the detection space 14a, as a target of a calculating process. After that, within the region serving as the target of the calculating process, the calculating unit 142e calculates a gravity point of the site detected by the detecting unit 142d. Subsequently, the calculating unit 142e calculates the long axis (the principal axis of inertia) of the detected site as the orientation information, by using the calculated gravity point. After that, the calculating unit 142e outputs the calculated orientation information to the measuring unit 142b.

Figure 34:
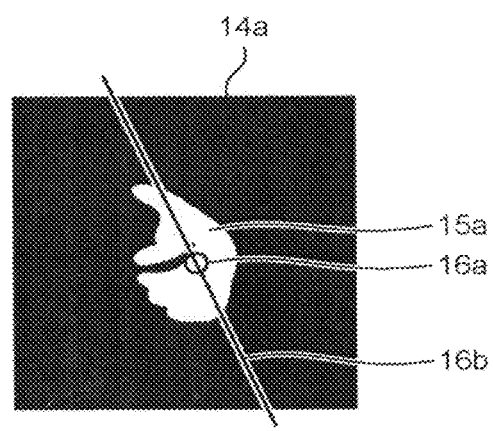
FIG. 34 is a drawing for explaining a process performed by a calculating unit according to the ninth embodiment.

FIG. 34 is a drawing for explaining a process performed by the calculating unit 142e according to the ninth embodiment. FIG. 34 illustrates an example in which the calculating unit 142e calculates a gravity point 16a and a long axis 16b of the region 15a detected in FIG. 33.

As illustrated in FIG. 34, the calculating unit 142e calculates the gravity point 16a of the region 15a by using Expressions (1) and (2) below. In Expressions (1) and (2), Xc denotes the X-coordinate value of the gravity point 16a, whereas Yc denotes the Y-coordinate value of the gravity point 16a. Further, X denotes the X-coordinate value of each of the pixels included in the detection space 14a, whereas Y denotes the Y-coordinate value of each of the pixels included in the detection space 14a. Further, f(X,Y) is "1" if the pixel at coordinates (X,Y) is white and is "0" if the pixel at coordinates (X,Y) is black.

$$Xc = \Sigma X \times f(X,Y)/\text{sum}(f(X,Y)) \quad (1)$$

$$Yc = \Sigma Y \times f(X,Y)/\text{sum}(f(X,Y)) \quad (2)$$

After that, the calculating unit 142e calculates the angle of the long axis 16b of the region 15a, by using Expressions (3) to (6) below. In Expressions (3) to (6), σX denotes a variance of the pixel in the X-axis direction, whereas σY denotes a variance of the pixel in the Y-axis direction. Further, σXY denotes a covariance of X and Y, whereas θ denotes the angle of the long axis 16b with respect to the left-and-right direction (the horizontal direction) of FIG. 34.

$$\sigma X = \Sigma(X-Xc)^2 \times f(X,Y)) \quad (3)$$

$$\sigma Y = \Sigma(Y-Yc)^2 \times f(X,Y)) \quad (4)$$

$$\sigma XY = \Sigma((X-Xc) \times (Y-Yc) \times f(X,Y)) \quad (5)$$

$$\theta = a\tan 2(\sigma XY,(\sigma X - \sigma Y)) \quad (6)$$

The angle θ calculated above expresses an acute angle with respect to the left-and-right direction. Thus, the calculating unit 142e calculates a rotation angle of the rotation exercise by tracking the calculated angle. In a specific example, to evaluate the rotation exercise of the left forearm, the calculating unit 142e expresses a position at which the left thumb is pointed upward as 0 degrees, expresses supination with a positive angle, and expresses pronation with a negative angle. In that situation, the calculating unit 142e calculates an angle from the state where the subject performing the rehabilitation places the left hand at the 0-degree position and tracks the calculated angle. When the subject performs supination, because the angle changes from 0 degrees in the positive direction, the calculating unit 142e calculates the rotation angle as 0 degrees, 45 degrees, 90 degrees, 135 degrees, and so on, in accordance with the supination movement. In contrast, when the subject performs pronation, because the angle changes from 0 degrees in the negative direction, the calculating unit 142e calculates the rotation angle as 0 degrees, −45 degrees, −90 degrees, −135 degrees, and so on, in accordance with the pronation movement. To display the rotation angles of the pronation, the angles may be displayed as −45 degrees, −90 degrees, −135 degrees, and so on, or alternatively, may be displayed as pronation 45 degrees, pronation 90 degrees, pronation 135 degrees, and so on. For rotation exercises, for example, if the normal movable range is set to 0 to 90 degrees, the calculated rotation angles are evaluated within the range of 0 to 90 degrees.

As explained above, the calculating unit 142e calculates the angle θ of the long axis 16b extending from the gravity point 16a, every time a region 15a is detected. After that, the calculating unit 142e calculates the rotation angle of the rotation exercise for each of the frames by tracking the calculated angle. Subsequently, the calculating unit 142e calculates the long axes at the calculated rotation angles as the orientation information. After that, the calculating unit 142e outputs the calculated orientation information to the measuring unit 142b.

The measuring unit 142b according to the ninth embodiment has a similar function to that of the measuring unit 142b described in the seventh embodiment. Additionally, the measuring unit 142b according to the ninth embodiment is configured to measure an index value, by using the reference information set by the setting unit 142a and the orientation information calculated by the calculating unit 142e.

Figure 35:
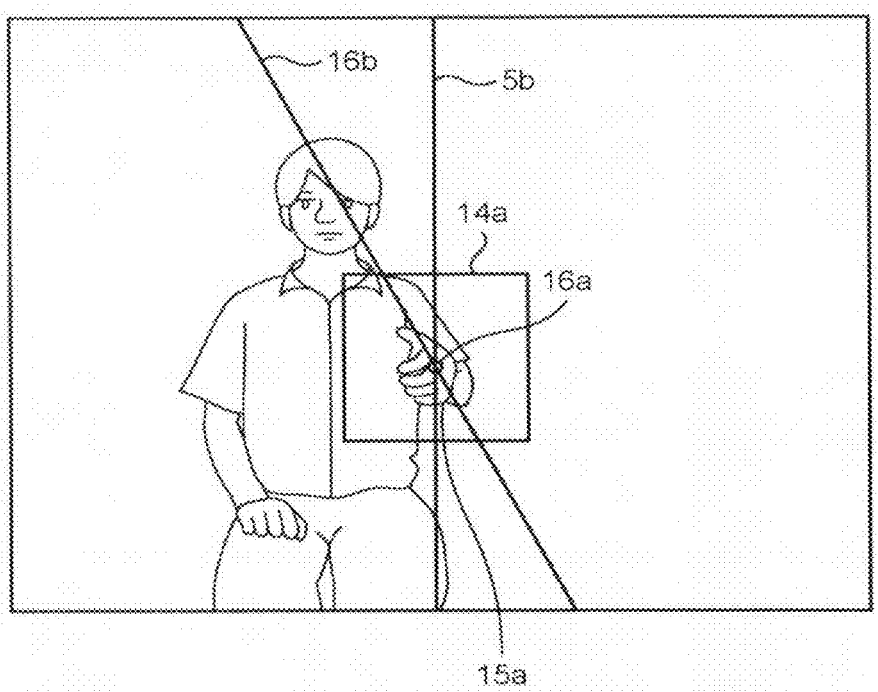
FIG. 35 is a drawing for explaining an index value measuring process performed by a measuring unit according to the ninth embodiment.

Next, an index value measuring process performed by the measuring unit 142b according to the ninth embodiment will be explained, with reference to FIG. 35. FIG. 35 is a drawing for explaining the index value measuring process performed by the measuring unit 142b according to the ninth embodiment. FIG. 35 illustrates a view from the front of a subject, with an example in which the measuring unit 142b measures an index value for a rotation exercise of the left forearm.

As illustrated in FIG. 35, to measure the index value for the rotation exercise of the left forearm, the measuring unit 142b measures the angle formed by the sagittal plane 5b set by the setting unit 142a and the long axis 16b calculated by the calculating unit 142e, as the index value.

The index value measured by the measuring unit 142b is not limited to the example described above. For instance, when the left upper arm (the line connecting the joint 2i to the joint 2j) is set as the reference information, the measuring unit 142b may measure the angle formed by the left upper arm and the long axis 16b, as an index value.

Further, the measuring unit 142b is also able to measure index values for other exercises in rotation directions, besides the rotation exercise of the forearm. Next, examples in which the measuring unit 142b according to the ninth embodiment measures index values for other exercises in rotation directions will be explained, with reference to FIGS. 36A to 36K. FIGS. 36A to 36K are drawings for explaining examples in which the measuring unit 142b according to the ninth embodiment measures index values for other exercises in rotation directions.

Figure 36A:
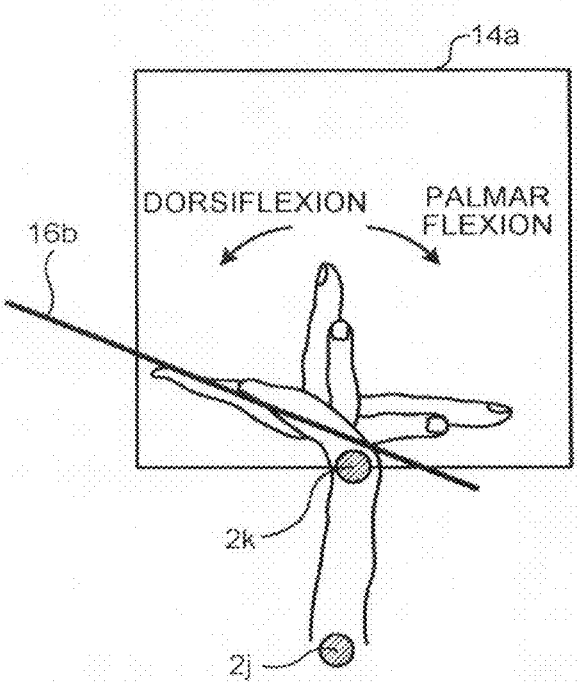
FIG. 36A is a drawing for explaining examples in which the measuring unit according to the ninth embodiment measures index values for other exercises in rotation directions.

An example in which an index value for dorsiflexion and palmar flexion of the hand is measured will be explained, with reference to FIG. 36A. FIG. 36A illustrates a view of the left hand of a subject from the thumb side, with an example in which the measuring unit 142b measures an index value for dorsiflexion and palmar flexion of the left hand. In FIG. 36A, the setting unit 142a sets the left lower arm (the line connecting the joint 2j to the joint 2k) as reference information, whereas a detection space 14a is set as indicated in the drawing.

As illustrated in FIG. 36A, to measure the index value for the dorsiflexion and the palmar flexion of the left hand, the measuring unit 142b measures the angle formed by the left lower arm and the long axis 16b, as the index value. In the above example, the left hand is used as the target of the measuring process, for the sake of convenience in the explanation. However, it is also possible to perform the measuring process on the right hand in the same manner. In that situation, for example, the measuring unit 142b measures the angle formed by the right lower arm (the line connecting the joint 2f to the joint 2g) and a long axis 16b calculated on the basis of the depth image information of the right hand, as an index value.

Figure 36B:
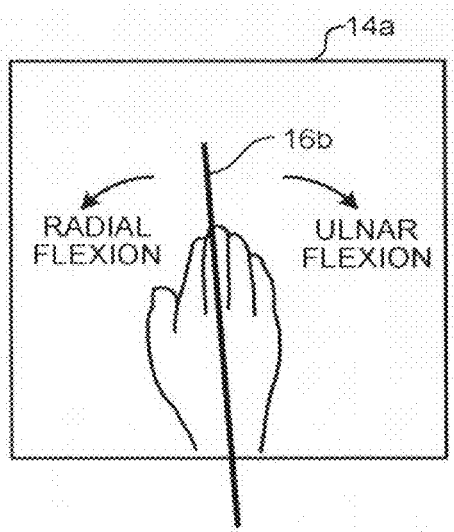
FIG. 36B is another drawing for explaining the examples in which the measuring unit according to the ninth embodiment measures the index values for other exercises in rotation directions.

Next, an example in which an index value for radial flexion and ulnar flexion of the hand is measured will be explained, with reference to FIG. 36B. FIG. 36B illustrates a view of the right hand of a subject from the palm side, with an example in which the measuring unit 142b measures an index value for radial flexion and ulnar flexion of the right hand. In FIG. 36B, the setting unit 142a sets the right lower arm (the line connecting the joint 2f to the joint 2g) as reference information, whereas a detection space 14a is set as indicated in the drawing.

As illustrated in FIG. 36B, to measure the index value for the radial flexion and the ulnar flexion of the right hand, the measuring unit 142b measures the angle formed by the right lower arm and the long axis 16b, as the index value. In the above example, the right hand is used as the target of the measuring process, for the sake of convenience in the explanation. However, it is also possible to perform the measuring process on the left hand in the same manner. In that situation, for example, the measuring unit 142b measures the angle formed by the left lower arm (the line connecting the joint. 2j to the joint 2k) and a long axis 16b calculated on the basis of the depth image information of the left hand, as an index value.

Figure 36C:
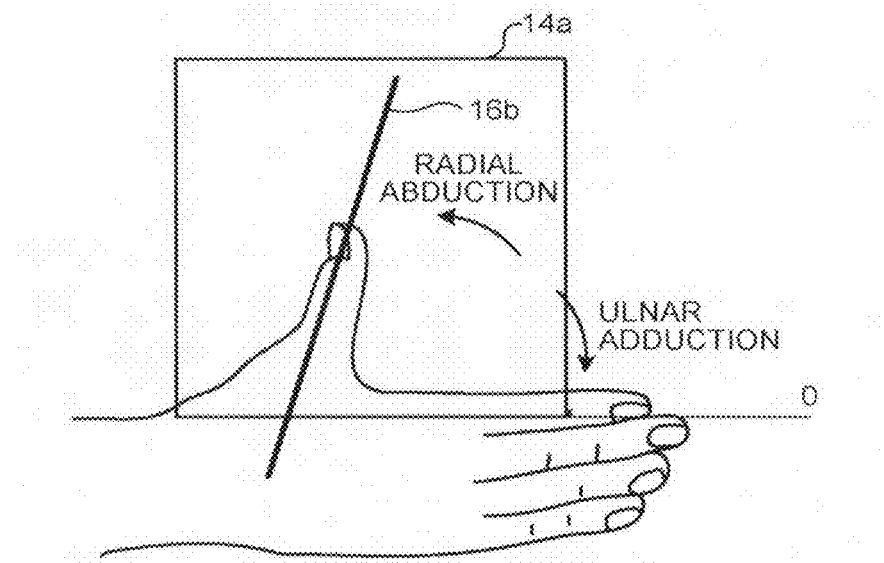
FIG. 36C is yet another drawing for explaining the examples in which the measuring unit according to the ninth embodiment measures the index values for other exercises in rotation directions.

Next, an example in which an index value for radial abduction and ulnar adduction of the pollex (the thumb) will be explained, with reference to FIG. 36C. FIG. 36C illustrates a view of the right hand of a subject from the palm side, with an example in which the measuring unit 142b measures an index value for radial abduction and ulnar adduction of the right pollex. In FIG. 36C, the setting unit 142a sets the right lower arm (the line connecting the joint 2f to the joint 2g) as reference information, whereas a detection space 14a is set as indicated in the drawing.

As illustrated in FIG. 36C, to measure the index value for the radial abduction and the ulnar adduction of the right pollex, the measuring unit 142b measures the angle formed by the right lower arm and the long axis 16b, as the index value. In the above example, the right hand is used as the target of the measuring process, for the sake of convenience in the explanation. However, it is also possible to perform the measuring process on the left hand in the same manner. In that situation, for example, the measuring unit 142b measures the angle formed by the left lower arm (the line connecting the joint 2j to the joint 2k) and a long axis 16b calculated on the basis of the depth image information of the left hand, as an index value.

Figure 36D:
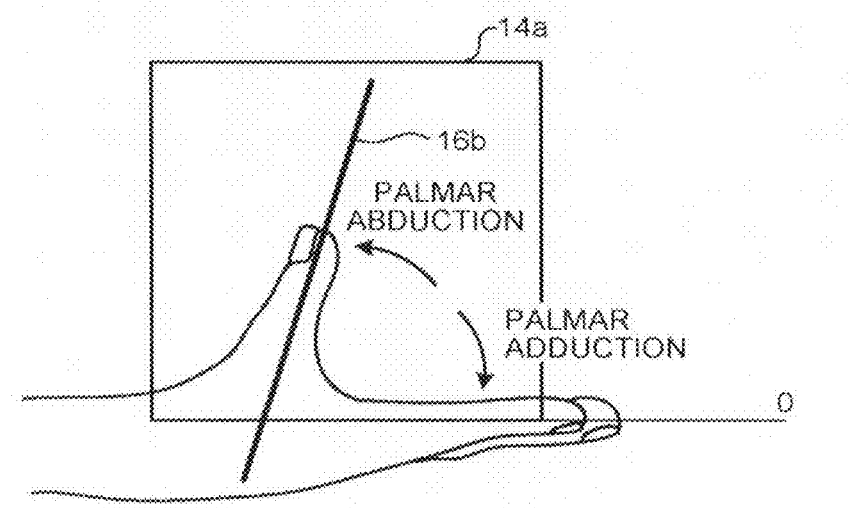
FIG. 36D is yet another drawing for explaining the examples in which the measuring unit according to the ninth embodiment measures the index values for other exercises in rotation directions.

Next, an example in which an index value for palmar abduction and palmar adduction of the pollex is measured will be explained, with reference to FIG. 36D. FIG. 36D illustrates a view of the right hand of a subject from the pollex side, with an example in which the measuring unit 142b measures an index value for palmar abduction and palmar adduction of the right pollex. In FIG. 36D, the setting unit 142a sets the right lower arm (the line connecting the joint 2f to the joint 2g) as reference information, whereas a detect ion space 14a is set as indicated in the drawing.

As illustrated in FIG. 36D, to measure the index value for the palmar abduction and the palmar adduction of the right pollex, the measuring unit 142b measures the angle formed by the right lower arm and the long axis 16b, as the index value. In the above example, the right hand is used as the target of the measuring process, for the sake of convenience in the explanation. However, it is also possible to perform the measuring process on the left hand in the same manner. In that situation, for example, the measuring unit 142b measures the angle formed by the left lower arm (the line connecting the joint 2j to the joint 2k) and a long axis 16b calculated on the basis of the depth image information of the left hand, as an index value.

Figure 36E:
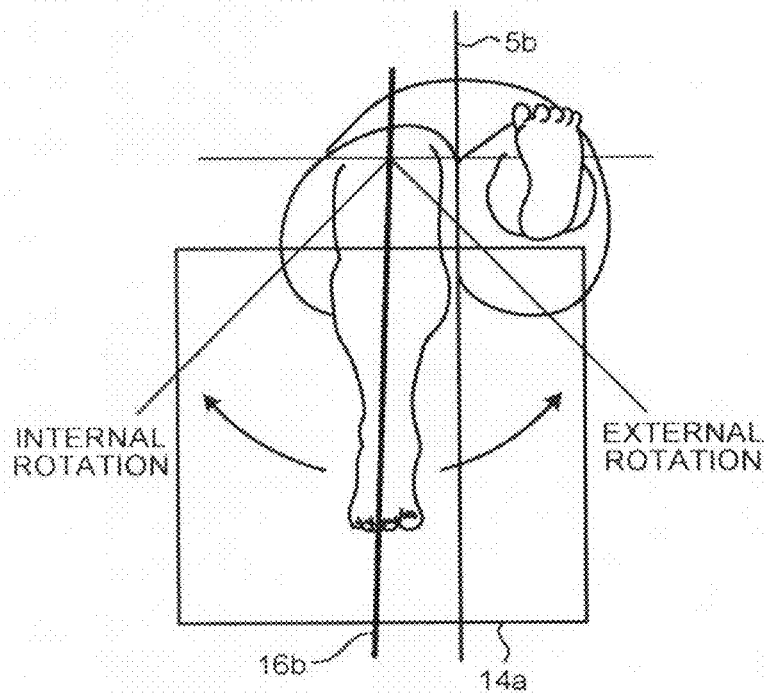
FIG. 36E is yet another drawing for explaining the examples in which the measuring unit according to the ninth embodiment measures the index values for other exercises in rotation directions.

Next, an example in which an index value for an external rotation and an internal rotation of the hip is measured will be explained, with reference to FIG. 36E. FIG. 36E illustrates a view of the right leg of a seated subject from the front, with an example in which the measuring unit 142b measures an index value for an external rotation and an internal rotation of the right leg. In FIG. 36E, the setting unit 142*a* sets the sagittal plane 5*b* as reference information, whereas a detection space 14*a* is set as indicated in the drawing.

As illustrated in FIG. 36E, to measure the index value for the external rotation and the internal rotation of the right leg, the measuring unit 142*b* measures the angle formed by the sagittal plane 5*b* and the long axis 16*b*, as the index value. In the above example, the right leg is used as the target of the measuring process, for the sake of convenience in the explanation. However, it is also possible to perform the measuring process on the left leg in the same manner. In that situation, for example, the measuring unit 142*b* measures the angle formed by the sagittal plane 5*b* and a long axis 16*b* calculated on the basis of the depth image information of the left leg, as an index value.

Figure 36F:
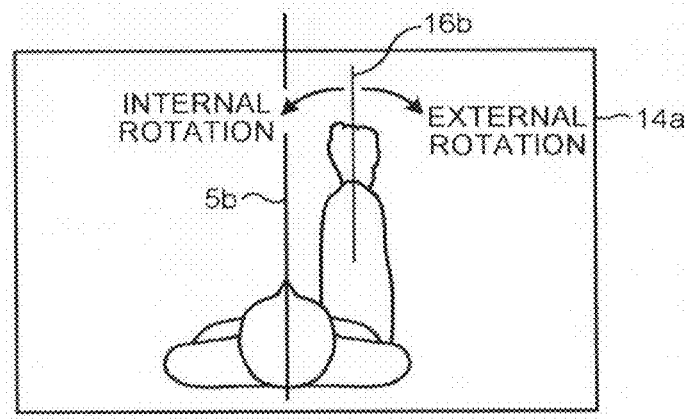
FIG. 36F is yet another drawing for explaining the examples in which the measuring unit according to the ninth embodiment measures the index values for other exercises in rotation directions.
Figure 36G:
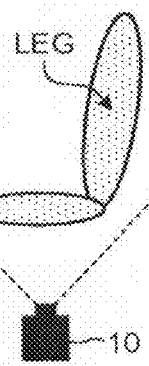
FIG. 36G is yet another drawing for explaining the examples in which the measuring unit according to the ninth embodiment measures the index values for other exercises in rotation directions.

Next, an example in which an index value for an external rotation and an internal rotation of the lower leg is measured will be explained, with reference to FIGS. 36F to 36H. FIG. 36F illustrates a view of a seated subject from the above, with an example in which the measuring unit 142*b* measures an index value for an external rotation and an internal rotation of the right lower leg. In FIG. 36F, the setting unit 142*a* sets the sagittal plane 5*b* as reference information, whereas a detection space 14*a* is set by using a depth image taken from below the right lower leg of the subject, as illustrated in FIG. 36G. As a result, a depth image illustrated in FIG. 36H is taken.

Figure 36H:
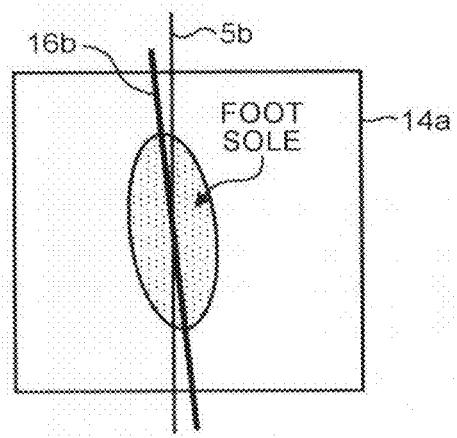
FIG. 36H is yet another drawing for explaining the examples in which the measuring unit according to the ninth embodiment measures the index values for other exercises in rotation directions.

As illustrated in FIG. 36H, to measure the index value for the external rotation and the internal rotation of the right lower leg, the measuring unit 142*b* measures the angle formed by the sagittal plane 5*b* and the long axis 16*b*, as the index value. In the above example, the right leg is used as the target of the measuring process, for the sake of convenience in the explanation. However, it is also possible to perform the measuring process on the left leg in the same manner. In that situation, for example, the measuring unit 142*b* measures the angle formed by the sagittal plane 5*b* and a long axis 16*b* calculated on the basis of the depth image information of the left leg, as an index value.

Next, an example in which an index value for dorsiflexion and plantar flexion of the foot is measured will be explained, with reference to FIG. 36I. FIG. 36I is a view of the left foot of a subject from the big toe side, with an example in which the measuring unit 142*b* measures an index value for dorsiflexion and plantar flexion of the left foot. In FIG. 36I, the setting unit 142*a* sets the horizontal plane 5*c* as reference information, whereas a detection space 14*a* is set as indicated in the drawing. FIG. 36I(a) illustrates an example in which the left foot is dorsiflexed, whereas FIG. 36I(b) illustrates an example in which the left foot is plantar flexed.

Figure 36J:
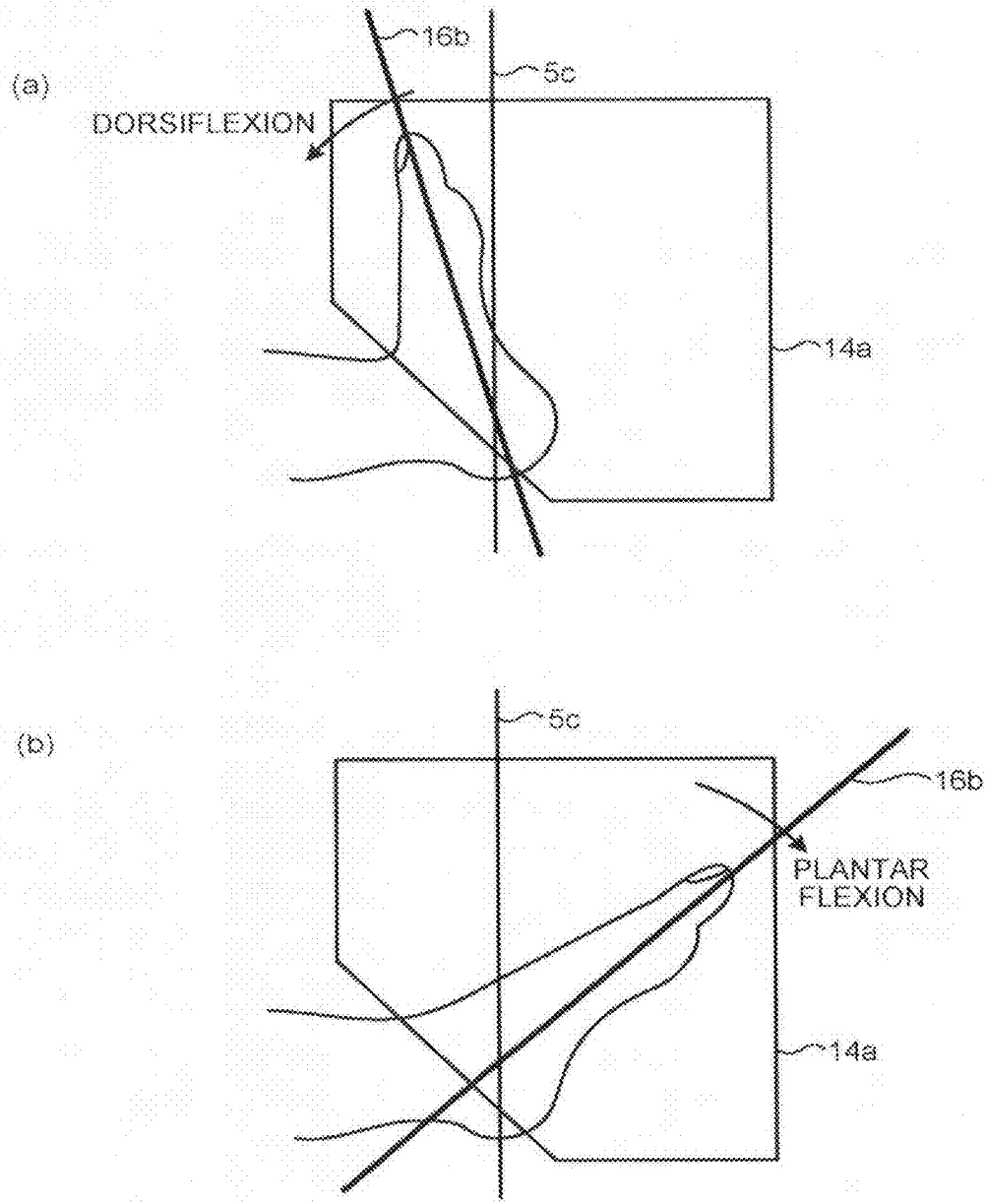
FIG. 36J is yet another drawing for explaining the examples in which the measuring unit according to the ninth embodiment measures the index values for other exercises in rotation directions.

As illustrated in FIG. 36I, to measure the index value for the dorsiflexion and the plantar flexion of the left foot, the measuring unit 142*b* measures the angle formed by the horizontal plane 5*c* and the long axis 16*b*, as the index value. In the above example, the left foot is used as the target of the measuring process, for the sake of convenience in the explanation. However, it is also possible to perform the measuring process on the right foot in the same manner. In that situation, for example, the measuring unit 142*b* measures the angle formed by the horizontal plane Sc and a long axis 16*b* calculated on the basis of the depth image information of the right foot, as an index value. Further, the detection space 14*a* illustrated in FIG. 36I does not necessarily have to be set as indicated in the drawing. For instance, it is acceptable to set a detection space 14*a* as illustrated in FIGS. 36J(a) and 36J(b).

Figure 36K:
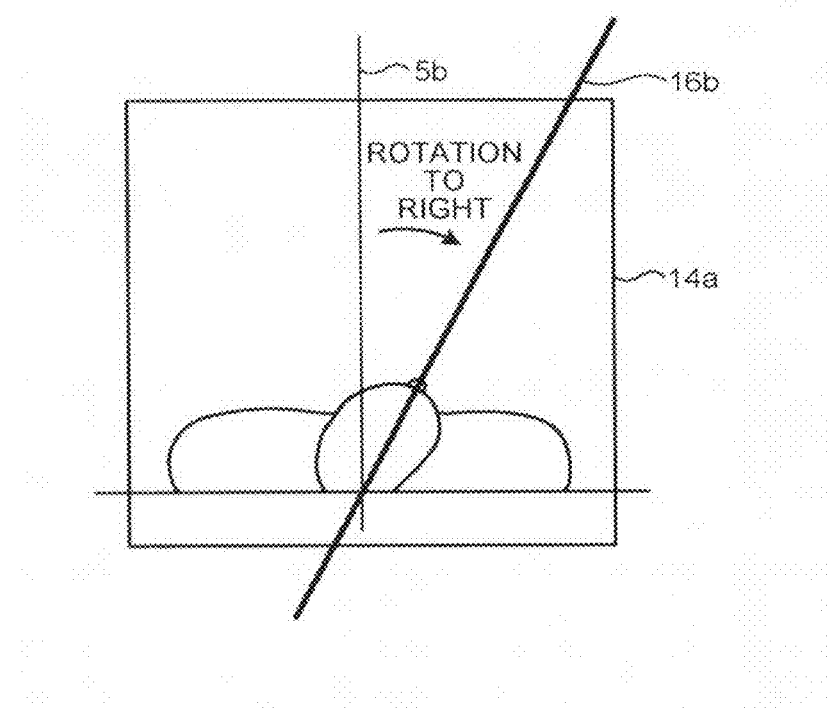
FIG. 36K is yet another drawing for explaining the examples in which the measuring unit according to the ninth embodiment measures the index values for other exercises in rotation directions.

Next, an example in which an index value for a rotation of the neck is measured will be explained, with reference to FIG. 36K. FIG. 36K is a view of the head of a subject from above, with an example in which the measuring unit 142*b* measures the index value for the rotation of the neck. In FIG. 36K, the setting unit 142*a* sets the sagittal plane 5*b* as reference information, whereas a detection space 14*a* is set as indicated in the drawing so as to include only the head of the subject.

As illustrated in FIG. 36K, to measure the index value for the rotation of the neck, the measuring unit 142*b* measures the angle formed by the sagittal plane 5*b* and the long axis 16*b*, as the index value.

As explained above, the motion information processing apparatus 100 according to the ninth embodiment sets the reference plane or the reference line and calculates the orientation information of the various exercises in the rotation directions. After that, the motion information processing apparatus 100 measures the index values of the exercises in the rotation directions, by using the reference plane or the reference line that was set and the orientation information. Consequently, the motion information processing apparatus 100 is able to evaluate the various exercises in the rotation directions.

Tenth Embodiment

The seventh to the ninth embodiments have thus been explained. It is, however, possible to carry out the present disclosure in various modes other than the exemplary embodiments described above.

For example, in the exemplary embodiments described above, the examples are explained in which the setting instruction and the start instruction are input by using the input unit 120. However, possible embodiments are not limited to these examples. For instance, the setting instruction and the start instruction may be input by using the speech recognition technique implemented by the motion information acquiring unit 10. In one example, when having received a speech recognition result instructing to "set a reference plane", the setting unit 142*a* may determine that a setting instruction has been input and may set reference information. In yet another example, when the motion information acquiring unit 10 detects that the hand of the imaged subject captured in a color image has changed from an open state to a closed state, the measuring unit 142*b* may determine that a start instruction has been input and may measure an index value.

Further, in the ninth embodiment, for instance, the examples are explained in which the index value is measured by using the reference plane or the reference line that was set by using the motion information and the orientation information indicating the exercise performed in the rotation direction. However, possible embodiments are not limited to these examples. For instance, the motion information processing apparatus 100 may set a reference line, by using orientation information in an initial state of the subject. Further, the motion information processing apparatus 100 may measure an index value by comparing the reference line that was set, with orientation information calculated while the rehabilitation is being performed.

More specifically, in the motion information processing apparatus 100, every time depth image information is obtained by the obtaining unit 141, the calculating unit 142*e* calculates orientation information for each of the frames, by using the depth image information. After that, when having received a setting instruction in the initial state of the subject, the setting unit 142*a* sets reference line information by using the orientation information corresponding to the time at which the setting instruction was received. After that, when having received a start instruction, the measuring unit 142*b* calculates the angle formed by the reference line information that was set and the orientation information calculated after the time at which the start instruction was received, as the index value.

Eleventh Embodiment

The motion information processing apparatus 100 configured to evaluate the various types of rehabilitation has thus been explained. The motion information processing apparatus 100 of the present disclosure is capable of performing various processes by arbitrarily combining, as appropriate, any of the features described in the first to the sixth embodiment with any of the features described in the seventh to the tenth embodiments. More specifically, the obtaining unit 141 obtains the motion information of a subject who performs a predetermined motion. The input unit 120 receives the operation to designate a site of the subject and the reference information that serves as a reference for the evaluation regarding a motion of rehabilitation. After that, every time motion information is obtained, the analyzing unit 142 (or the measuring unit 142*b*) measures an index value that serves as an index for the evaluation of the rehabilitation, on the basis of the positional relationship between the designated reference information and the designated site. Next, an example of the motion information processing apparatus 100 according to the eleventh embodiment will be explained.

The motion information processing apparatus 100 according to the eleventh embodiment has the same configuration as that of the motion information processing apparatus 100 illustrated in FIG. 30 (i.e., being provided with the constituent elements described in the first to the sixth embodiments and the constituent elements described in the seventh to the tenth embodiments), except that the processes performed by the analyzing unit 142 and the display controlling unit 143 are partially different. Thus, the eleventh embodiment will be explained while a focus is placed on the difference from the embodiments described above. The elements having the same functions as those in the configurations of the above embodiments will be referred to by using the same reference characters, and the explanation thereof will be omitted.

Figure 37B:
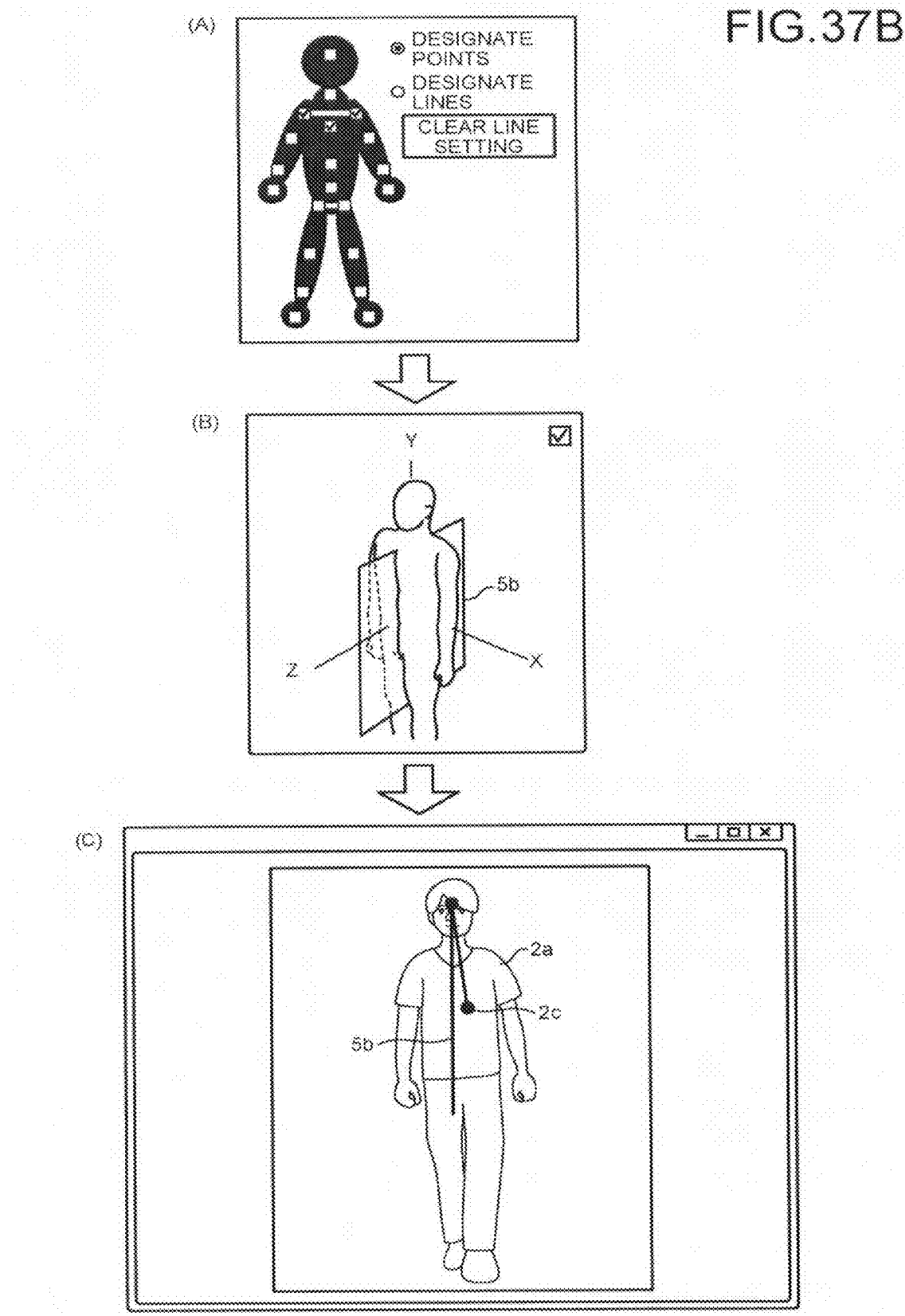
FIG. 37B is another drawing for explaining the example of the process performed by the motion information processing apparatus 100 according to the eleventh embodiment.

FIGS. 37A and 37B are drawings for explaining an example of a process performed by the motion information processing apparatus 100 according to the eleventh embodiment. For example, when the "setting screen" button in the window (see FIG. 12, for example) of the aiding application described in the first embodiment is pressed, the display controlling unit 143 according to the eleventh embodiment causes the output unit 110 to display a setting window as illustrated in FIG. 37A. In other words, as illustrated in FIG. 37A, the display controlling unit 143 causes the output unit 110 to display a setting window that includes display information in which a plurality of designating parts are arranged with a human body model and display information indicating a reference plane such as a coronal plane, a sagittal plane, or a horizontal plane.

In this situation, by designating one or more of the designating parts with respect to a desired setting and designating a reference plane from the setting window displayed on the output unit 110 via the input unit 120, the operator is able to cause various types of information with respect to the reference plane to be displayed. For example, the operator is able to cause various types of information using the coronal plane, the sagittal plane, or the horizontal plane as a reference to be displayed, by designating the setting for a real-time display, the setting for measuring a speed, the setting for a walking image viewed from above, or the setting for measuring an angle that are displayed on the left side of the setting window illustrated in FIG. 37A(A) and by further designating one of the coronal, sagittal, and horizontal planes displayed on the right side of the setting window illustrated in FIG. 37A(A).

In this situation, the operator is also able to shift the reference plane to an arbitrary position. For example, when the sagittal plane is designated in the setting window illustrated in FIG. 37A(A), the display controlling unit 143 further causes a setting window corresponding to the designated sagittal plane to be displayed, as illustrated in FIG. 37(B). For example, the operator shifts the sagittal plane 5*b* to an arbitrary position by performing a drag-and-drop operation on the sagittal plane 5*b*, in the setting window illustrated in FIG. 37A(B). Although FIG. 37A(B) illustrates the example with the sagittal plane 5*b*, possible embodiments are not limited to this example. It is possible to shift the coronal plane and the horizontal plane to arbitrary positions in a similar manner. The example illustrated in FIG. 37A is merely an example, and possible embodiments are not limited to this example. In other words, the motion information processing apparatus 100 according to the eleventh embodiment is also able to use other human body models or the image information of the subject, as the information with which the designating parts are arranged. Furthermore, the items in the setting window may arbitrarily be configured.

Next, an example will be explained, with reference to FIG. 37B. For example, as illustrated in FIG. 37B(A), the operator designates designating parts in the setting for a real-time display, and as illustrated in FIG. 37B(B), the operator further designates the sagittal plane 5*b*. As a result, as illustrated in FIG. 37B(C), the display controlling unit 143 causes lines to be displayed while being superimposed on an image of the subject, one of the lines connecting the joint "2*a*" to the joint "2*c*" and the other line indicating the sagittal plane 5*b*. With these arrangements, it is possible to recognize the status of the subject with respect to the sagittal plane 5*b*, in a real-time manner.

The example illustrated in FIG. 37B is merely an example, and possible embodiments are not limited to this example. In other words, the motion information processing apparatus 100 according to the eleventh embodiment is also able to measure an angle or the like when the user designates an arbitrary site of the subject and an arbitrary reference plane in the setting window displayed on the output unit 110. In one example, when the setting for measuring an angle is designated, and a reference plane is designated and shifted, in the setting window illustrated in FIG. 37A(A), the analyzing unit 142 measures the angle of the designated site with respect to the designated and shifted reference plane. For example, in the setting window, when the designating part representing the joint of an arm is designated in the human body model displayed in the setting for measuring an angle, and the coronal plane is designated and shifted in the designation of a reference plane, the analyzing unit 142 measures the angle of the arm with respect to the shifted coronal plane.

Further, the motion information processing apparatus 100 according to the eleventh embodiment is also able to store therein an index value corresponding to a designated site and a designated reference plane, in advance, so that the setting unit 142*a* is able to measure various types of index values for rehabilitation on the basis of a designation that is made via the setting window. Further, the motion information processing apparatus 100 according to the eleventh embodiment is also able to store designated setting information into the setting file storage unit 132 as a setting file and to read the stored setting information in response to a setting file read request. As explained here, the motion information processing apparatus 100 according to the eleventh embodiment is able to cause the various types of information about the arbitrary site of the subject with respect to the arbitrary reference plane, to be displayed.

Twelfth Embodiment

The first to the eleventh embodiments have thus been explained. The present disclosure, however, may be carried out in other various modes besides the first to the eleventh embodiments described above.

In the first to the sixth embodiments described above, the examples are explained in which the motion information processing apparatus 100 causes the display information including the designating parts to be displayed. In the seventh to the tenth embodiments described above, the examples are explained in which the motion information processing apparatus 100 calculates the index values. However, possible embodiments are not limited to these examples. For instance, the processes may be performed by a service providing apparatus that is provided in a network.

FIG. 38 is a drawing for explaining an example in which a configuration is applied to a service providing apparatus according to a twelfth embodiment. As illustrated in FIG. 38, a service providing apparatus 200 is installed in a service center and is connected to, for example, each of terminal devices 300 installed in a medical facility, a home, a workplace, and a sports gym, or the like via a network 5. To each of the terminal devices 300 installed in the medical facility, the home, the workplace, and the sports gym, or the like, the motion information acquiring unit 10 is connected. Further, each of the terminal devices 300 has a client function to be able to utilize a service provided by the service providing apparatus 200. The network 5 may be wired or wireless and may be configured by using any arbitrary type of communication network such as the Internet or a Wide Area Network (WAN).

The service providing apparatus 200 is configured to provide each of the terminal devices 300 with the same processes as those performed by the motion information processing apparatus 100, as a service. In other words, the service providing apparatus 200 includes functional units equivalent to the obtaining unit 141 and the display controlling unit 143. Further, the functional unit equivalent to the obtaining unit 141 is configured to obtain the motion information of a subject who performs a predetermined motion. Further, the functional unit equivalent to the display controlling unit 143 is configured to exercise control so as to cause the display information to be displayed, the display information including the designating parts used for receiving a designating operation to designate such a piece of state information that is to be displayed by the output unit 110, from among the pieces of state information of the subject presented by using the motion information obtained by the functional unit equivalent to the obtaining unit 141.

Further, the serving providing apparatus 200 has functional units that are equivalent to the obtaining unit 141, the setting unit 142a, and the measuring unit 142b. Further, the functional unit equivalent to the obtaining unit 141 is configured to obtain the depth information of the space in which rehabilitation is performed. Further, the functional unit equivalent to the setting unit 142a is configured to set the reference information that serves as a reference for an evaluation regarding a motion of the rehabilitation, by using the motion information in the initial state of the subject who undergoes the rehabilitation. After that, the functional unit equivalent to the measuring unit 142b is configured to measure, every time motion information is obtained, an index value that serves as an index for the evaluation of the rehabilitation, by using the motion information and the reference information. With these arrangements, the service providing apparatus 200 is able to evaluate the rehabilitation in accordance with each of the points of interest. In other words, the service providing apparatus 200 makes it easy and convenient to provide aids that are in accordance with each of the points of interest. Furthermore, the service providing apparatus 200 is able to evaluate the various types of rehabilitation.

The configurations of the motion information processing apparatus 100 described in the first to the eleventh embodiments above are merely examples, and the constituent elements thereof may be integrated and separated as necessary. For example, it is acceptable to integrate the motion information storage unit 131 and the setting file storage unit 132 together or to separate the analyzing unit 142 into a calculating unit configured to calculate the distances between the joints and the like and a comparing unit configured to compare the calculated values with the threshold values. Further, for example, it is also acceptable to integrate the setting unit 142a and the measuring unit 142b together.

Rule information and the index values for the rehabilitation described in the first to the eleventh embodiments above do not necessarily have to be those that are defined by the Japanese Orthopaedic Association, but may be those that are defined by other various organizations. For example, it is acceptable to use various types of regulations and rules that are defined by "the International Society of Orthopaedic Surgery and Traumatology (SICOT)", "the American Academy of Orthopaedic Surgeons (AAOS)", "the European Orthopaedic Research Society (EORS)", "the International Society of Physical and Rehabilitation Medicine (ISPRM)", or "the American Academy of Physical Medicine and Rehabilitation (AAPM&R)".

The functions of the obtaining unit 141, the setting unit 142a, the measuring unit 142b, and the display controlling unit 143 described in the exemplary embodiments above may be realized by using software. For example, the functions of the obtaining unit 141, the setting unit 142a, the measuring unit 142b, and the display controlling unit 143 may be realized by causing a computer to execute a motion information processing computer program (hereinafter, "motion information processing program") that defines the procedures in the processes described in the above embodiments as being performed by the obtaining unit 141, the setting unit 142a, the measuring unit 142b, and the display controlling unit 143. The motion information processing program may be, for example, stored in a hard disk, a semiconductor memory device, or the like, so as to be read and executed by a processor such as a Central Processing Unit (CPU) or a Micro Processing Unit (MPU). Furthermore, the 4 motion information processing program may be distributed as being recorded on a computer-readable recording medium such as a Compact Disk Read-Only Memory (CD-ROM), a Magneto-Optical (MO) disk, a Digital Versatile Disk (DVD), or the like.

As explained above, according to at least one aspect of the exemplary embodiments, the motion information processing apparatus of the present disclosure makes it possible to evaluate the rehabilitation in accordance with each of the points of interest.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motion information processing apparatus comprising: processing circuitry configured to:
   obtain motion information of a subject who performs a predetermined motion;
   display a Graphical User Interface (GUI) in which a plurality of designating parts for setting a site to be analyzed in a form of at least one of a point and a line in the subject is respectively arranged with a plurality of joints of a body shown in at least one of image information of the subject and human body model information;
   receive an operation to set the site to be analyzed in the form of the point corresponding to a joint and the line connecting joints in the subject by accepting a designation operation for a predetermined designating part included in the plurality of designating parts on the GUI;
   calculate an analysis value related to a movement of the set site by analyzing the motion information; and
   display display information based on the analysis value related to the movement of the set site.

2. The motion information processing apparatus according to claim 1, wherein the processing circuitry is further configured to:
   receive an operation to arrange the designating part in an arbitrary position of the image information of the subject and the human body model information; and
   display the information in which the designating part is arranged in the position received.

3. The motion information processing apparatus according to claim 1, wherein the processing circuitry is configured to receive the operation to set the site used for analyzing at least one of the following: skeleton information corresponding to a time when the subject is performing the predetermined motion; speed information and angle information in a predetermined position of the subject; and walking information corresponding to a time when the subject is performing a walking motion.

4. The motion information processing apparatus according to claim 1, wherein the processing circuitry is further configured to calculate the analysis value by analyzing at least one of the following: a sway of a knee in a direction orthogonal to a walking direction that is observed while the subject is performing a walking motion; a varus/valgus angle of a knee; a speed of a gravity point of the subject; and an angle of flexion and extension of a knee.

5. The motion information processing apparatus according to claim 1, wherein the processing circuitry is further configured to:
   receive an operation to designate a site of the subject and reference information that serves as a reference for an evaluation regarding a motion of rehabilitation; and
   measure, every time the motion information is obtained, an index value that serves as an index for the evaluation of the rehabilitation, on a basis of a positional relationship between the designated reference information and the designated site.

6. A motion information processing apparatus comprising: processing circuitry configured to:
   obtain motion information representing a motion of a person;
   set a first reference plane and a second reference plane that serve as a reference for an evaluation regarding a motion of rehabilitation, by using position information of sites of a subject in an initial state of the subject who undergoes the rehabilitation;
   measure, every time the motion information is obtained, an index value that serves as an index for the evaluation of the rehabilitation, by using the motion information and the first reference plane;
   measure, every time the motion information is obtained, a deviation in the motion of rehabilitation by using the motion information and the second reference plane; and
   perform the evaluation regarding the motion of rehabilitation by integrating the measured index value and the deviation.

7. The motion information processing apparatus according to claim 6, wherein the processing circuitry is further configured to set at least one of a coronal plane, a sagittal plane, and a horizontal plane, as the reference plane.

8. The motion information processing apparatus according to claim 7, wherein the processing circuitry is further configured to measure the index value for at least one of the following, by using the coronal plane set: flexion and extension of a shoulder; horizontal flexion and extension of a shoulder; flexion and extension of a shoulder girdle; flexion and extension of a hip; forward flexion and rearward flexion of a head; forward flexion and rearward flexion of a thoracolumbar area; and a rotation of a thoracolumbar area.

9. The motion information processing apparatus according to claim 7, wherein the processing circuitry is further configured to measure the index value for at least one of the following, by using the sagittal plane set: abduction and adduction of a shoulder; an external rotation and an internal rotation of a shoulder; abduction and adduction of a hip; lateral flexion of a neck; and lateral flexion of a thoracolumbar area.

10. The motion information processing apparatus according to claim 7, wherein the processing circuitry is further configured to measure the index value for at least one of the following, by using the horizontal plane set: raising and lowering of a shoulder girdle; and an external rotation and an internal rotation of a shoulder.

11. The motion information processing apparatus according to claim 6, wherein the processing circuitry is further configured to display the index value on an display, wherein the processing circuitry is further configured to display at least one of the following: image information including the reference plane and a site for which the index value is measured; and information indicating the index value.

12. The motion information processing apparatus according to claim 11, wherein the processing circuitry is further configured to display at least one of the following: information indicating a normal range of the index value for the rehabilitation; and information indicating an important notice for the rehabilitation.

13. The motion information processing apparatus according to claim 6, wherein the processing circuitry is further configured to:
- detect a site of the subject from depth image information including coordinate information and depth information of the subject;
- calculate orientation information indicating a movement of the site in a rotation direction, by using coordinate information of the site detected from the depth image information; and
- measure the index value by using the orientation information calculated and the reference plane.

* * * * *